(12) United States Patent
Bajema

(10) Patent No.: US 6,293,407 B1
(45) Date of Patent: Sep. 25, 2001

(54) SYSTEM FOR DEBRIS ELIMINATION AND ITEM SEPARATION AND METHOD OF USE THEREOF

(75) Inventor: Rick W. Bajema, Rhinelander, WI (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/507,937

(22) Filed: Feb. 22, 2000

Related U.S. Application Data

(62) Division of application No. 08/904,834, filed on Aug. 1, 1997, now Pat. No. 6,213,308.
(60) Provisional application No. 60/040,170, filed on Mar. 11, 1997.

(51) Int. Cl.[7] .................................................... B03B 5/28
(52) U.S. Cl. ................ 209/495; 209/172.5; 209/492; 209/493; 209/460; 209/501; 209/494
(58) Field of Search ................... 209/483, 172.5, 209/460, 494, 493, 501, 492, 172, 173, 208, 450, 474, 476, 480, 495, 461

(56) References Cited

U.S. PATENT DOCUMENTS

| | | | | |
|---|---|---|---|---|
| 356,359 | * | 7/1887 | Freeland | 209/156 |
| 380,233 | * | 3/1888 | Wall | 209/18 |
| 1,186,677 | | 6/1916 | Parker . | |
| 1,195,264 | | 8/1916 | Pennington . | |
| 1,209,900 | | 12/1916 | Stebler et al. . | |
| 1,252,833 | | 1/1918 | Parker . | |
| 1,477,955 | * | 12/1923 | Henry | 209/501 |
| 1,530,889 | * | 3/1925 | Hachita | 209/483 |
| 2,196,451 | | 4/1940 | Holzer . | |
| 2,234,502 | | 3/1941 | Pixton . | |
| 2,283,512 | | 5/1942 | Sias . | |
| 2,426,398 | | 8/1947 | Lathrop . | |
| 2,578,808 | | 12/1951 | Johnson et al. . | |
| 2,698,087 | | 12/1954 | Call et al. . | |
| 3,236,382 | * | 2/1966 | Bosman | 209/460 |
| 3,249,226 | * | 5/1966 | Watson | 209/172.5 |
| 3,252,769 | | 5/1966 | Nagelvoort . | |
| 3,420,371 | | 1/1969 | Roller . | |
| 3,568,839 | | 3/1971 | Dunlea, Jr. . | |
| 3,702,656 | | 11/1972 | Gutterman et al. . | |
| 3,792,772 | * | 2/1974 | Wallace | 209/173 |
| 3,822,015 | | 7/1974 | Hsieh et al. . | |
| 4,012,316 | * | 3/1977 | Ostlund | 209/10 |
| 4,028,231 | * | 6/1977 | Parham | 209/501 |
| 4,111,798 | | 9/1978 | Peterson et al. . | |
| 4,113,608 | | 9/1978 | Kazama et al. . | |
| 4,157,295 | | 6/1979 | Liller . | |
| 4,169,787 | | 10/1979 | Gunnerson . | |
| 4,225,424 | | 9/1980 | Patzlaff . | |
| 4,375,264 | | 3/1983 | Porter . | |
| 4,759,841 | | 7/1988 | Flodin . | |
| 4,894,148 | * | 1/1990 | Frei | 209/479 |
| 4,946,584 | * | 8/1990 | Olney | 209/18 |
| 4,971,684 | * | 11/1990 | Mueller | 209/44 |
| 5,048,693 | * | 9/1991 | Zaltzman | 209/493 |
| 5,049,260 | * | 9/1991 | Spears | 209/2 |
| 5,273,162 | * | 12/1993 | Riherd | 209/460 |

(List continued on next page.)

*Primary Examiner*—Donald P. Walsh
*Assistant Examiner*—Daniel K Schlak
(74) *Attorney, Agent, or Firm*—Rothwell, Figg, Ernst & Manbeck

(57) ABSTRACT

A item separating or debris eliminating system includes a tank and a pump for circulating water from one end of the tank around through a duct and back into the opposite end of the tank. A medium density object collector is located within the tank, and a light debris collector is located within the tank. A conveyor filter is included through which substantially all of the water in the tank is circulated. The debris eliminating system preferably also includes a high density object collector within the tank. The system can be used to separate a variety of objects having different densities and terminal velocities in a fluid. Most preferably, the system is utilized for separating debris from potatoes and the like produce.

33 Claims, 31 Drawing Sheets

U.S. PATENT DOCUMENTS

| | | |
|---|---|---|
| 5,305,888 | 4/1994 | Meylor et al. . |
| 5,413,131 | 5/1995 | Medlock . |
| 5,833,868 * | 11/1998 | Bajema .................................. 210/788 |
| 6,213,308 * | 4/2001 | Bajema ............................. 209/172.5 |

* cited by examiner

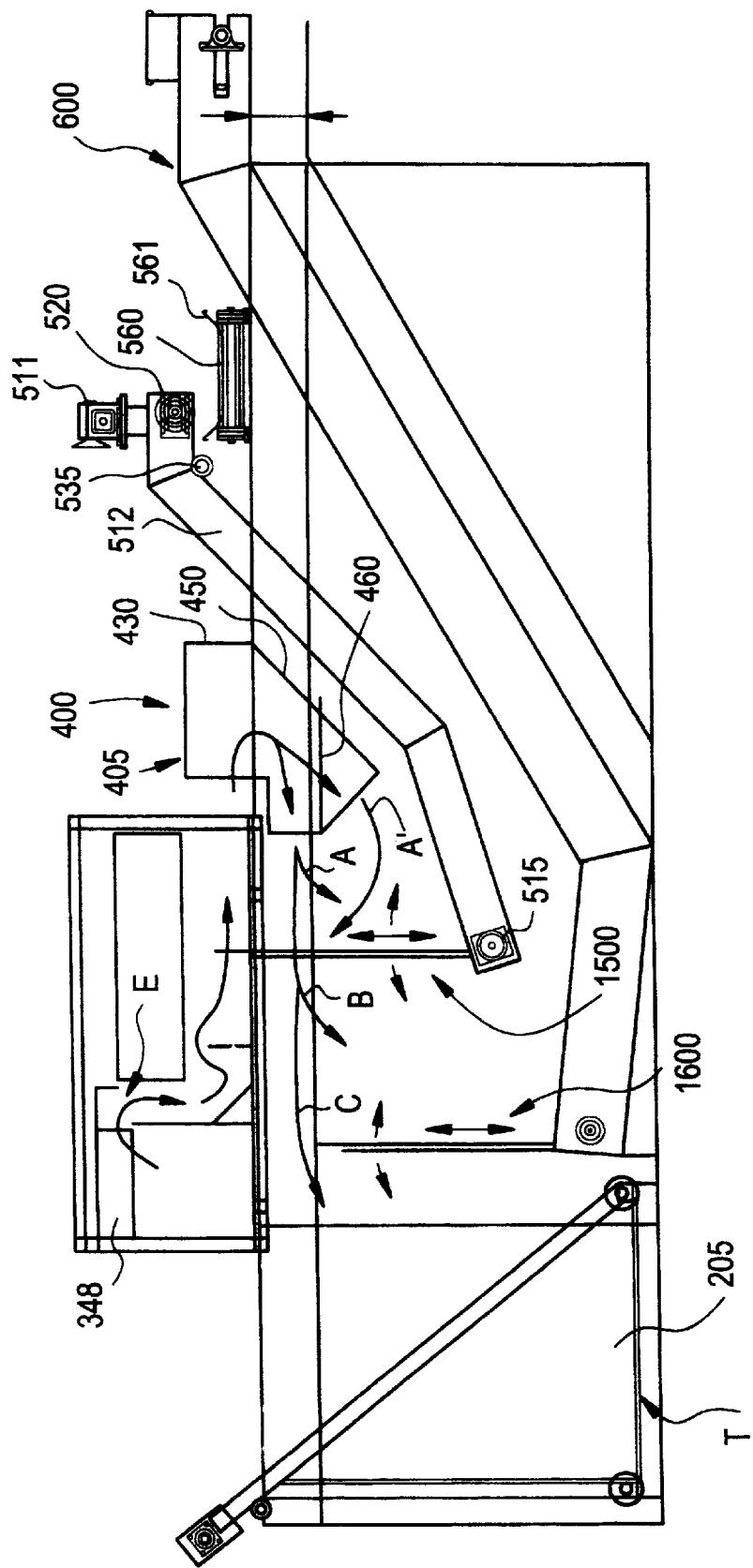

HINGE COVER SO INTAKE CAN BE OPENED COMPLETLY

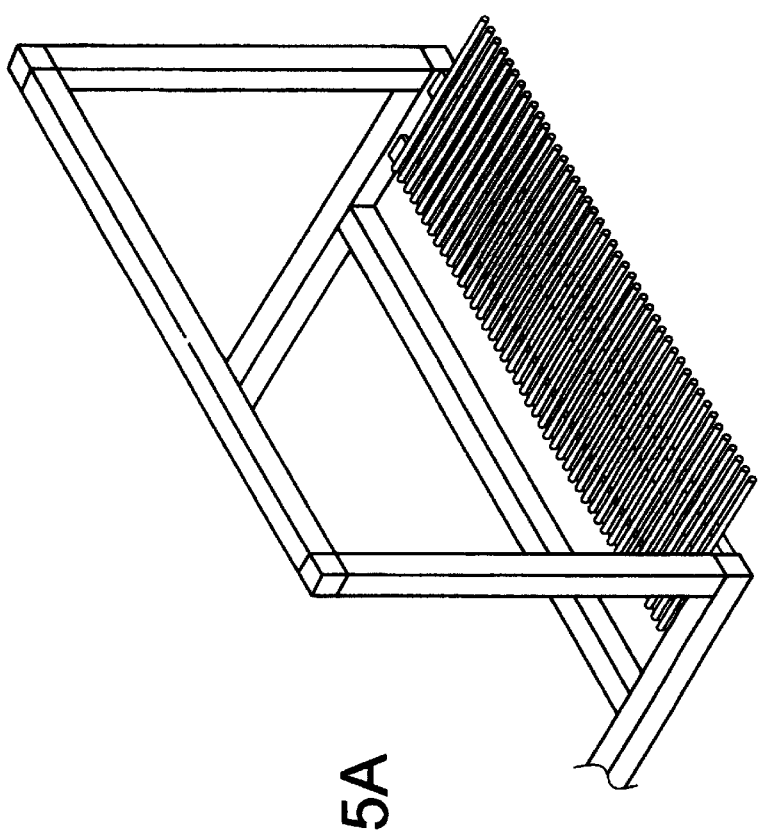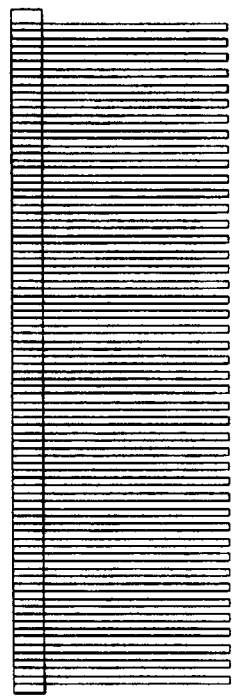
FIG. 5A
FIG. 5B

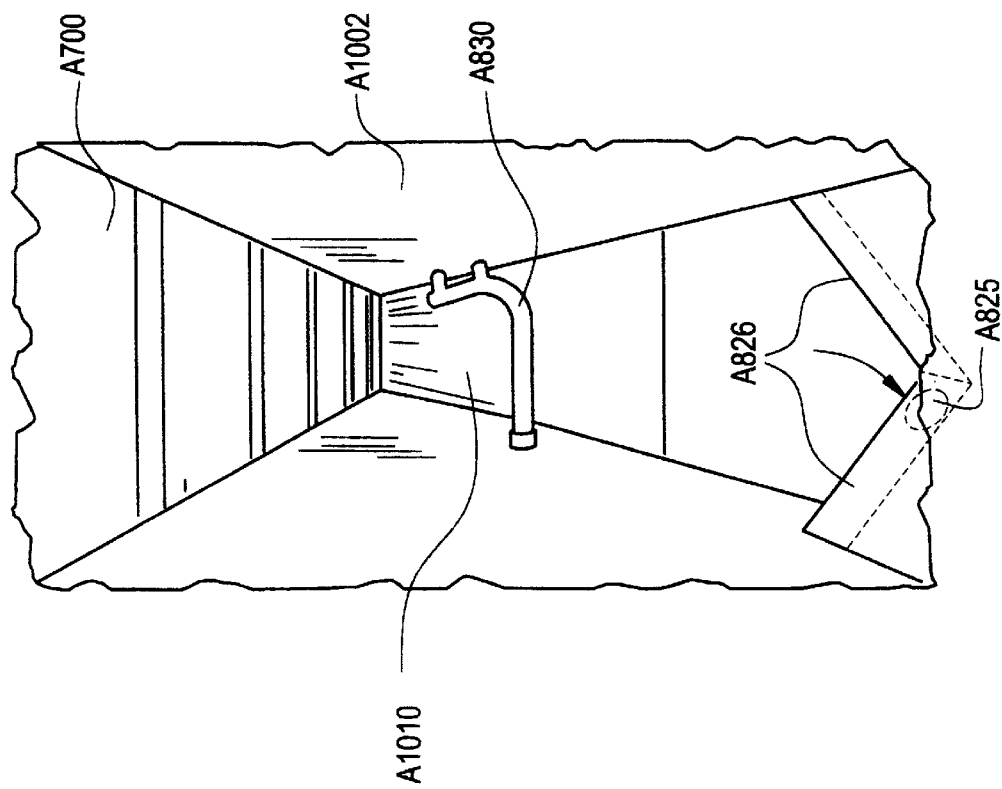

FIG. 29A
FIG. 29B
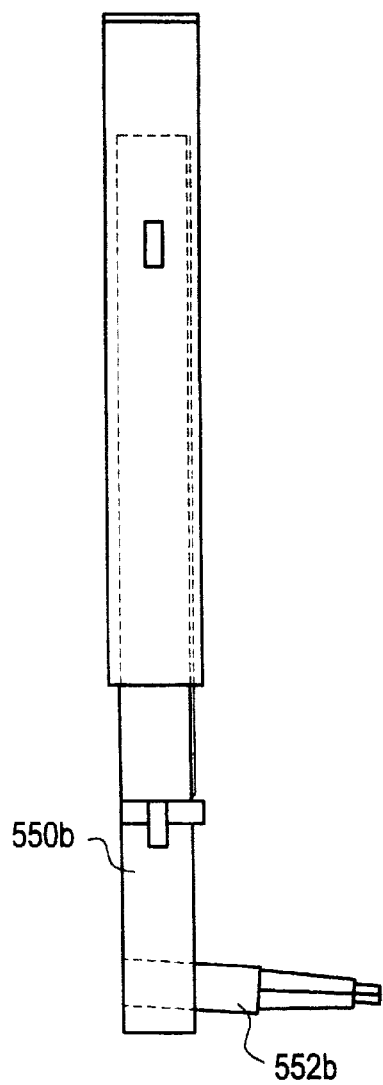
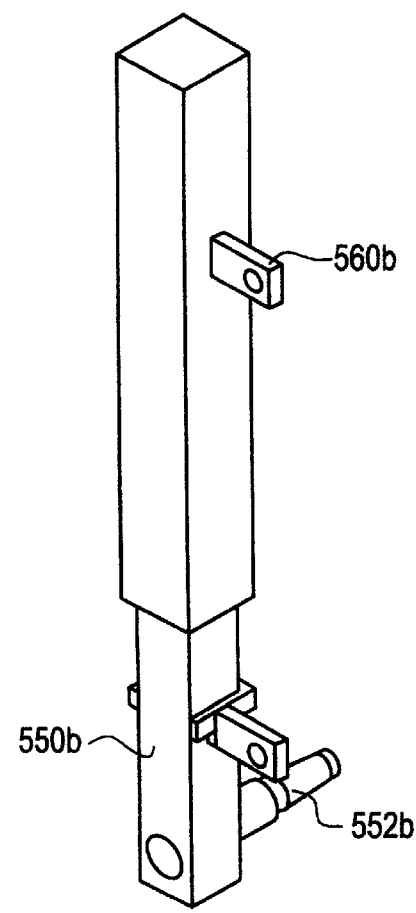

SYSTEM FOR DEBRIS ELIMINATION AND ITEM SEPARATION AND METHOD OF USE THEREOF

This application is a divisional of U.S. application Ser. No. 08/904,834, filed Aug. 1, 1997, which claims benefit of U.S. Provisional Application Ser. No. 60/040,170 filed Mar. 11, 1997.

BACKGROUND OF THE INVENTION

1. Field of the Invention

This invention pertains generally to devices for separating items by introducing the items into a fluid flow path. This invention also pertains generally to devices and systems for separating debris from items. The preferred embodiments of the invention have specific relevance to apparatus for separating debris from produce, such as potatoes, sweet potatoes, sugar beets, carrots, and any other commodity or material having a specific gravity greater than one, the most preferred embodiments pertaining to—the separation of debris—e.g., vines, grass, defective potatoes, plastic, dirt, and/or rocks from potatoes. The invention can also be used to separate a variety of other product, such as apples, oranges, other citrus fruit and product having a specific gravity less than one.

2. Description of the Related Art

Typically, when potatoes or the like are gathered from a farm site, various debris is unavoidably collected along with the potatoes. The type of debris depends, in part, upon the soil and farm conditions; however, such debris typically includes one or more of the following: vines, grass, defective potatoes, plastic materials used in potato fields, dirt and/or rocks. Often, the ratio of debris to potatoes is on the order of about 1/3. Accordingly, separation of such debris is critical. When farmers sell such potatoes to end users—e.g., manufacturers of potato chips, french fries, and the like—such end users typically demand, that such potatoes be virtually free of such debris. A few items of debris in a single delivery can result in a lost sale and/or can even lead to the farmer's need to compensate the end user for costs related to such lost sale. As a result, considerable efforts are applied by farmers to remove such debris. This debris is usually removed manually. However, the amount of potatoes or the like processed is often a very large number. A farmer often must hire even about 30 people to work at the same time to separate unwanted debris from the potatoes.

Similar problems exist with other produce such as sugar beets, carrots, sweet potatoes and the like. There has been a need for an apparatus which can accurately separate debris from potatoes and the like. Existing systems which have been developed for the automation of debris elimination have a variety of problems—making their use less desirable, impracticable and/or impossible.

One known system is shown in U.S. Pat. No. 4,759,841 (Flodin). The '841 patent shows a density-current method and apparatus for separating produce, such as potatoes, from debris. In this system, an elongated tank has a water current directed from an inlet at one end wall. Products are conveyed into the tank by a conveyor adjacent to the inlet. As a result, the products introduced into the water stratify, due to their different densities. This device has a number of drawbacks, such as inability to handle a large quantity of produce at a single time, inability to maintain cleanliness of the water in the tank, inefficient separation capabilities and non-adaptability.

A variety of other systems are also known for the separation of various items in a fluid medium. However, all of the existing systems have substantial drawbacks and/or are inapplicable to certain uses contemplated by the present invention. There is still a great need for a device that will enable farmers to overcome the problems inherent with existing methods of removing debris from potatoes—which to this date, has largely been performed by substantial manual labor. In addition, there still remains a need for a permanently installed separation apparatus, such as at a processing plant which receives and processes potatoes and the like items.

SUMMARY OF THE INVENTION

The present invention overcomes the above and other problems in the existing devices and prior methods of product separation.

According to a first aspect of the present invention, a debris eliminating system is provided which includes: a) a tank for holding water; b) a system for circulating water across the tank from a first side to a second side and for returning at least a portion of the water from the second side back to the first side so that water generally continually flows across the tank; c) a pump for circulating the water across the tank; d) a medium density object collector within the tank; e) a light debris collector within the tank for receiving light debris which flows further downstream than the medium density objects; and f) a conveyor filter through which substantially all of the water in the tank is circulated, wherein the light debris is collected upon the conveyor filter and discharged out of the tank by the conveyor filter.

According to another aspect of the invention, the debris eliminating system further includes a high density object collector within the tank at a location upstream of both the medium density object collector and the light density object collector.

According to another aspect of the invention, the medium density object collector and the light debris collector within the tank include upwardly curved ducts.

According to another aspect of the invention, the upwardly curved ducts converge in a manner to cause the medium density objects and the light debris to be conveyed upwards by the water flow through the ducts.

According to another aspect of the invention, a receiving flume is located proximate the top of the tank for placing items to be separated into the tank, the receiving flume having a horizontal surface and a plurality of fingers at the output end of the horizontal surface which allow water to freely pass between the fingers while maintaining larger objects above the fingers.

According to another aspect of the invention, the medium density object collector includes a conveyor belt or chain which receives medium density objects and conveys such objects out of the tank.

According to another aspect of the invention, the conveyor filter includes a conveyor having cross bars which pass over a surface of the filter so as to draw debris off the filter and out of the tank.

According to a second aspect of the invention, an item separating system is provided which includes: a) a tank for holding water; b) a system for circulation of water from an output location in the tank through a duct and back to an input location to the tank so that water flows in a first direction across the tank; c) a pump for pumping and circulating the water through the duct; d) a medium density object collector within the tank; e) a light debris collector within the tank downstream of the medium density object collector; f) the light debris collector including a filter through which substantially all of the water in the tank is circulated. According to a further aspect of the invention, the item separating system is a debris eliminating system. According to a further aspect of the invention, the debris eliminating system further includes a high density object collector within the tank at a location upstream of both the medium density object collector and the light density object collector. According to a further aspect of the invention, the pump circulates 1000 to 2000 gallons of water through the system per minute per foot width. According to a further aspect of the invention, the system for circulating water includes a duct for circulating water and a flume for receiving water from the duct. According to a further aspect of the invention, the debris eliminating system as recited in claim 1, wherein the system for circulating water includes a duct for circulating water and a discharge diffuser at the end of the duct. According to another aspect of the invention, the flume receives water from the duct at a level above the water line within the tank and directs the water in an opposite direction to the first direction, and wherein a redirecting baffle receives water from the flume and redirects the water so as to double back to flow in the first direction within the tank. According to a further aspect of the invention, the flume has a bottom wall and a plurality of fingers at the output end of the bottom wall which allow water to freely pass between the fingers while maintaining larger objects above the fingers, and the baffle also includes a plurality of fingers that allow water to pass therethrough while maintaining larger objects above the fingers. According to another aspect of the invention, the filter is a hydro-sieve having parallel bars spaced apart by a gap of less than 0.05 inches, and the light debris collector includes a conveyor having cross bars which pass over an input surface of the filter so as to draw debris off the filter and out of the tank. Among the many benefits of the present system, the system allows debris to be removed from a desired product—such as potatoes and the like—creating very significant advantages in the form of lower labor costs, lower water consumption, higher capacity and the ability to handle greater amounts of product, improved separation accuracy, lower power requirements, and less environmental concern than existing equipment.

Because the present system can recycle a substantial amount of the liquid, e.g., water, within the system, the detrimental effects of discharging liquid into an outside water source such as a lake or river will be substantially eliminated. When dirty liquid is discharged into outside water sources, among other environmental hazards, debris within the tank can result in the build up of algae and bacteria which digest the debris and which deplete the oxygen supply in the outside water source. This can be problematic if a substantial amount of the water is not recycled but merely discharged into such a water source. In addition, because the present invention can operate with only a small amount of water added to the system per minute, the system does not have to be specially implemented in an area where a substantial water source can be found in order to fulfill the needs of the system. Accordingly, the present invention—which preferably includes wheels for its transportability as discussed above—can be brought to any desired location. This can be especially beneficial for use at farm sites and at locations which do not require such a device for the entire year, but which require such devices during specific seasons. This type of system could also be shared by a number of farmers and/or could even be rented for particular time periods with relatively simple delivery and set up time. The adaptability of the present device to various products enables it to be utilized at various locations for various purposes—creating a very versatile device.

The present invention as described with reference to the preferred embodiments, has particular advantages in the separation of items and, in particular, in the debris from produce such as potatoes and the like—easily separating vines, grass, wood, plastic, defective potatoes, such as hollow heart potatoes and dry rotten potatoes, and rocks (when a rock conveyor is included) from the desirable potatoes. At the same time, the present invention can reduce water loss and can enable the system to be maintained cleaner and freer from contaminants such as algae and bacteria.

The above and other advantages, features and aspects of the present invention will be more readily perceived from the following description of the preferred embodiments thereof taken together with the accompanying drawings and claims.

BRIEF DESCRIPTION OF THE DRAWINGS

The present invention is illustrated by way of example and not limitation in the accompanying drawings, in which like references indicate like parts, and in which:

FIG. 3 is a side elevational view of a debris eliminator which is also similar to that shown in FIG. 1;

FIGS. 5(A) and 5(B) illustrate product guiding fingers as used in a number of the embodiments of to the invention;

FIGS. 8–24 illustrate embodiments of the invention having improvements over the embodiments illustrated in FIGS. 1–7;

FIG. 8 illustrates a side view of a basic improved embodiment of the invention;

FIG. 9 is a top view of a specific embodiment having features of the basic embodiment illustrated in FIG. 8;

FIGS. 10–17 illustrate a most preferred construction also having features of the basic embodiment illustrated in FIG. 8;

FIG. 10 is a perspective view of the overall apparatus;

FIG. 11 is a schematic perspective view illustrating components of the overall apparatus;

FIG. 12 is a perspective view looking down into the separation section from the upstream side thereof;

FIG. 13 is a perspective view looking down into the separation section from the downstream side thereof;

FIG. 14 is a top perspective view of a portion of the apparatus illustrating the discharge of the debris and items separated from the top and bottom ducts;

FIG. 15(A) is a broken view within the filter section in the direction of the arrow 15 shown in FIG. 11;

FIG. 17 is a top view illustrating an alternative pump arrangement;

FIG. 20 is a top view of the filtering means shown in FIG. 19(A);

FIG. 21 is a schematic diagram of one embodiment of the plant apparatus;

FIG. 22 is a schematic side view of an embodiment of the invention used for separating items having a specific gravity of less than one;

FIG. 23 is a schematic diagram illustrating embodiments for a delivery duct for the device of FIG. 22;

FIG. 24 is a schematic diagram illustrating an embodiment for directing product to a horizontal release position;

FIGS. 25 to 29 illustrate exemplary recycling means that can be used in the present invention;

FIG. 25 is a perspective view of a portable water recycling system that can be used in the present invention;

FIG. 26 is a side view of the portable water recycling system shown in FIG. 25;

FIGS. 29(A) and 29(B) illustrate side and perspective views, respectively, of the adjustable wheel-mounting structure according to one preferred embodiment.

DETAILED DESCRIPTION OF THE PREFERRED EMBODIMENTS

FIGS. 1–7 illustrate embodiments of the invention having a number of improvements over existing systems, and FIGS. 8–24 illustrate additional embodiments having improvements similar to that of FIGS. 1–7 and having further improvements over the embodiments in FIGS. 1–7.

Figure 1:
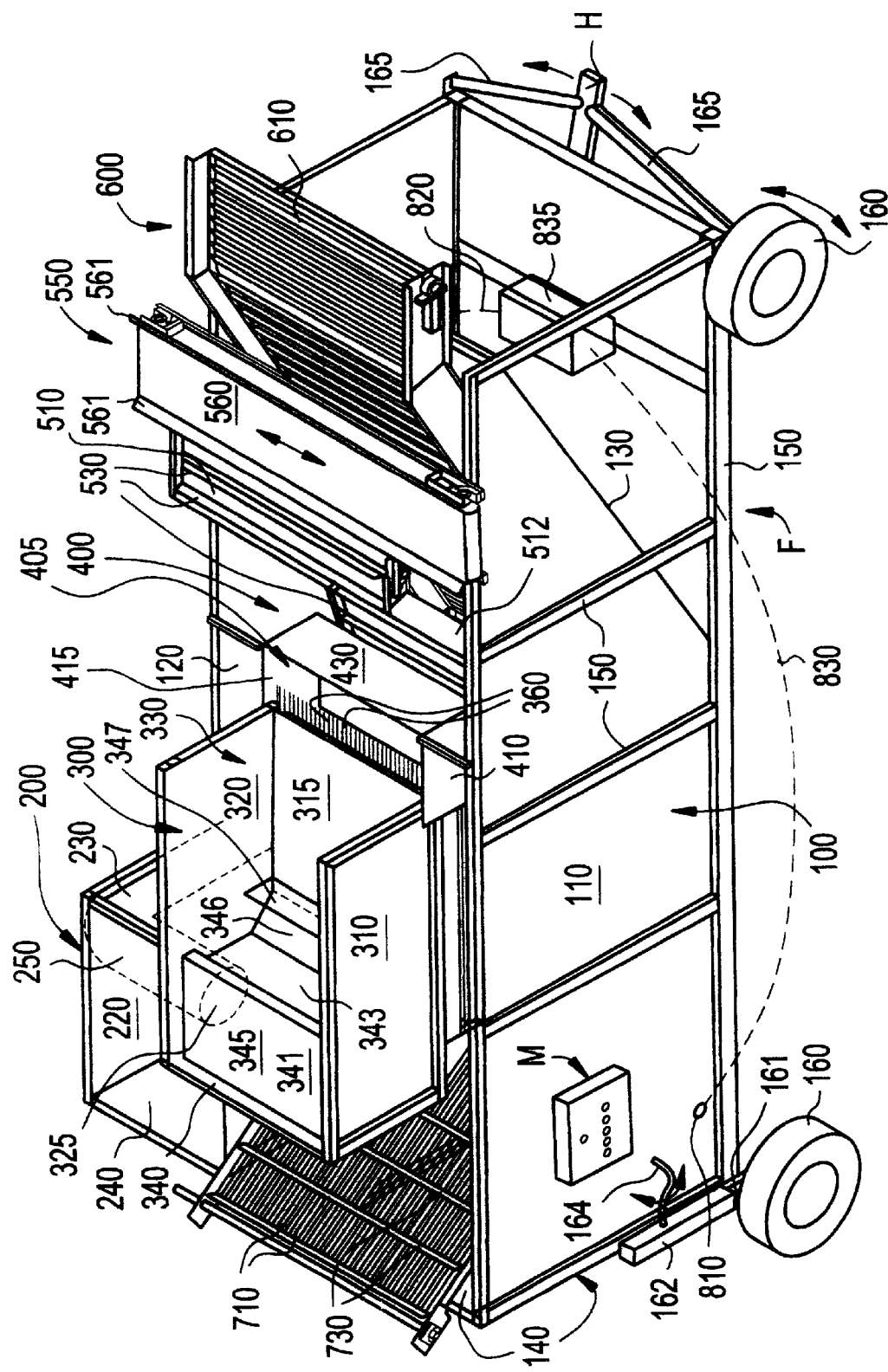
FIG. 1 is a perspective elevational view of a debris eliminator according to the invention.

1. Embodiments of FIGS. 1–7:

As shown in FIG. 1, the preferred embodiments of FIGS. 1–7 are directed to a debris eliminator system having a liquid tank 100, a pump enclosure 200 having a fluid pump P therein for circulating fluid through the tank 100, a flume 300 for receiving fluid pumped from pump enclosure 200 into the tank 100, a redirecting baffle 400 for redirecting fluid flow in a reverse direction, a rock and the like collector 500, and a light debris collector 700 having a filter through which substantially all of the return water passes to be filtered before returning to the pump. In addition, the preferred embodiments of this invention can also include a fine silt removal apparatus 800. This system, as further discussed in detail with reference the preferred embodiments of the invention provides a superior means for removing debris from potatoes and the like and for separating other items based upon terminal velocity of materials in a liquid environment.

As shown in FIG. 1, the tank 100 includes, in a preferred embodiment, opposite side walls 110 and 120, a rear wall 140, and an inclined front wall 130. In addition, the tank includes a bottom wall 145 connecting each of the walls 110, 120, 130, 140 so as to form a liquid-tight enclosure for containing liquid—preferably, water and the like. The tank can include support beams 150 to create a support frame F for maintaining the structural rigidity of the system. The tank 100 and beams 150 are preferably made of metal, or another strong material, so as to ensure structural rigidity.

As also illustrated, the device can include wheels 160 for transportation to a particular site location. Although two wheels are illustrated in FIG. 1, it should be understood that the opposite side of the vehicle should also include wheels. Alternatively, the device can include additional wheels, or can use only three wheels. The device can include a trailer hitch H for pulling the debris eliminator such as with a tractor or the like. The invention can also be easily adapted to be used like a common trailer behind a road vehicle for easy transportability. The wheels at one side of the apparatus are preferably mounted to pivot so as to allow the device to turn appropriately. For example, the wheels at the right side of FIG. 1 can be mounted to pivot via a swing arm 165 which can pivot with respect to the frame F.

As shown in FIG. 1, the wheels are preferably mounted—e.g., on the frame F or tank 100—via a mechanism for raising or lowering the tank 100 with respect to the wheels (only one mechanism is illustrated in FIG. 1). In this manner, the tank 100 can be maintained at a particular orientation, e.g., horizontal, on an irregular ground surface. The tank can, thus, be lowered to the ground if necessary. The exemplary mechanism shown in FIG. 1 includes a hollow cylinder 162 and an internal rod 161 which is telescopically received in the cylinder 162. A locking means, such as a locking pin, and a lifting means, such as a screw shaft (e.g., operated via a rotated handle 164), a hydraulic jack, etc., can be used to raise and/or lower the tank.

Figure 2:
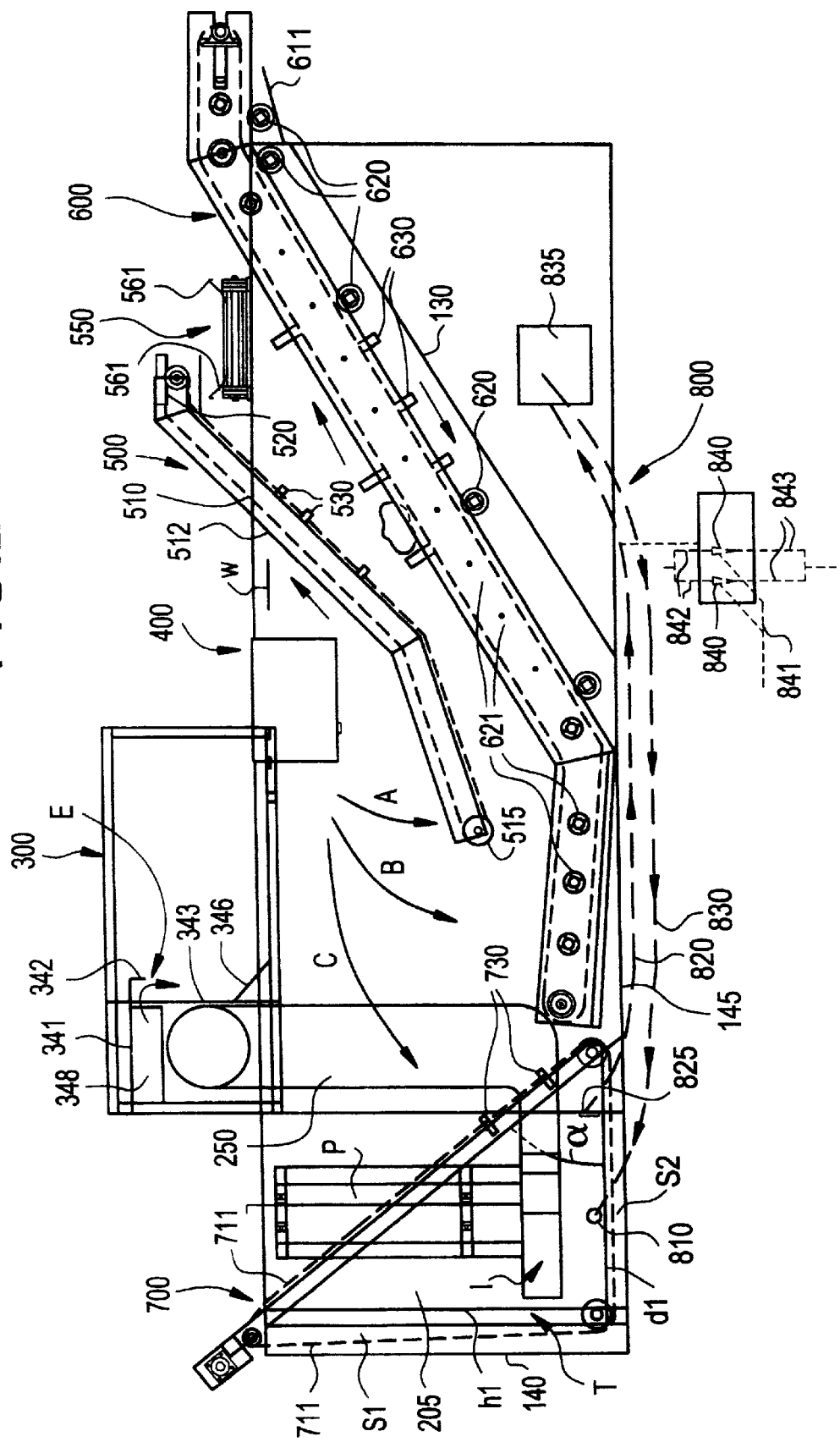
FIG. 2 is a side view of a debris eliminator according to the invention which is similar to that shown in FIG. 1.

As shown in FIGS. 1 and 2, the pump enclosure 200 extends the height of the tank and, in essence, is an generally rectangular enclosure which communicates with the tank only through a large triangular opening 205 (shown in FIG. 2) in the wall 120. The pump enclosure 200 is formed with side walls 220, 230 and 240. Water from the tank 100 enters through the triangular opening 205 and is pumped from the pump enclosure 200 to an upper portion of the tank 100 via the duct 250. The intake into the pump leading to the duct 250 is located above the bottom of the pump enclosure, and higher than the bottom of the triangular opening 205. For example, the intake I can be about 1 foot above the bottom of the triangular opening. In this manner, any sand or silt within the water will remain below the pump intake I within the pump enclosure. The duct 250 extends from a lower portion of the side wall 230 of the pump enclosure along the outside of the tank 100 to the side of the water discharging flume 300. The duct 250 can be arranged in a variety of ways. Preferably, the duct 250 is large enough to relatively freely allow over about 6000 gallons per minute ("G.P.M.") to pass therethrough.

Figure 4A:
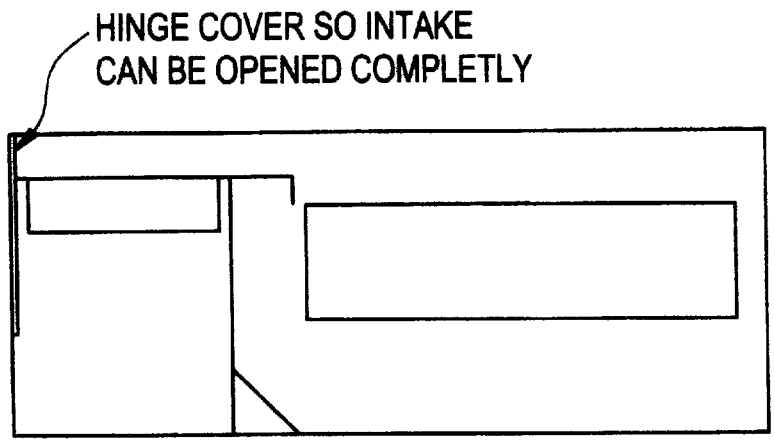
FIGS. 4(A) and 4(B) are a side cross-sectional view and a perspective view, respectively, of a flume element according to one embodiment of the invention.
Figure 4B:
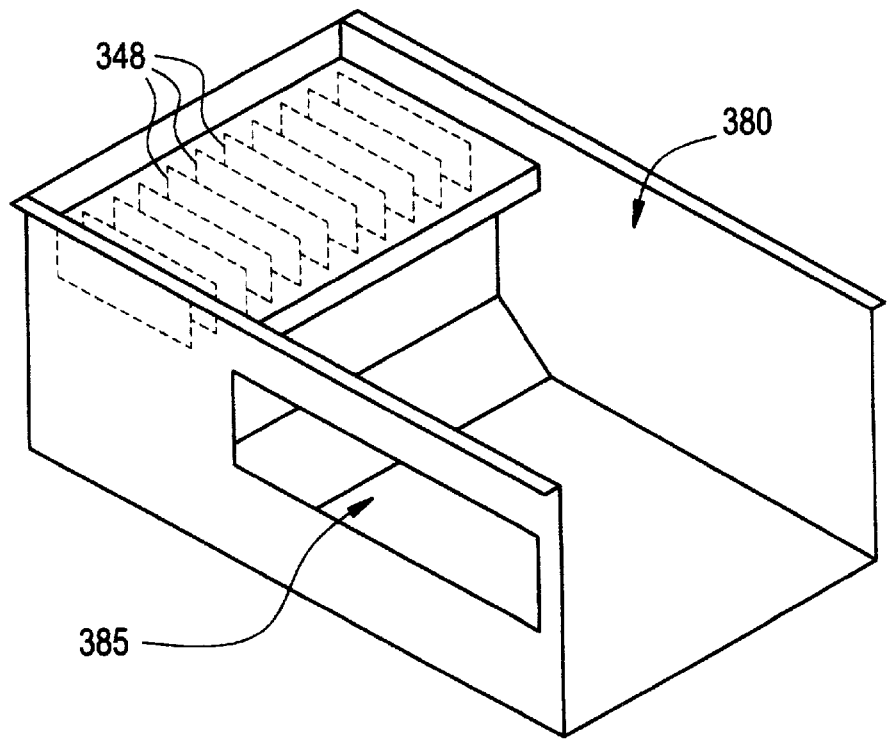

The water discharge flume 300 preferably includes a front opening 330, a back wall 340, two water-guiding sidewalls 310 and 320, a floor surface 315 and a water receiving tank 345 adjacent to the back wall 340. Water is pumped from the pump enclosure 200, through the duct 250 and through an opening 325 into the receiving tank 345. The receiving tank 345 preferably includes a top wall 341, a downwardly extending lip 342, and a front wall 343 over which the lip 342 extends. The top wall 341 is spaced above the top of the front wall 343 in order to create a space E for the liquid in the tank to flow out and into the flume area and to be guided by the sidewalls 310 and 320 into the tank 100. Although the FIGS. illustrate the lip 342 as being relatively short, it is contemplated that the lip can be formed so as to extend downward a greater portion of the front wall 343 to guide the water toward the bottom of the flume. In order to facilitate fluid flow, an angled plate 346 can also be included at the lower edge of the front wall 343 which extends down to the floor surface 315 of the flume. As shown in FIG. 4(A), the top wall 341 is preferably hinged so as to allow easy access into the tank 345. In order to break up the fluid flow—e.g., to cause turbulence, to raise the water level in the flume, and/or to slow down flow—it is also desirable to include a water baffle 347 as shown in FIG. 1 (baffle not shown in FIG. 2). As shown in FIGS. 2, 3, 4(A) and 4(B), the tank can include a number of fins 48 in order to guide liquid flow into the flume.

The flume 300 serves as an area for receiving the contents to be separated. For example, potatoes can be conveyed into the upper opening 380 of the flume 300—in any known manner—and the circulated water can draw the contents through the system. Alternatively, an opening 385 can be formed in a side of the flume for conveying the produce therein at a lower level, see FIGS. 3 and 4(B). In another alternative construction, the flume can be movable above the tank via a lifting mechanism (not shown). Any known lifting mechanism can be used to raise the entire flume, or to only raise the discharge end of the flume, such as hydraulic cylinders, screw shafts, etc. Raising the discharge end of the flume enables the flow of water through the flume to be slowed down, if desired. In this manner, the characteristics of the system can be changed as desired. In order to allow such movement, the duct 250 can include a flexible section allowing relative movement between the flume and the duct.

The water discharged through the opening 330 of the flume is caused to double back—e.g., to be redirected about 180 degrees—by the inclusion of a redirecting baffle 400. The redirecting baffle can be constructed in a variety of different ways, as discussed below with reference to FIGS. 1, 2, 3, 6(A) and 6(B). In the system shown in FIG. 1, the fluid flowing through the flume 300 passes over fingers 360 as the fluid enters the redirecting baffle 400. The fingers 360 allow the fluid to freely pass while preventing the potatoes and other contents within the water from dropping until after passing over the fingers 360. In this manner, the potatoes can be caused to follow a predetermined path of entry into the tank. As result, the potatoes can be made to enter the tank at or near the top of the water level.

Preferably, the water passing through the flume 300 has a relatively turbulent flow in order to facilitate separation of the potatoes from the debris. On the other hand, once the water is redirected in the leftward direction by the baffle 400, the water will preferably have a smoother flow, e.g., a more laminar flow. In the illustrated embodiment, the exit opening E out of the tank 345 provides a high velocity flow through the flume, such that the water exiting the tank assumes a relatively low profile within the flume 300. The use of the baffle 347 helps to slow the flow within the flume and to create a less stream-line flow along the bottom 315. When the water passes into the redirecting baffle 400, the flow path preferably opens to a substantially larger area. As a result, the flow rate preferably slows down considerably within the tank.

An important aspect of the preferred embodiments of the present system involves that it is capable of directing a substantial amount of fluid through the system. In the preferred embodiments, flow rates of over 1000 to 2000 gallons per minute per foot width and preferably of about 6,000 gallons per minute total—or more—can be directed through the system. These high flow rates enable the product within the system to be very quickly separated. For example, the time period for a potato to be discharged into the flume 300, directed around the baffle 400, and fall on the conveying means 600 can be a matter of seconds. The use of high flow rates also allows the ratio of the product introduced into the system to the water flowing through the system to be greatly reduced. In this manner, the effect of the introduced product upon the flow of the fluid system will be minimized. Where large quantities of produce are introduced into the system without such high flow rates, the produce can potentially affect the flow characteristics of the water or other liquid—thus, decreasing the performance of the system.

As noted, the baffle 400 can be made in a variety of ways to redirect the flowing water. A first embodiment of the baffle 400 is illustrated in FIGS. 1 and 3. In this embodiment, the baffle includes two opposing side members 410 and 415, a front plate 430, and a downwardly inclined lower plate 450 (shown in FIG. 3). In this manner the baffle has an open front end 405 into which the water passes. As shown in FIG. 1, a plurality of fingers 360—as discussed above—can be used in order to ensure that the product will flow into the baffle region at a predetermined level in the water. Similarly, fingers 460 (FIG. 3) can also be used at a lower end of the baffle 400 in order to ensure that the product is released in the water within the tank at a predetermined level while allowing the water to pass through the fingers. Such fingers are illustrated by the line 460 in FIG. 3 and connect to the inclined face 450 of the baffle 400. In alternative embodiments, the surfaces 430 and 450 can be modified. Although the preferred embodiments are described below, the concave shape of the baffle can alternatively be made with a multitude of angled surfaces, curved surfaces, or even a single curved member. FIG. 2 shows a less preferred baffle 400' construction. Baffle 400' has a vertical surface 430' and a horizontal surface 450'. In addition, an angled plate 435' can be used to help guide the water around the baffle.

Figure 6A:
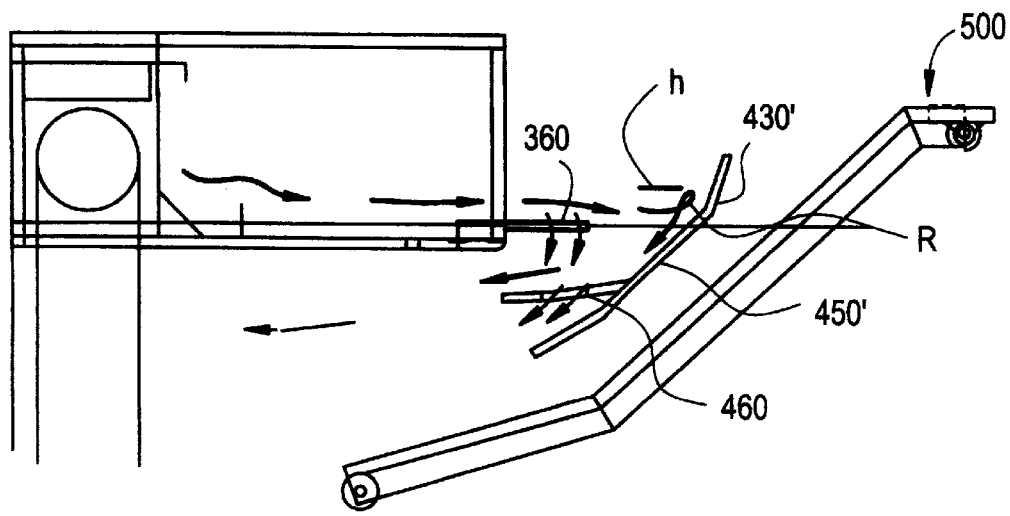
FIGS. 6(A), 6(B) and 6(C) illustrate alternative embodiments for the introduction of the products into the fluid that is circulated.

FIG. 6(A) illustrates a more preferable construction having a baffle 400". The baffle 400" is similar to that shown in FIGS. 1 and 3, however, the baffle 400" is more open, i.e., less concave. Most notably, the member 450" declines more than the member 450, such that the water more freely falls therethrough. In addition, as shown in this arrangement, the member 430″ inclines more than the member 430. The baffle 400″ is arranged so that the energy of the forward movement does not abruptly doubling back within the baffle. That is, it is preferably arranged in a manner to substantially absorb the movement of the water. As shown in FIG. 6(A), the fluid flow will potentially rise to a height H and then will drop to the interior of the tank as illustrated by the arrow R. When the fluid is redirected back to the tank, the product will follow a path above the fingers 460 while the fluid follows a path through and above the fingers 460. Preferably, fingers 360 are also included to ensure that the product follows a desired path upon the water. Accordingly, the produce will be discharged into the smooth flowing fluid in the tank at a predetermined elevation, e.g., relatively near or at the top of the water in the tank 100. If desired, the baffle 400 can be mounted so that its angular position, height, and distance from the flume is adjustable.

Figure 6C:
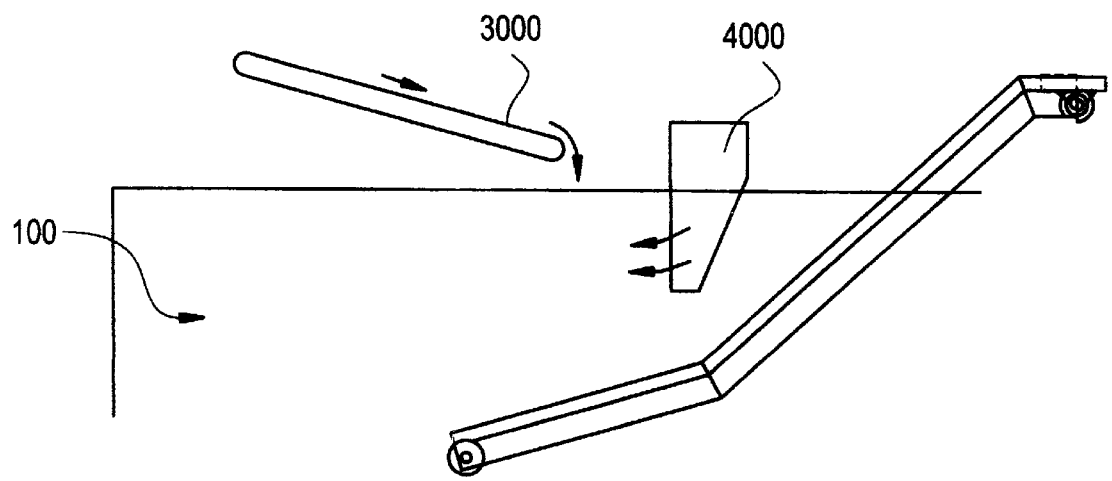
Figure 6B:
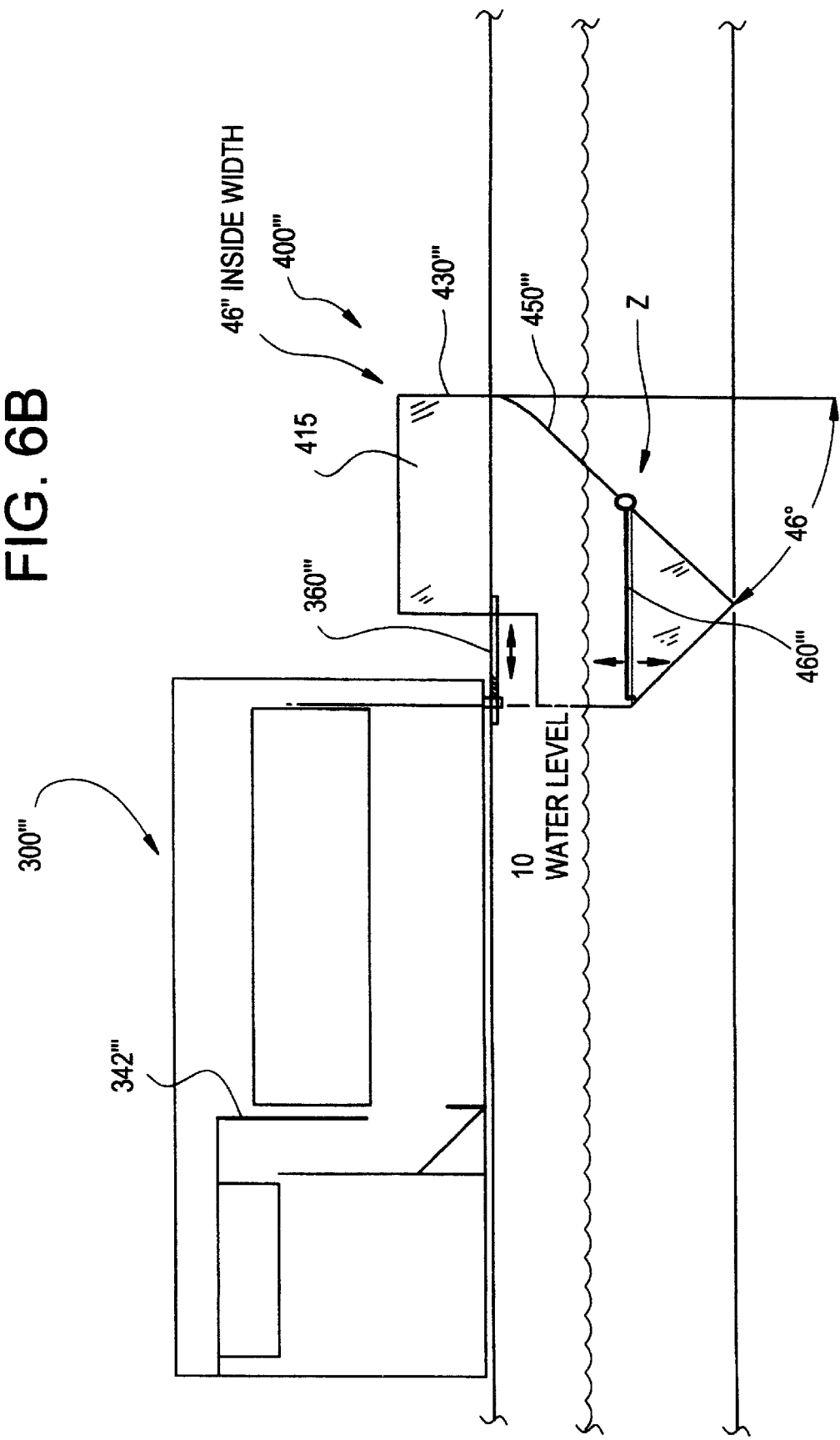

FIG. 6(B) illustrates a most preferred embodiment using a baffle 400′″ which is similar to that shown in FIG. 6(A). The baffle 400′″ is constructed so as to have dimensions approximately as labeled in FIG. 6(B). The dimensions illustrated being in inches. In this manner, when a flume having dimensions as shown in FIGS. 3–4 is utilized and flow rates of over 5000 G.P.M., or even over 6000 G.P.M., are used, the flow of the system will operate very well. The angle of about 46 degrees shown in FIG. 6(B) is chosen because it matches the angle of the rock conveyor in the preferred construction. In this manner, the clearance over the rock conveyor is maintained constant, while the water is allowed to freely flow into the tank. It should be understood that the angle of the rock conveyor and/or of the side 450′″ can be changed depending on circumstances. In the most preferred embodiment, the rods 460′″ are pivotally mounted at Z so as to be angularly adjustable within the baffle 400′″. In another preferred embodiment, the rods 360′″ are slidably mounted so as to be moved horizontally towards and away from the flume. In this manner, the system can be readily adjusted as desired. It is noted that this preferred embodiment also illustrates the use of an elongated lip 342′″ within the flume 300′″.

The above-described systems can be utilized to separate various items having different terminal velocities in fluids. When, for example, potatoes are placed within the flume 300 along with debris, the potatoes and debris will be redirected within the baffle 400 (i.e., 400, 400″, 400′″) and into the tank 100. In this manner, as shown in FIG. 2(A) items having a substantially higher density and a higher terminal velocity—i.e., product that will fall vertically at a higher rate—will follow a path A to a high density collector 500, (B) potatoes having an intermediate density and terminal velocity will follow a path B to a potato collector 600, and (C) lighter debris—such vines, leaves, plastic materials, twigs and the like—will follow a path C to the debris collector 700. The collector 500 preferably includes a baffle 1500 in order to delineate a position at which items will be retrieved onto the collector 500. As discussed further below, the baffle 1500 can help create an upward flow A' to enhance separation characteristics of the system. The collector 600 preferably includes a similar baffle 1600 in order to delineate the position at which potatoes will be retrieved (see FIGS. 3, 7(A) and 7(C)). The details of these baffles are discussed further below. The collector 500 is preferably arranged to receive rocks and other high density items. It should be apparent that where rocks and the like are not present, e.g., depending on soil type, the rock collector 500 can be omitted. Nevertheless, a collector 500 is included in the preferred construction of the apparatus. The collector 500 preferably includes a conveying system which utilizes a conveying belt to convey rocks and the like out of the tank through the water surface W and onto a rock collector 550. In the preferred embodiments, as illustrated in FIG. 1, the rock collector 550 includes a conveyor belt 560 extending transverse to the longitudinal axis of the tank. The conveyor belt 560 conveys the collected rocks over the edge of the tank where they can be collected by further conveyors or otherwise delivered to an appropriate location. In addition, channel guides 561 are preferably provided at the upper surface of the conveyor 550 in order to ensure that rocks do not fall off of the conveyor 560 into the tank 100.

The collector 500 preferably includes a conveyor belt 510 which rotates around support shafts 515 and 520. The conveyor belt 510 preferably includes a plurality of transverse rock pushing bars 530 distributed around the entire conveyor belt and separated by a distance of approximately, for example only, one foot (FIGS. 1 and 2). As shown in FIG. 3, guide rollers 535 (only one is illustrated) can be located below the conveyor belt in order to support the conveyor belt 510 from below. As also shown in FIG. 3, a motor 511 which rotates the conveyor belt can be supported by side frame members 512. The members 512 can also be used to support the shafts 515 and 520 and, thus, the belt 510. As shown in FIG. 3, the side frame members 512 preferably extend higher than the top surface of the conveyor belt 510 to prevent rocks and the like from falling off. The belt 510 can also be formed from a flexible flat sheet member which is generally free from holes to prevent rocks and the like from falling back into the tank 100. Nevertheless, drain holes (not shown) can also be added to the belt 510.

The collector 600 is preferably located at a position below the collector 500 and preferably extends from a position near the bottom of the tank to a location out of the tank in order to direct the potatoes out of the tank. As shown in FIG. 1, the conveying belt 610 preferably includes a plurality of slightly spaced cross bars 610 which are joined to form a conveying belt having open spaces therethrough. In this manner, water on the potatoes can be drained therefrom as the potatoes exit the tank, and water within the tank 100 can more readily flow through the conveyor belt. In addition, a plate 611 (shown in FIG. 2) can also be used to direct water back into the tank. The conveyor 600 also preferably includes a plurality of potato supporting and pushing cross bars 630 which are similar to the bars 530 used with the conveyor 500. The bars 630 are preferably made with a rubber or resilient material to avoid damaging the potatoes. The pushers 530 can be made with a plastic or a more rigid material. Similarly, the bars 610 can also be made with a flexible material or can include a rubber or the like protective outer layer. As shown in FIG. 2, the conveyor belt can be supported by a plurality of lower guide rollers 620. The upper surface of the conveyor can also be supported by similar guide rollers 621 which extend between the upper and lower surfaces of the conveyor belt. Although only a few of the members 630 are illustrated in FIG. 2, it should be understood that a plurality of such members can be distributed around the entire conveyor belt. As illustrated, the conveyor belts 510 and 610 are preferably constructed so as to have a) a generally flat initial region at which the rocks and potatoes, respectively, land on the belts 510 and 610, b) an upwardly inclined region extending to a position out of the tank, and c) a generally horizontal or flat region at which the rocks and potatoes, respectively, are delivered from the tank. In this manner, the rocks and potatoes can be easily conveyed out of the tank. For example, the relatively flat initial region upon which the rocks and potatoes land can help prevent the items from piling up at the lower region of the collectors 500 and 600.

As shown in FIGS. 3 and 7(A)–7(C), the collectors 500 and 600 can have baffle members 1500 and 1600 attached at their lower ends. The baffle members 1500, 1600 can create predetermined levels at which a) rocks will be directed to the conveyor 500, b) potatoes will be directed to the conveyor 600, and c) debris will be directed to the filtering system 700.

Figure 7A:
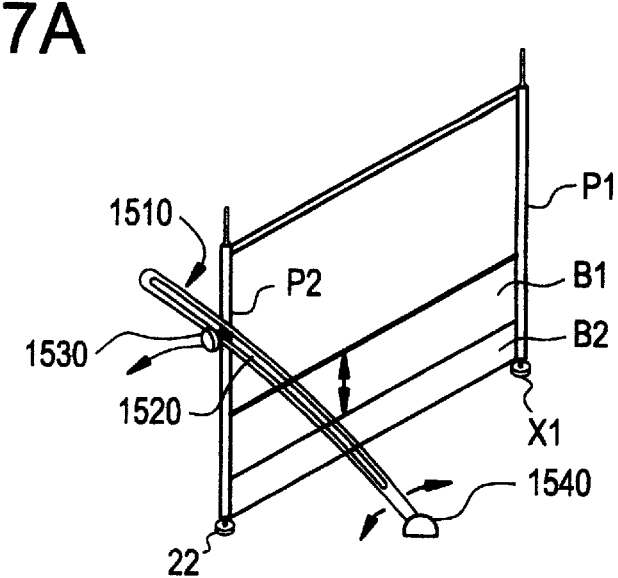
FIGS. 7(A)–7(C) illustrate various views of the baffles according to one preferred embodiment of the invention.
Figure 7B:
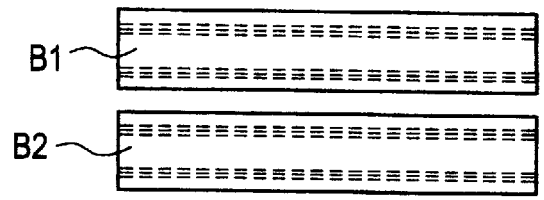
Figure 7C:
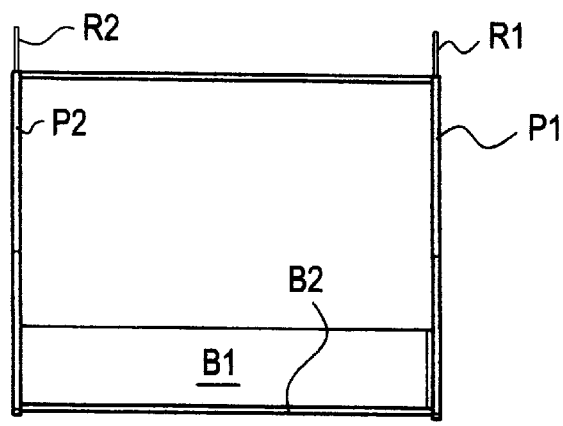

As best seen in FIGS. 7(A) and 7(B), baffles 1500 and 1600 are preferably made to be adjustable in height and to be angularly adjustable so as to pivot about their lower ends. The baffles 1500, 1600 can each be made with two separate baffle plates, e.g., such as plates B1 and B2. The plate B2 can be fixedly attached at lower ends of hollow pipes P1 and P2. Pipes P1 and P2 can receive rods R1 and R2 which are longitudinally reciprocated within the pipes P1 and P2. The lower ends of the rods can be attached to the baffle plate B1 so that the baffle plate B1 can be raised or lowered with respect to the baffle plate B2 by raising or lowering the rods. The lower end of the lower plate B2 can have a resilient strip that is in close proximity with the respective conveyor belt. As shown in FIGS. 7(A) and 7(C), the pipes P1 and P2 can include cut-out slot portions in the lower regions of the baffle B1 to enable connection to the rods R1 and R2. A fixing means (not shown) such as a detent mechanism can be used to locate the plate B1 at a particular height. In addition, the lower ends of the pipes P1 and P2 can be pivotally attached to the respective collectors 500 and 600—such as at the side frame members 512 of the rock conveyor. A latching mechanism can also be utilized to appropriately fix the baffle plates at a plurality of distinct angular positions, or at an infinite number of angular positions. A variety of methods can be used for latching the baffles in their proper angular orientation or at their proper height. For example, the rods could have resilient projecting tabs which are engaged at holes within the length of the pipes P1 and P2 so as to fixedly locate the rods at a particular height when the tabs are biased into the respective holes. Similarly, the side of the tank could also include similar holes or projections that would engage with similar outwardly facing holes or projections on the pipes P1 and P2 to fixedly locate the baffles at a particular angle. FIG. 7(A) shows one exemplary structure for fixing the angular position of the baffles. This example includes a pivotable shaft 1510 having a lengthwise slot 1520. A tightening member 1530, such as a bolt, can be located within the slot 1520 in order to enable the device to be fixed at a desired angle. When the tightening member is released, the baffle and the shaft 1510 can both be pivoted. When a proper angle is achieved, the tightening member can lock the baffle in place.

The present system can, thus, be readily adapted to separate a variety of items. For example, the device can be readily adapted to be used with potatoes, sweet potatoes, radishes, and the like.

Depending on the velocity of the water flowing through the tank, the depth of the baffle 400, and the height and placement of the baffle 1500, an upward flow path A' (shown in FIG. 3) can be created as the water exits the open end of the redirecting baffle 400 and flows toward the baffle 1500. This upward flow A' can facilitate separation of the potatoes from the rocks—magnifying the characteristics of the system. In this manner, potatoes can be further lifted by the upward flow A', while rocks and heavier debris continue downward and are not as readily moved upward by the upward flow A'. As should be clearly understood, the ability to achieve this upward flow is not required, but is possible in the preferred constructions of the system.

As shown in FIGS. 1–3, all of the fluid passing through the tank is finally directed through a large debris collector 700. The debris collector includes a filter—preferably a large hydro-sieve having a plurality of closely spaced parallel bars 711 which prevent debris from passing therethrough (FIG. 1). In one preferred construction, the parallel bars 710 have a width of about 0.09 inches and are spaced about 0.04 inches apart from one another such as to prevent debris having a diameter less than 0.04 inches from passing therethrough. In order to allow a large quantity of water to pass through the filter, the filter is preferably arranged to maximize its surface area. Preferably, the surface area allows over 5000 gallons of water to pass therethrough, and most preferably over 6000 gallons of water. For example, the surface area, with 0.09" wide bars and 0.04" gaps therebetween, is preferably over 3,500 square inches and more preferably over about 25 square feet. For example, the filter can be arranged at an inclined angle alpha (as shown in FIG. 2). The hydro-sieve, or filter, is preferably formed to cover substantially the entire front end of a triangular duct T which communicates with the triangular opening 205 extending to the pump enclosure 200. The triangular duct is, in essence, a duct extending across the width of the tank and having a triangular cross-section. As shown in FIG. 2, the triangular duct T has a vertical rear wall h1, a horizontal lower wall d1 and, except for the fluid passing through the hydro-sieve, is isolated from the interior of the tank 100. The triangular duct preferably extends across the entire width of the tank. The filter, thus, extends across the hypotenuse of the cross-section of the triangular duct T. A rear space S1 and a lower space S2 is preferably formed within the tank around the triangular duct. In this manner, a conveyor 711 can move around the perimeter of the triangular duct in a counter-clockwise direction, as shown in FIG. 2, so as to move debris up and out of the tank 100. The conveyor 711 should not cover filter surface, but should include cross members 730 which move along the surface of the filter or sieve in order to draw material out of the tank. As discussed and as shown in FIG. 1, the filter is preferably a hydro-sieve having narrow bars closely spaced from one another and extending in a generally vertical direction parallel to the movement of the members 730. This arrangement enables the members 730 to contact the bars 710 without substantial friction there between. When a semi-elastic material, such as a plastic, is used for the material of the cross members 730, the lower edges of the cross members 730 can slightly conform to the configuration of the sieve in order to extend downward into the gaps between the bars 710 to provide an enhanced cleaning function of the sieve.

It should be noted that due to the arrangement of the conveying system and the cross members 730 which are moved, in the preferred construction, behind the triangular duct T inside the tank, the system will not entangle any of the debris—such as vines—which move toward the filter surface.

In an alternate embodiment, the collector 700 can include a rotated screen conveyor belt made of a wire mesh that will continue around the path of the rotated belt 711. The rotated wire mesh screen can include similar cross members 730 fixed thereto so as to move with the screen around the triangular conduit. Additionally, the filter can be another fixedly located filter having a different construction—such as a fixed screen or the like.

After the water passes through the triangular duct and through the large opening 205 into the pump enclosure 200, it is then pumped through the duct 250 back into the system. In order to facilitate movement of the water, the opening 205 is preferably made as large as possible—e.g., a size substantially equal to the cross-section of the triangular duct.

The above described structure provides a unique and beneficial system for separating items based upon differences in specific gravity and terminal velocity. The system also enables a substantial amount of fluid flow so as to accommodate a large quantity of products to be separated. The system can also operate on an existing liquid without appreciably adding new clean liquid thereto. Accordingly, the present invention has substantial benefits over the existing devices. In the preferred construction of the device, the cross members 630 on the conveyor 600 and the cross members 730 conveyed around the filter 700 are situated to contact or to closely follow the inner walls of the tank—such as the wall 140, the bottom of the tank, and the wall 130. This arrangement will draw any debris which may fall into the system to a lower position between the front face of the filter and the lower end of the collector 600. In this manner, any such debris can be continually removed from the system by being directed to the lower portion of the filter where it can be drawn up and out of the tank.

The location of the pump enclosure and the opening 205 creates a situation wherein the velocity of the fluid entering the pump enclosure adjacent to the opening 205 is greater than the velocity of the fluid at the far end of the tank adjacent to the wall 110 within the triangular duct. This creates the possibility that silt, or other fine particles such as sand, can be accumulated within the triangular duct at the side adjacent to the tank wall 110. In order to prevent the accumulation of such silt, any water which is recirculated into the system can be made to enter the system at a location 810 (shown in FIGS. 1 and 2) so that it is directed into the triangular duct at the lower end thereof adjacent to wall 110 of the tank. The returned water can be used to push away any silt along the bottom of the triangular duct.

In order to even further enhance the system's cleanliness and ability to operate without the addition of substantial amounts of new fluid, e.g., water, into the system, the system also preferably includes a means 800 for the further removal of silt, sand, and other fine particulate material and for recirculating water therewith to the system. For example, the system can include a pipe 820 which extends from a lower portion of the pump enclosure 200 below the duct 250 to remove fine particles along the lower floor surface of the pump enclosure 200.

The pipe 820 can lead from the hole 825 in the side of the pump enclosure (see FIG. 2) around the outside tank wall 120, to a processing system, and to a pump 835. A pipe 830 can then lead back to the tank at the location 810. The recirculated water can be used, as discussed above, to direct the silt away from the lower edge of the triangular duct. Before the silt-bearing liquid is directed to the pump 835 through the conduit 820 the silt-bearing liquid can, thus, be treated in order to remove the silt from the liquid. The liquid can then be recirculated back into the tank—such as through the opening 810—and only a small quantity of liquid along with the removed silt should be discarded. Any known method for removing the silt from the liquid can be employed. Additional pumps and pipes can also be used. An outside water source (not shown) can also be connected to the pipe 830 to accommodate any fluid lost due to the removal of the silty material. In a most preferred embodiment, a plurality of hydro-cyclones 840 are used in order to remove the silt from the liquid. The water is introduced through an input conduit 841 and circulated within the hydro-cyclones. Within the hydro-cyclones, clean liquid is forced upward through the conduits 842 and the silty material along with a small quantity of liquid is discharged through the bottom via conduits 843. As should be understood from the Figure, the conduits 841 and 842 could be connected within the piping 820 leading to the pump 835. In a most preferred embodiment, five hydro-cyclones are included. In this manner, a substantial flow rate can be maintained in order to remove silty liquid and to return a large amount of liquid back into the system. In the most preferred embodiment, the liquid reintroduced at the position 810 will be introduced through about a three inch nozzle at about a rate of 250 gallons per minute—each of the hydro-cyclones being capable of processing about 50 gallons per minute.

The present system can be operated without adding substantially any new liquid, e.g., water. The system can be constructed to require only an additional five gallons per minute to balance out liquid discharged from the hydro cyclones—each hydro-cyclone receiving 50 gallons per minute and discharging approximately 47–49 gallons per minute of cleaned water through the piping 842.

As noted above, an important aspect of the preferred embodiments of the present system involves that it is capable of directing a substantial amount of fluid through the system. In the preferred embodiments, flow rates of over 5,000 gallons per minute and preferably of about 6,000 gallons per minute—or more—can be directed through the system. These high flow rates enable the product within the system to be very quickly separated. For example, the time period for a potato to be discharged into the flume 300, directed around the baffle 400, and fall on the conveying means 600 can be less than approximately one second. The use of high flow rates also allows the ratio of the product introduced into the system to the water flowing through the system to be greatly reduced. In this manner, the effect of the introduced product upon the flow of the fluid system will be minimized. Where large quantities of produce are introduced into the system without such high flow rates, the produce can potentially affect the flow characteristics of the water or other liquid—thus, decreasing the performance of the system. In order to handle the quantity of produce and water flow desired, the apparatus—in one exemplary construction of the preferred embodiments—can be formed with approximately the dimensions labeled (numbers being in inches) in FIGS. 3, 4(A)–4(B), 5(B), and 7(A)–7(C). FIGS. 3, 4(A)–4(B), 5(B), and 7(A)–7(C) illustrate an exemplary construction which is generally to scale. For that embodiment, the approximate dimensions of other parts illustrated, such as the redirecting baffle 400 and the conveyors—although not necessarily labeled—can be proportionally determined in the FIGS. However, a more preferred construction of the baffle, which can be included with the other noted dimensions of the system, is that illustrated in FIG. 6(B). As should be apparent to those skilled in the art, the illustrated embodiments—although preferred—are exemplary only and various modifications in sizes, etc., can be made without departing from the concepts of the invention.

In one preferred construction of the device, a master control panel M (FIG. 1) can be included which has, for example, a master cut-off switch, and switches for operating each of the conveying systems and pumps. As shown in FIG. 3, the conveyors 500, 600, and 700 can include respective motors 511 (shown only with conveyor 500) mounted locations above the tank. Similarly, the pump can include a motor (not shown) supported above the pump enclosure 200 with a drive shaft (not shown) extending downward to the pump mechanism—e.g., to rotate turbines or the like. In this manner, the conveyors, pumps, etc., can be individually operated as desired. Alternatively, one or more of the motors can be eliminated if appropriate coupling mechanisms are used, e.g., so as to drive one or more of the conveyors, etc., with a single motor.

FIG. 6(C) illustrates an alternative embodiment wherein the water is not caused to double back as in the embodiments discussed above. In this alternative embodiment, the water is introduced into the tank 100 through a duct 4000 which extends into the water line—either from above the tank or from a side of the tank—and discharges water circulated by the pump P in the direction shown by the arrows in FIG. 6(C). In order to direct the products into the liquid, a conveyor belt 3000 can be utilized which directs the product into the water at a particular location in front of the duct 4000. As with the above described embodiments, the product can be introduced on the conveyor 3000 by using any known means such as conveyors or other means to distribute such product. This latter embodiment does not have the same separation capabilities, such as due to the turbulence created within the flume 3000. In addition, the costs for running and implementing the conveyor 3000 can be higher. However, this latter system requires less power to operate because the water is not lifted to a level above the water line in the tank. The duct 4000 can have a diffuser with a number of holes, elongated openings, or a single exit port extending across a substantial portion of the width of the tank in order to direct fluid leftward in FIG. 6(C). Although not illustrated in FIG. 6(C), this embodiment should be constructed like the embodiments discussed above—for example, the potato collector 600, the debris collector 700, and the pump enclosure 200, etc., can be like that discussed above. Of course, the duct 250 will be altered to direct liquid into the duct 4000.

Although the present invention has been described a being applicable to water or other liquids, the present invention has particular advantages and desirability when used with water. Although less desirable, other liquids could be potentially utilized—or the water could potentially have other elements therein. For example, the water could include a brine or saline solution. Among other things, this could be used to alter terminal velocities of products separated therein.

Among the many benefits of the present system, the system allows debris to be removed from a desired product—such as potatoes and the like—creating very significant advantages in the form of lower labor costs, lower water consumption, higher capacity and the ability to handle greater amounts of product, improved separation accuracy, lower power requirements, and less environmental concern than existing equipment.

Because the present system can recycle a substantial amount of the liquid, e.g., water, within the system, the detrimental effects of discharging liquid into an outside water source such as a lake or river will be substantially eliminated. When dirty liquid is discharged into outside water sources, among other environmental hazards, debris within the tank can result in the build up of algae and bacteria which digest the debris and which deplete the oxygen supply in the outside water source. This can be problematic if a substantial amount of the water is not recycled but merely discharged into such a water source. In addition, because the present invention can operate with only a small amount of water added to the system per minute, the system does not have to be specially implemented in an area where a substantial water source can be found in order to fulfill the needs of the system. Accordingly, the present invention—which preferably includes wheels for its transportability as discussed above—can be brought to any desired location. This can be especially beneficial for use at farm sites and at locations which do not require such a device for the entire year, but which require such devices during specific seasons. This type of system could also be shared by a number of farmers and/or could even be rented for particular time periods with relatively simple delivery and set up time. The adaptability of the present device to various products enables it to be utilized at various locations for various purposes—creating a very versatile device.

The present invention as described with reference to the preferred embodiments, has particular advantages in the separation of debris from produce such as potatoes and the like—easily separating vines, grass, wood, plastic, defective potatoes, such as hollow heart potatoes and dry rotten potatoes, and rocks (when a rock conveyor is included) from the desirable potatoes. At the same time, the present invention can reduce water loss and can enable the system to be maintained cleaner and freer from contaminants such as potato skins, grass, and other debris larger than the holes in the hydrosieve thus minimizing algae and bacteria.

2. Embodiments of FIGS. 8–24:

FIGS. 8–24 illustrate improved embodiments of the invention having improvements over the embodiments illustrated in FIGS. 1–7. In addition to being able to have the benefits of the above-noted embodiments, the following embodiments have additional benefits as discussed below.

Figure 8:
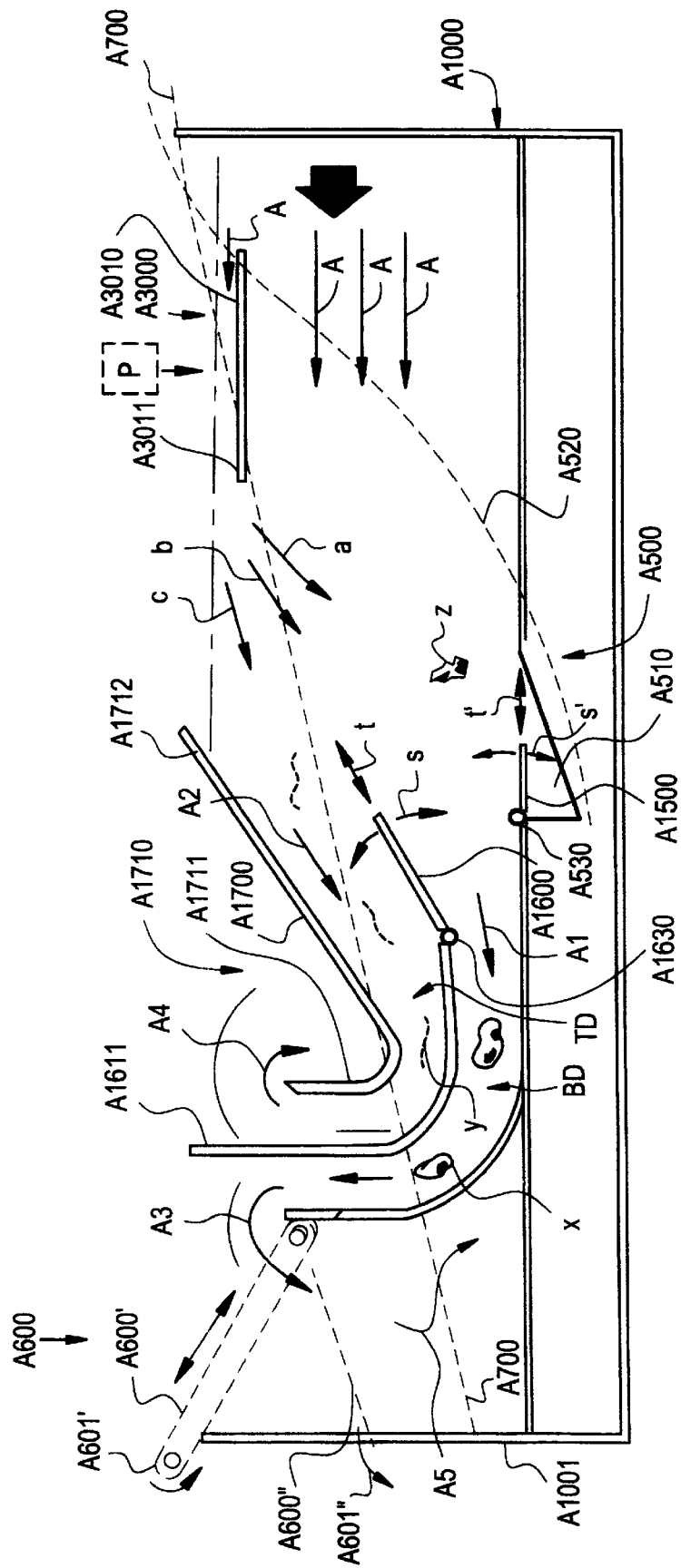

A. Basic Embodiment:

FIG. 8 illustrates a basic embodiment wherein water is caused to flow across a tank A1000 in a direction A. The water current is established via a pumping means or the like. As shown in FIG. 8, product P is placed on a generally horizontal wall A3010 of a receiving flume A3000. Water flowing over the wall A3010 moves the product over the edge A3011 into a separation chamber. Heavy items follow a first path a, intermediate items follow a second path b, and light items follow a third path c. A central divider A1600 separates the flow, creating a lower flow path A1 into a bottom duct BD and an upper flow path A2 into a top duct TD. Preferably, the position of the divider A1600 is adjustable. For example, the divider A1600 can be pivotable about the point A1630 as shown by arrows s and/or extendable as shown by arrows t. The water flow in the separation chamber to the upper and lower ducts is preferably smooth, stable and straight for optimum separation accuracy. Preferably, approximately equal amounts of water are directed into upper and lower flow paths A1 and A2. However, the flows can be substantially different, depending on the amount of material expected within each duct.

The bottom duct BD receives items x (e.g., potatoes) and both (a) converges and (b) turns upwards. In this manner, the flow velocity is increased and the items x (e.g., potatoes) are conveyed upwards and discharged as shown at A3. Thus, the items x can be "conveyed" out of the water by the water itself. It is not necessary to extend conveyors or the like into the water. The items x can easily be collected after being discharged. For example, the items x can be deposited on a flow-through conveying means A600 which receives items x thereon and allows water to pass therethrough. In one preferred construction, the flow-through conveying means A600 is an endless conveyor belt A600' which rotates and conveys items x over the end A601' to be collected. In another embodiment, the flow-through conveying means A600 is an inclined wall A600" having openings for water to pass therethrough. In the latter embodiment, the end wall A1001 should have an exit port (not shown) to allow items x to be discharged at A601". Water passing through the flow-through conveyor A600 is preferably recirculated through a filter means for re-use. As shown, the water can follow a path A5 and be returned to the opposite side of the tank. Alternatively—although less preferred—new water can be continually pumped across the tank and then discarded.

Preferably, a conveyor filter A700 having a filter surface and a conveying means for moving debris along the filter surface is provided. Preferably, the water following the path A5 is directed through this conveyor filter A700 and then returned for re-use.

Light debris y follows an upper path A2 into the top duct TD which also converges and turns upward. In this manner, the light debris can also be relatively easily collected.

For example, the light debris can be directed along a path A4 where it can then be discharged. For example, the light debris can be discharged upon a conveyor filter A700. The conveyor filter A700 can be used to convey the items y out of the tank (e.g., at the right hand end shown in FIG. 8), while allowing water to pass therethrough.

In the most preferred construction, a heavy debris collector A500 is provided to receive heavy debris such as rocks and the like. Although less preferred, a heavy debris collector can be omitted. The collector A500 preferably includes a trap A510 for receiving heavy debris z. Preferably, an adjustable baffle A1500 above the trap A510 varies the entry position of items into the trap A500. The baffle can be pivotable in the direction s' around the point A530 and/or extendable in the direction t'. Preferably, the baffle A1500 is only extendable in the direction t' to avoid disturbing the water flow within the tank. Heavy debris z can then be conveyed via a heavy debris conveyor A520 out of the tank (e.g., out of the right side of the tank as shown).

In a preferred construction, the plate A1700 extends up to a position A1712 slightly below the level of the water in the separation chamber so that a small amount of water pours over the top of the plate A1700 and into the U-shape region A1710. Thus, very light floating debris, such as paper, etc., will merely float over the wall A1700, preventing this very light debris from piling up behind the wall A1700.

An extension of this concept is a plurality of ducts similar to the ducts TD and BD arranged such that the flow is divided into 3 or more ducts. The entrance to these ducts would have adjustable flow dividers such as A1600 and be arranged in a horizontal manner. The items then could be segregated by terminal velocity into the appropriate duct. Each duct would either discharge into a pump or over a wier in a similar manor to the flows A3 and A4. The water velocity in the ducts would need to be sufficient to convey the items therein along the duct and into the pump or over the weir. Since the lower ducts must convey items of higher terminal velocity, it would be preferred that the velocity of flow in these ducts are higher than that of the top ducts. A system of 10 or more such ducts is possible.

Figure 9:
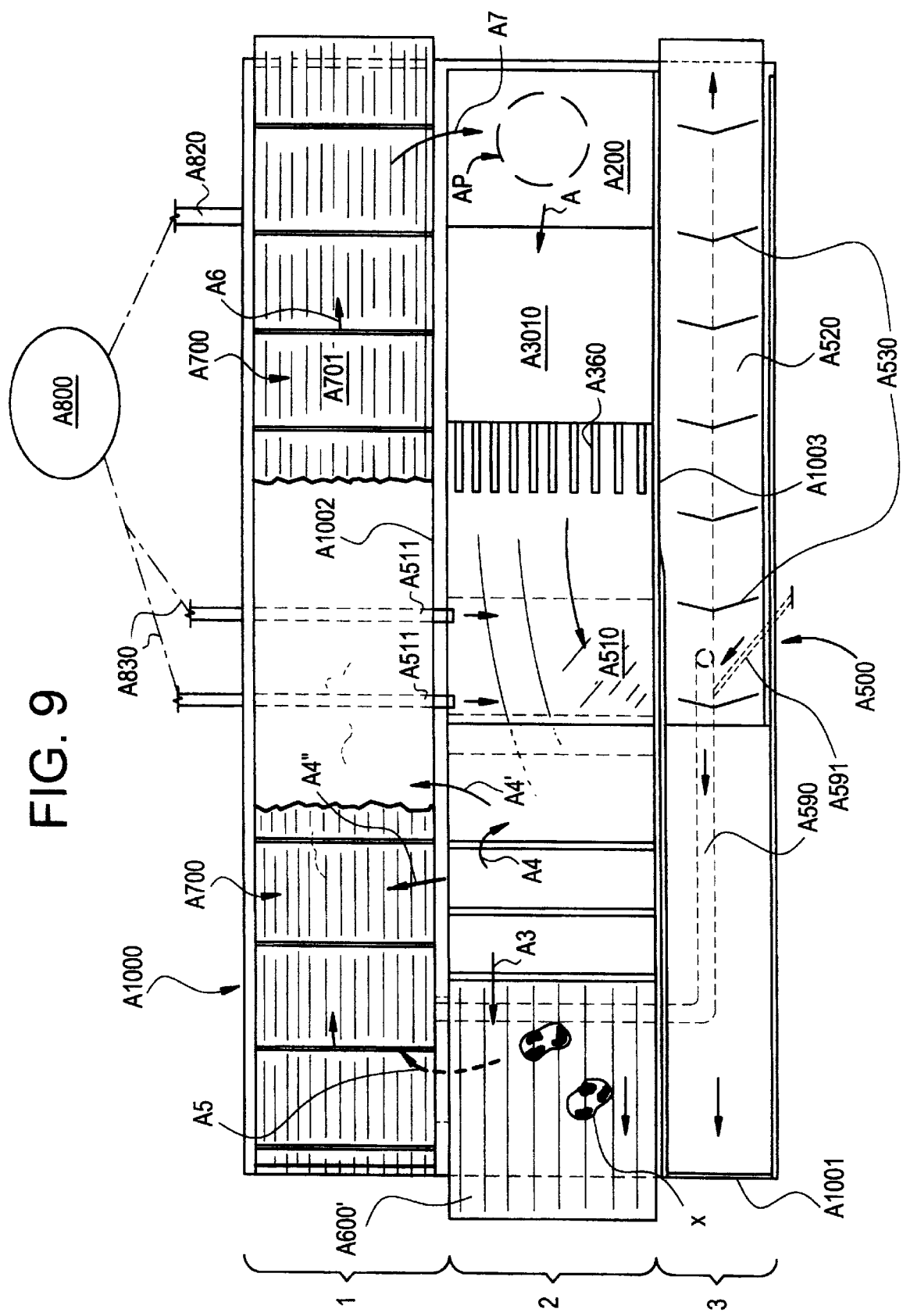

B. Embodiment of FIG. 9:

FIG. 9 shows one specific embodiment having features of the basic embodiment illustrated in FIG. 8. In the construction shown in FIG. 9, the tank A1000 is separated into a) a filter section 1, b) a separation section 2, and c) a heavy debris removal section 3. These three sections extend lengthwise within the tank and are separated from one another by walls A1002 and A1003. In brief, the filter section 1 preferably contains a conveyor filter A700, the separation section 2 preferably contains an input flume, a separation chamber, etc., and the heavy debris removal section 3 preferably includes a heavy debris conveyor A500. As noted, the first and second sections are separated by the partition wall A1002, and the second and third sections are separated by a partition wall A1003.

A pump AP is arranged to pump water leftward across the tank in the direction A. A variety of pump types can be used. The flume 3000 also includes a plurality of fingers A360 extending from the horizontal plate A3010. The fingers allow small rocks—that fit between the fingers—and the like heavy debris to pass therethrough to ensure that they are collected by the heavy item collector. That is, smaller rocks and the like will—in essence—have a head start, dropping earlier to ensure they fall to the heavy debris collector. In particular, heavy debris follows the path a into the trap A510. Preferably, the heavy debris is then laterally discharged through a hole in the partition wall A1003 onto the heavy debris conveyor A500. In order to enable the heavy debris to be laterally discharged to the conveyor A500, the bottom wall of the trap is preferably angled with the trap floor lowest adjacent the conveyor A500 and highest adjacent the partition wall 1002. If desired, this angle can be substantial enough to cause all items to slide down to the conveyor A500. In addition, means can be provided to ensure that the items z are moved laterally onto the conveyor A500. In the most preferred embodiment, at least one water jet A511 is situation to impart a high velocity water flow to move rocks and the like heavy debris onto the conveyor A500. As discussed below, the water jet(s) A511 are preferably return input flows from a water recycling means A800 which withdraws dirty water through a conduit A820 and returns the recycled water through conduits A830 to the jets A511.

The light items y follow the path c into the top duct TD under the angled wall A1700. After the light debris exits the top duct TD, the light debris and water continue along the path A4 over the upstanding rear wall A1711 and into the U-shape region A1710. Then, the water and light debris flow sideways along a path A4' through a hole in the partition wall 1002 to the top of a conveyor filter surface A701. Alternatively, the water can be horizontally discharged through a hole in the partition wall along a path A4"; however, when the cross-section of the top duct TD is rectangular as shown, the water preferably falls in the shorter direction A4. This helps to maintain a uniform water flow within the separation chamber.

Potatoes or the like items x follow a path A3 onto a conveyor A600'. The water conveying the items x passes through the conveyor A600' and then exits laterally along a path A5 over the top of the conveyor filter A700. The water conveying the items x and the items y passes through the conveyor filter A700 to remove debris therefrom. The filtered water is then directed along a path A6 beneath the conveyor filter and to the pump enclosure A200 via the path A7. The water is then again pumped in the direction of arrow A.

An alternate discharge for potatoes or medium density items in the bottom duct BD would be directly into a suitable pump. The duct BD leading to the pump is preferably located such that the items x flow directly into the pump suction. However, any manner of known ductwork or piping, such as a siphon over an obstacle, could be utilized. This pump would remove substantially all the flow typical for the duct BD for a given application.

Figure 10:
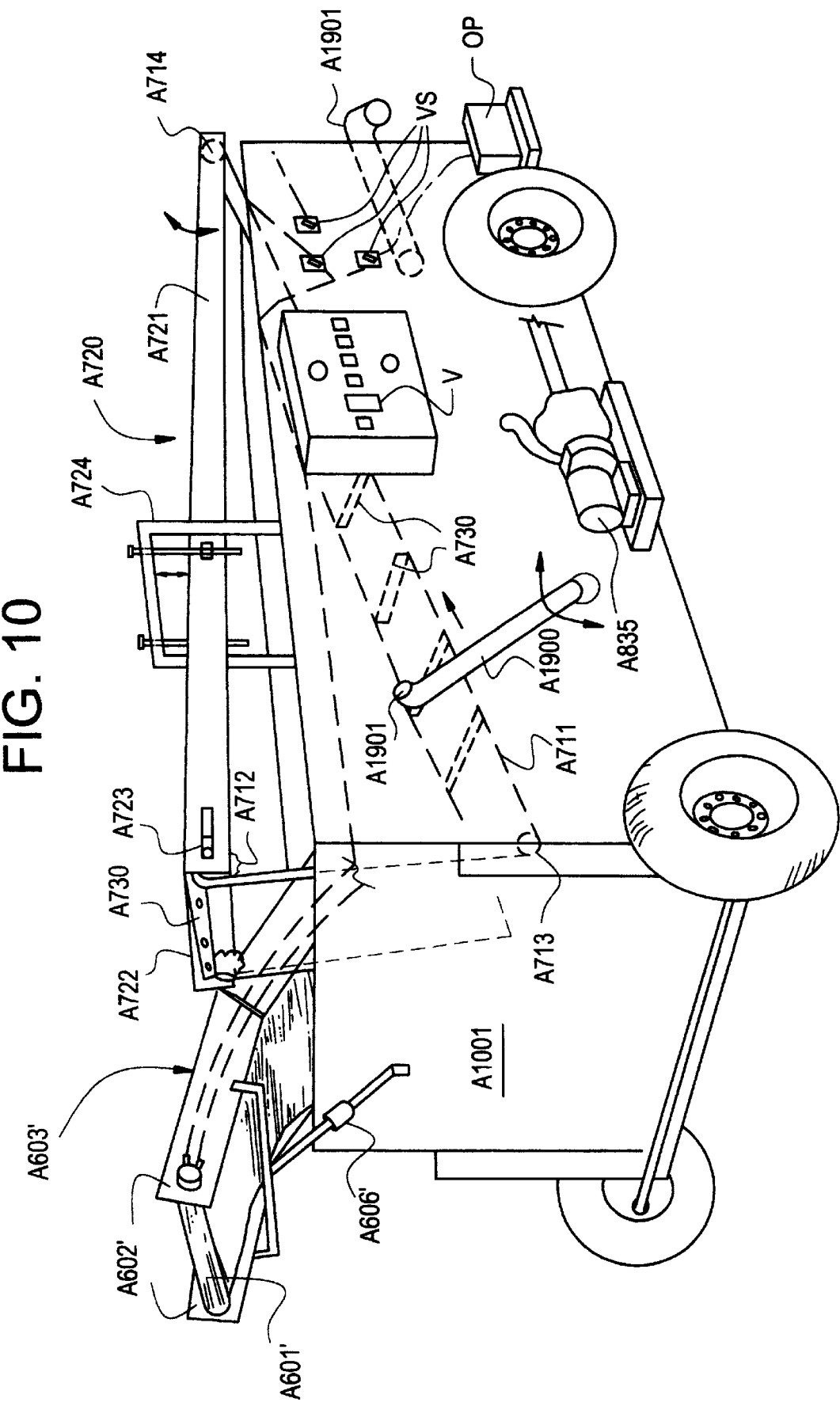
Figure 11:
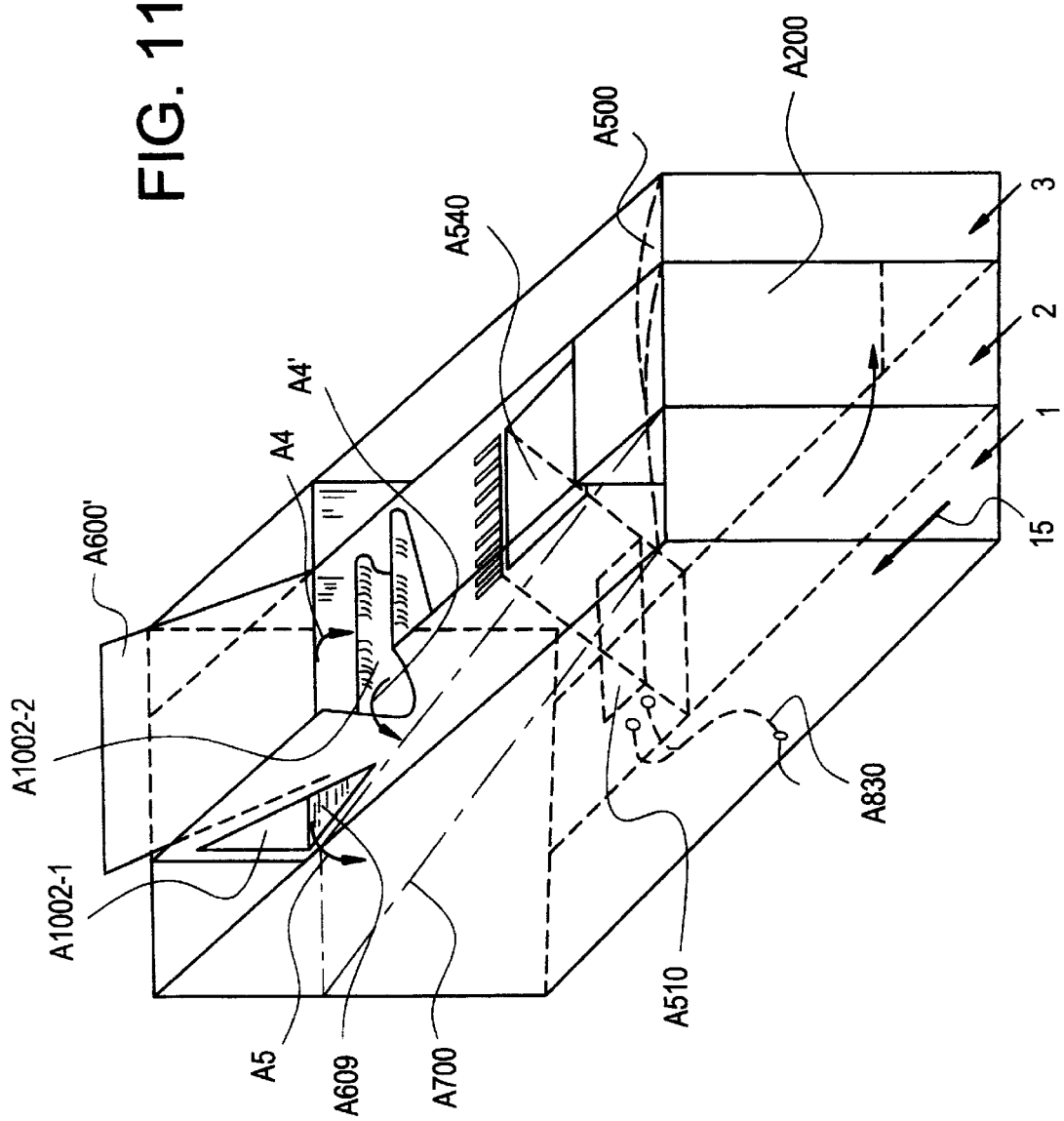

C. Embodiment of FIGS. 10–17:

FIGS. 10–17 illustrate a most preferred construction also having features of the basic embodiment illustrated in FIG. 8. FIG. 10 is a perspective view of the overall apparatus. This device is similar to that illustrated in FIG. 9. However, among other things, as shown in FIG. 11, the conveyor filter A700 and the conveyor A500 are located on reverse sides of the separation section 2.

Figure 12:
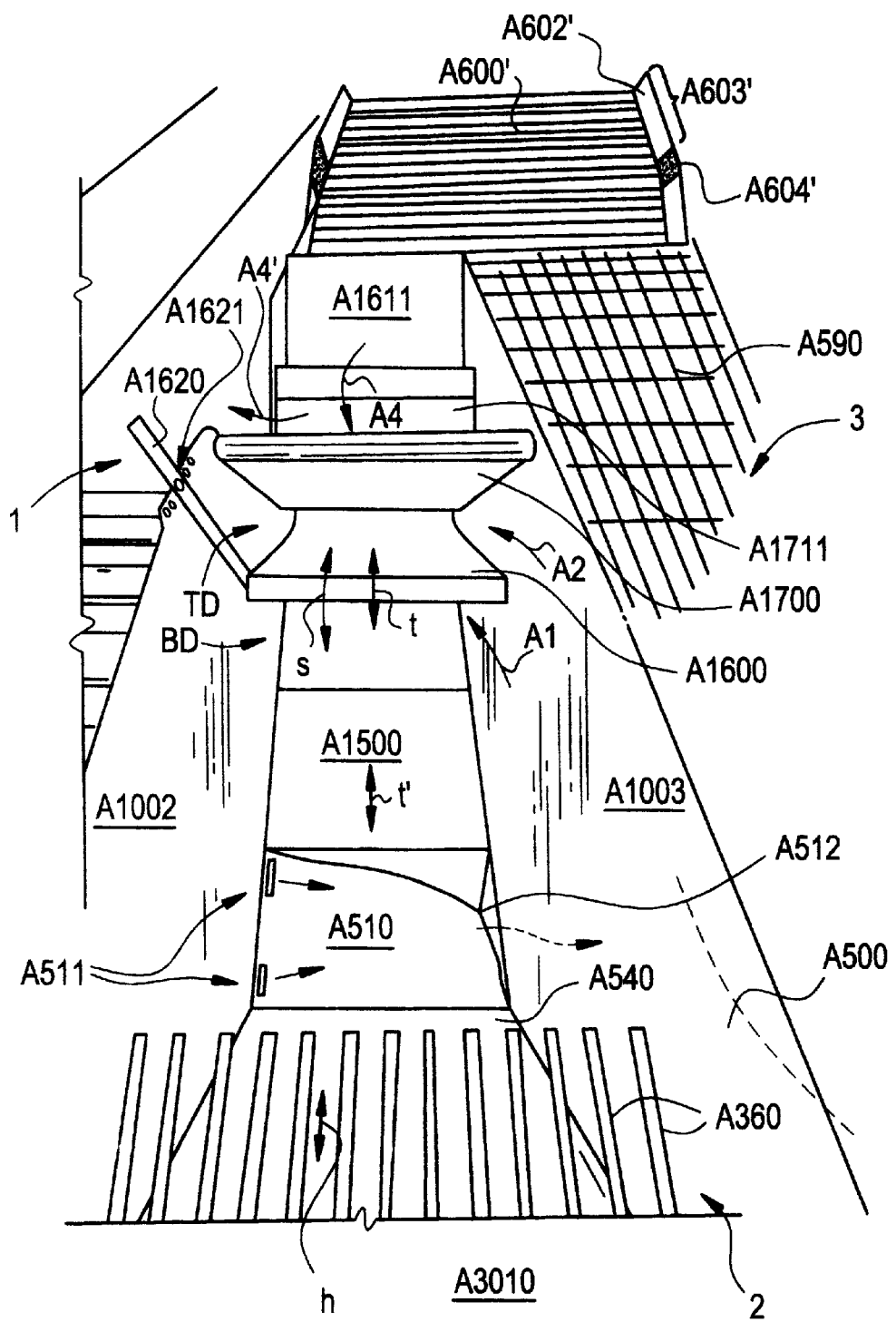

(1) Separation Section:

FIG. 12 is a perspective view showing the interior of the separation section 2. Fingers A360 are preferably adjustable in the direction of arrows h to vary the release position where items are released into the separation chamber. Preferably, the fingers are separated about one inch from one another and are about ⅜ inch in diameter. An angled perforated floor plate A540 extends from a position proximate the base of the fingers down to a position adjacent the trap A510. The plate A540 ensures that heavy debris falling at a steep angle enters the trap A510. The plate A540 preferably has a sufficient % open area to allow water to relatively freely flow therethrough, while preventing small rocks and the like from passing therethrough and/or from becoming trapped in openings of the plate A540. Preferably, the perforated flat plate has about a 50% open area, constructed with an array of holes having diameters between about ⅜ to ½ inches. Alternately, the perforated plate can be replaced within a screen, grate or the like member having appropriately sized openings and sufficient strength.

In the embodiment shown in FIG. 12, the baffle A1500 is horizontally slidable over the trap A510 in the direction of arrow t'. In addition, the position of the baffle A1600 is preferably adjusted using a handle A1620 and a locking mechanism A1621. The locking mechanism can include, for example, bolts (not shown) which connect between holes in both the handle A1620 and the partition wall A1002. The water following the path A2 flows upwards between the walls A1003, A1002, A1611 and A1711 and falls over the wall A1711 as shown by the arrow A4. Then, the water flows laterally as shown by arrow A4' through the opening A1002-2 in; the partition wall 1002 onto the filter surface A701 of the conveyor filter. In this illustrated embodiment, the items x are discharged onto a conveyor A600' behind the wall A1611.

FIG. 11 illustrates how water flows laterally from the separation section 2 to the filter section 1. A water flow path A5 leads through the opening A1002-1 in the partition wall 1002 beneath the conveyor A600', and the flow paths A4 and A4' lead though the opening A1002-2 in the partition wall 1002. The floor A609' below the conveyor A600' preferably does not extend below the bottom of the opening A1002-1 so that water and debris does not stagnate thereunder. Preferably, the floor A609' slopes down towards the filtering section 1 to facilitate flow thereto.

As shown in FIG. 12, the conveyor A600' is preferably wider than the width of the separation section 2. In this manner, the items x are easily distributed on the conveyor A600'. The conveyor A600' preferably includes sidewalls A602' which prevent items x from falling off. Preferably, a distal section A603' of the conveyor A600' is pivotable to adjust the height of the end A601'. The sidewalls A6021 can include a flexible section A604' to accommodate such movement. In the embodiment shown in FIG. 10, the distal portion A603' of the conveyor A600' can be adjusted, for example, via a screw jack A606'.

The lowermost end of the conveyor A600' is preferably at an elevation above the water level therebelow. As a result, any bearings or the like associated with the conveyor A600' do not have to be submerged beneath the water surface. This arrangement reduces problems associated with submersion that can result in increased costs and/or undue wear on the system. A flap F, shown in FIG. 14, can also be used to help reduce water contact with bearings, etc., of a lower pulley (not shown) of the conveyor A600'. The flap F is also useful for distributing tubers onto the conveyor A600'.

Figure 14:
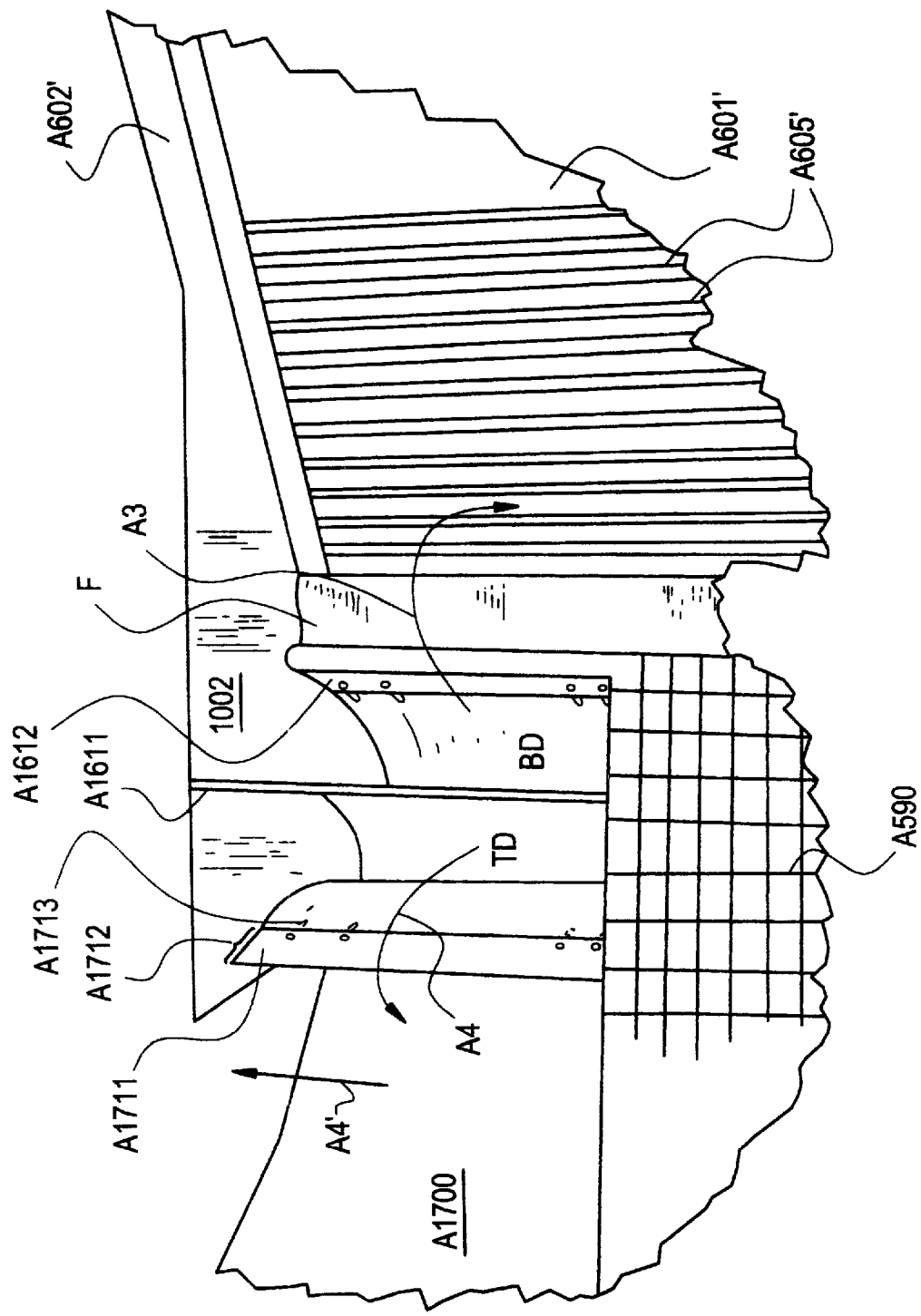

FIG. 14 is a top perspective view illustrating the flow of the light debris and the potatoes or the like items out of the top and bottom ducts TD and BD. As discussed above, the light debris follows a path A4 over the wall A1711. The wall A1711 is preferably adjustable in height. Preferably, the wall A1711 includes an upper section A1712 which can be fixed at desired heights via a locking mechanism A1713, such as via bolts (not shown) which are received in respective holes or slots. Potatoes or the like items follow the path A3 to the top surface of the conveyor A600'. Similarly, the wall A1612 is preferably adjustable in height in a manner similar to the wall A1711. The flexible flap F also preferably extends over the top of the conveyor A600' to assist placement of items onto the conveyor A600'. The conveyor A600' preferably includes a conveying surface having a plurality of spaced cross bars A605'; water should freely flow between these cross bars. The conveyor A600' can also include raised cross members (not shown) to ensure that items x do not slide back down the conveyor A600'.

Figure 16A:
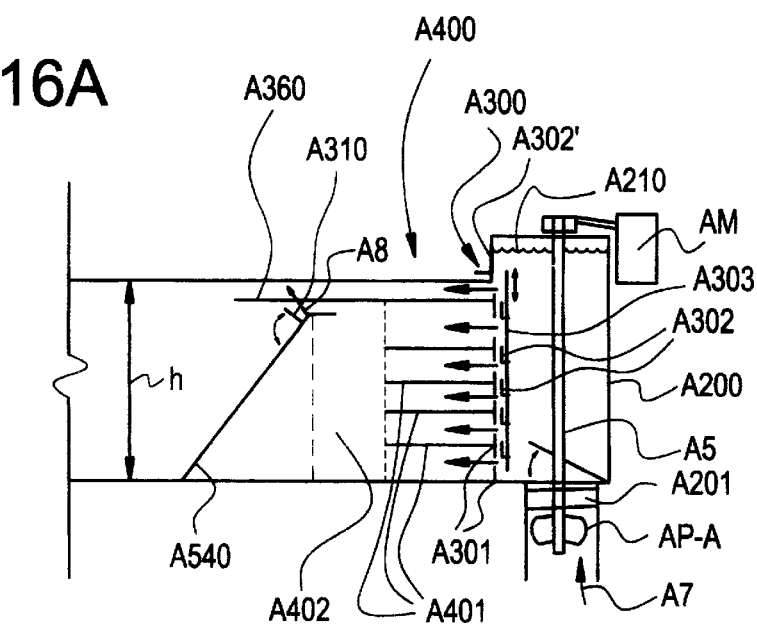
FIG. 16(A) is a side view illustrating a cross-sectional view of a preferred pump arrangement.
Figure 16B:
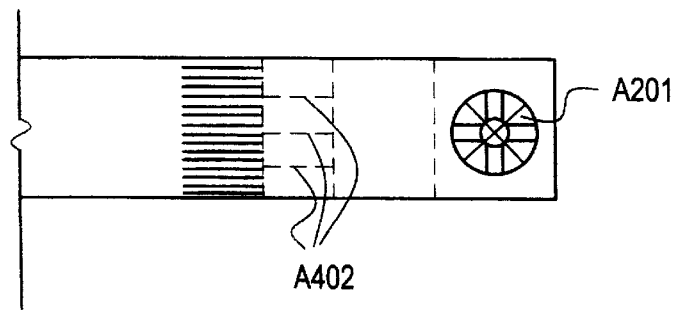
FIG. 16(B) is a top view of the arrangement shown in FIG. 16(A)

FIGS. 16(A)–16(D) show preferred arrangements for pumping water through the separation section 2. FIG. 16(A) shows one preferred method using an axial pump AP-A to pump water upwards, as shown by arrow A7, within the pump enclosure A200. A motor AM mounted to the tank A1000 rotates a vertical shaft AS which, in turn, rotates blades of the pump AP-A. An axial flow pump is preferred because axial flow pumps can be highly efficient with a high flow and a low head. Axial flow pumps also have beneficial spacial characteristics for the present apparatus.

Flow straightening vanes A201 are preferably provided to vertically straighten the flow. The use of flow straightening vanes A201 can be important for pump efficiency. The water within the pump enclosure A200 is pumped to a height A210. In the preferred embodiments, the pump provides a head of about 18–24". Water is then laterally circulated through the separation section through a diffuser A300. The diffuser A300 provides a predetermined flow restriction and evenly distributes the flow entering the separation chamber. Preferably, the diffuser includes a plurality of spaced vertical plates A301 fixedly located within the tank and a plurality of movable angle brackets A302 that can be raised or lowered with respect to the vertical plates A301. The brackets A302 are preferably interconnected and moved together with a connecting rod A303. Thus, a horizontal gap between the plates A301 and brackets A302 can be appropriately adjusted. Alternatively, the plates A303 can be individually adjusted. Preferably, the diffuser A300 is set to have about a 25% open area. A plate A302' is also preferably provided to separately adjust the amount of water flowing over the horizontal plate A3010. This separate plate A302' can be mounted externally to the pump enclosure A200, as shown in FIG. 16(A).

Preferably, a flow straightener A400 is also included to straighten the flow entering the separation chamber. In this regard, the plates A301 can be mounted on horizontal cross plates A401 which vertically straighten the flow. In addition, vertical plates A402 can also be included to horizontally straighten the water flow. As shown in dashed lines in FIG. 13, the flow straightener can include a grid-like structure A400' having vertical walls A402' and horizontal walls A401'. It is contemplated that other methods for straightening the flow can be utilized. Although less preferred, the flow straightener, or horizontal or vertical components thereof, can be omitted.

Figure 13:
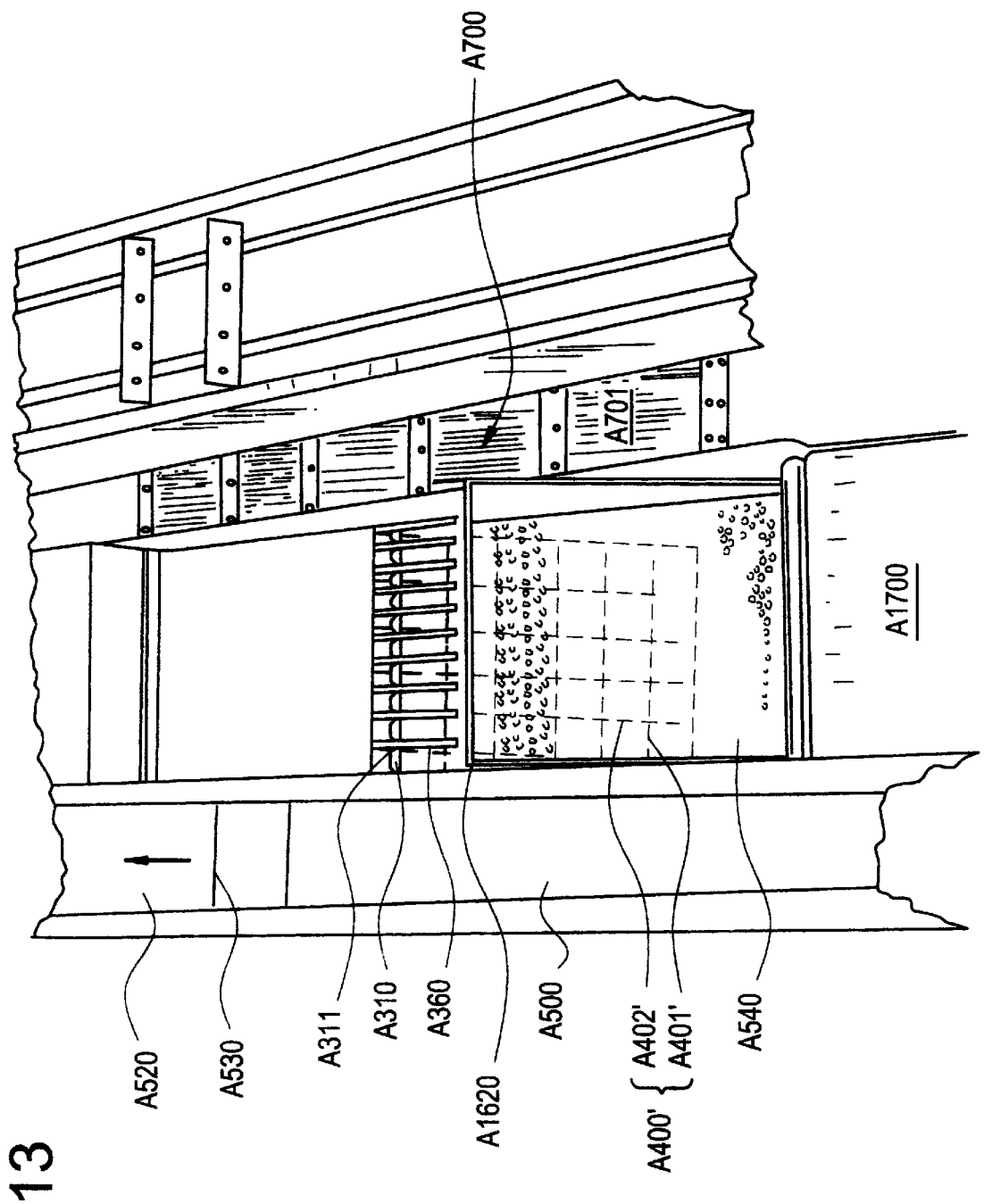

As shown in FIG. 16(A), the diffuser includes an uppermost opening which discharges water over the horizontal plate A3010. When product is delivered to the surface of the plate A3010, this water moves the product leftward in FIG. 16(A). In operation, there is a potential for heavy items such as rocks to hang-up on or remain on the fingers A360. In order to reduce this risk, an upwardly inclined plate A310 is preferably provided which directs a portion of the flow from the lower area upward between the fingers A360 along a path A8. This upward flow helps move heavy debris over the ends of the fingers. Preferably, the inclined plate A310 is pivotable to adjust the amount of upward flow to the fingers A360. As shown in FIG. 13, the inclined plate A310 can include notches A311 to enable the plate to extend between the fingers A360.

Figure 16C:
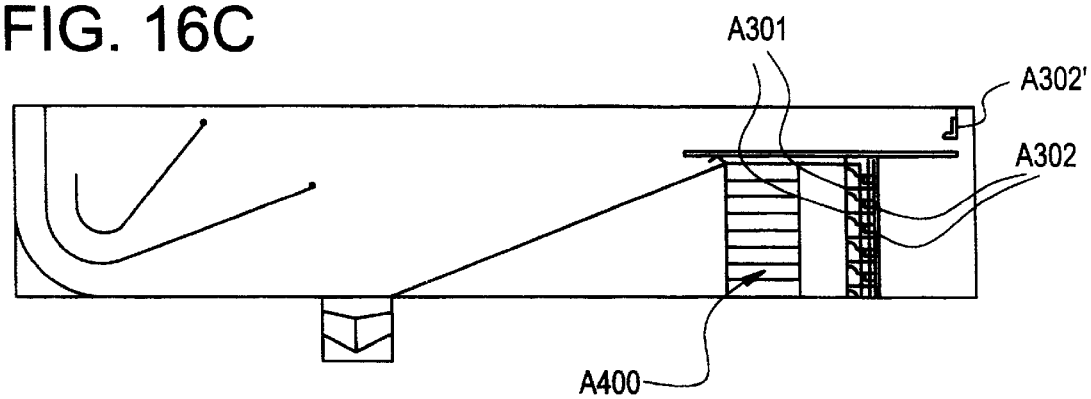
FIG. 16(C) is a cross-sectional side view illustrating a cross-sectional view of a separation section illustrating an exemplary diffuser and flow straightener.

FIG. 16(C) illustrates an embodiment similar to that shown in FIG. 16(A). As shown in FIG. 16(C), the member A302' is located closer to the end of the tank to increase the area for product introduction.

Figure 16D:
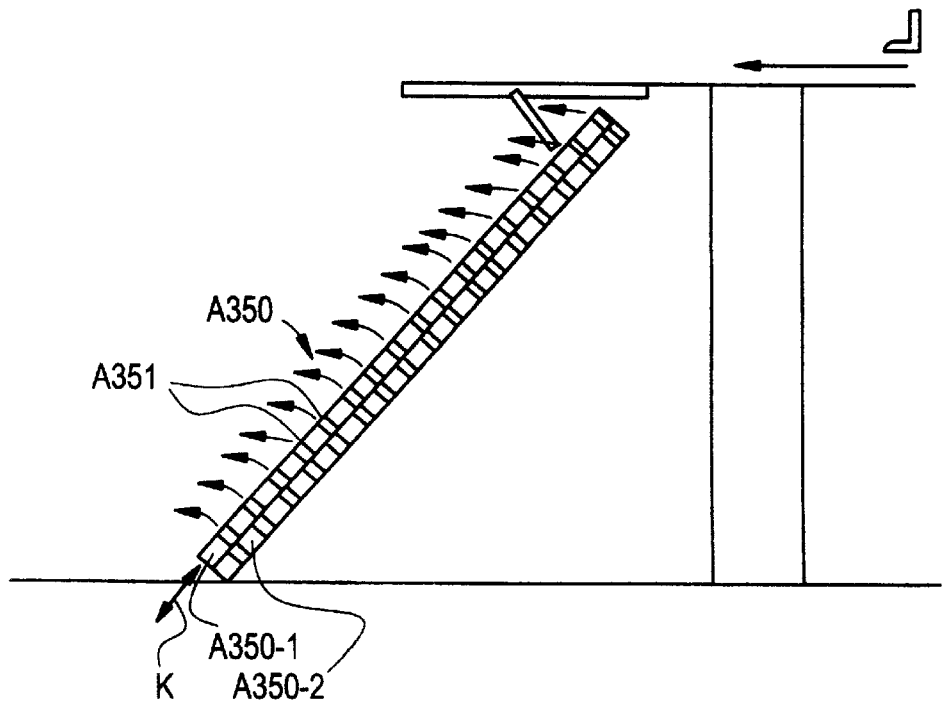
FIG. 16(D) is a partial side view of a separation section illustrating a combined diffuser and heavy debris slide wall.

FIG. 16(D) illustrates a more preferred construction wherein the diffuser A300 and the wall A540 are combined in one unit. A diffuser plate A350 provides the function of both of the diffuser A300 and the wall A540. The diffuser plate A350 preferably includes an array of holes A351 which restrict the flow from the pump enclosure. As illustrated, the plate A350 preferably includes two identical side-by-side plates A350-1 and A350-2. By sliding the identical plates relative to one another, i.e., in the direction of arrows k, the size of the openings can be adjusted and fixed as desired between fully opened and fully closed positions. The holes are preferably circular, about 1 inch in diameter, and covering about 30% of the plates, e.g., creating about a 30% open area in each plate. In this embodiment, the diffuser A300 is omitted, but flow straighteners A400 upstream of the plate A350 are still preferred. Alternatively, the holes can be formed into any other size or shape. For example, elongated slots could extend widthwise across the plates A350-1 and A350-2. Preferably, the open area is evenly distributed widthwise across the plates. On the other hand, the amount of open area can be varied in a vertical direction—e.g., being different on the top area, middle area, and bottom area—to alter the flow pattern in the separation chamber as desired.

Figure 17:
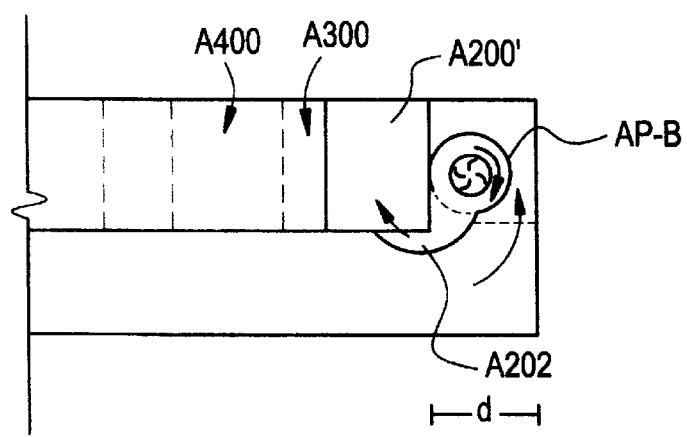

An alternative arrangement of the pump system is shown in FIG. 17. In this embodiment, a centrifugal pump AP-B is provided which discharges the water laterally through the duct A202 into the vertical chamber A200'. The pump AP-B can also be operated via a similar motor AM and shaft AS. This embodiment is less preferred because, among other things, it requires the tank A1000 to have an increased length d. Preferably, the rotational direction of the pump AP-B is opposite to the direction of return flow (e.g., return from the conveyor filter section). In FIG. 17, for example, the return flow is generally counterclockwise; accordingly, the rotation of the pump AP-B is preferably clockwise. As a result, any whirl-pool effect caused by the pump is reduced by the counter-rotation of the water. This allows the system to be operated with less water in the tank A1000 because the risk of the pump vortex sucking air is reduced.

Figure 18A:
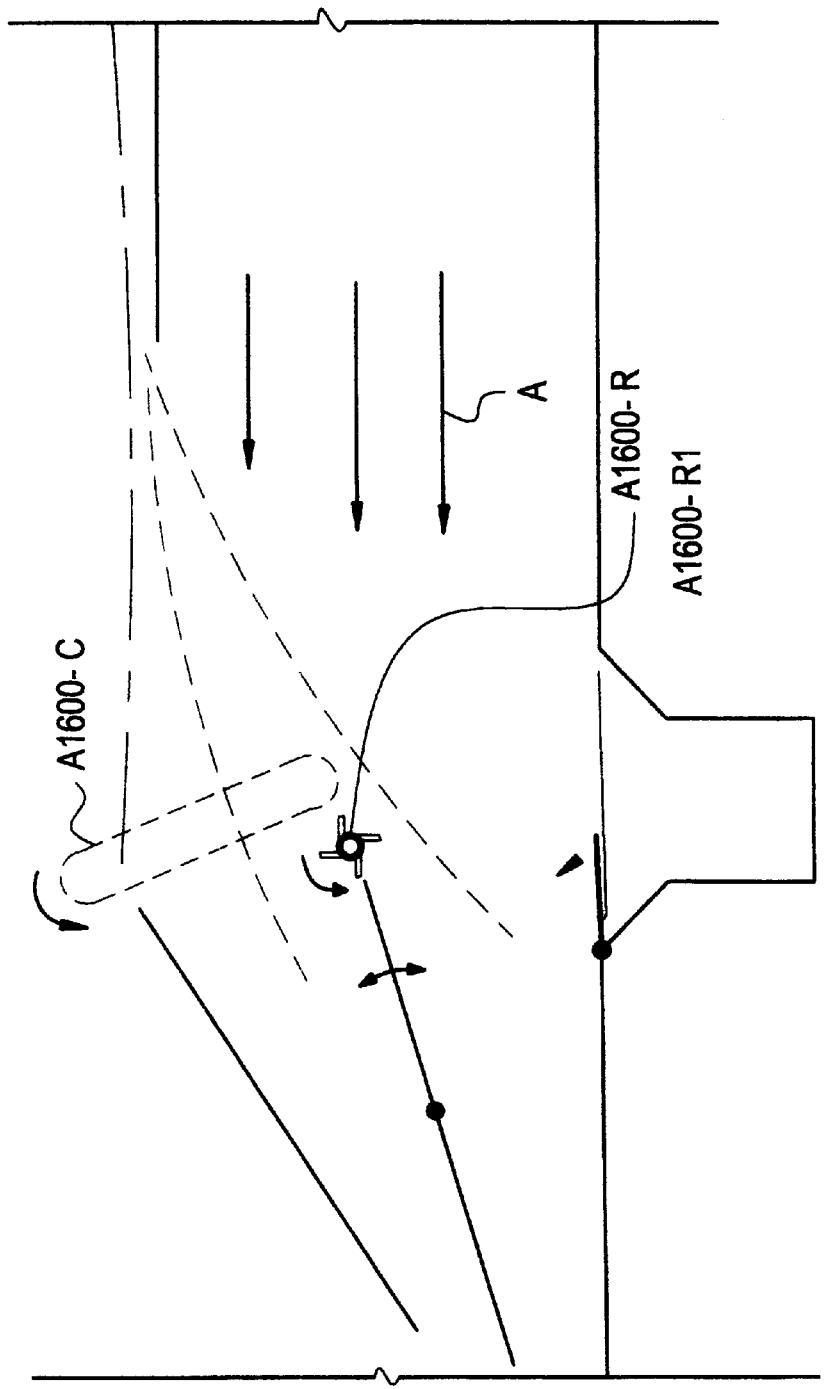
FIG. 18(A) is a schematic side view illustrating two alternative means for removing debris from the flow divider.

In operation, debris such as vines and the like can potentially become caught on or drape around the flow divider A1600. In order to prevent items from remaining on the flow divider, a means for removing such debris is preferably included. FIG. 18(A) illustrates two exemplary means. A first example includes a rotator A1600-R provided at the inlet end of the divider A1600. The rotator A1600-R extends across the width of the divider A1600 and includes a plurality of vanes A1600-R1 that are configured to rotate counter-clockwise when water flows in the direction A in FIG. 18(A). Depending on the situation, e.g., the product types and debris being separated, the rotation can also be made to be clockwise. However, when potatoes are being separated from vines or other debris, as an example, it is desirable to rotate counter-clockwise. As a result, the rotator moves such items toward the top duct. The rotator A1600-R should be mounted to move with any movement of the divider A1600.

Alternatively, a conveyor A1600-C can be positioned in front of the top duct to convey large vines, etc., over the wall A1700. The conveyor A1600-C can have large openings therein, e.g,. a large mesh, etc., to avoid affecting the operation of the device other than to move large light debris over the wall A1700. As one example, the mesh openings could be about ⅜–½ inch and create more than an 80% open area. FIG. 18(C) illustrates an embodiment wherein the conveyor A1600-C is vertically adjustable in the direction of arrows i. In this manner, the conveyor A1600-C can be raised or lowered to adjust the separation position, instead of or in addition to adjusting the divider A1600. When a conveyor A1600-C is included, the entire water flow can be below the wall A1700, if desired, because floating debris, etc., can be removed by the conveyor A1600-C.

Figure 18B:
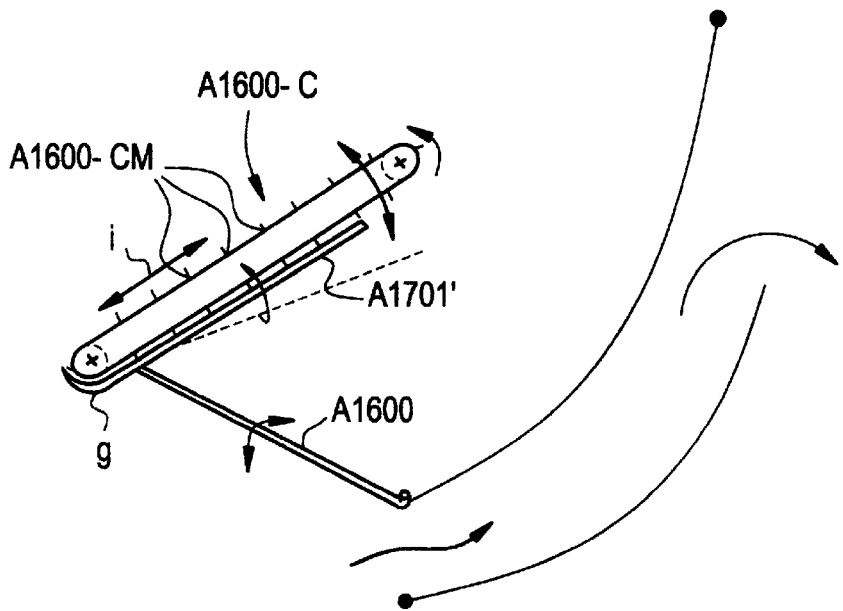
FIG. 18(B) is a schematic side view showing another means for removing debris from the flow divider and an alternative construction of the top duct.
Figure 18C:
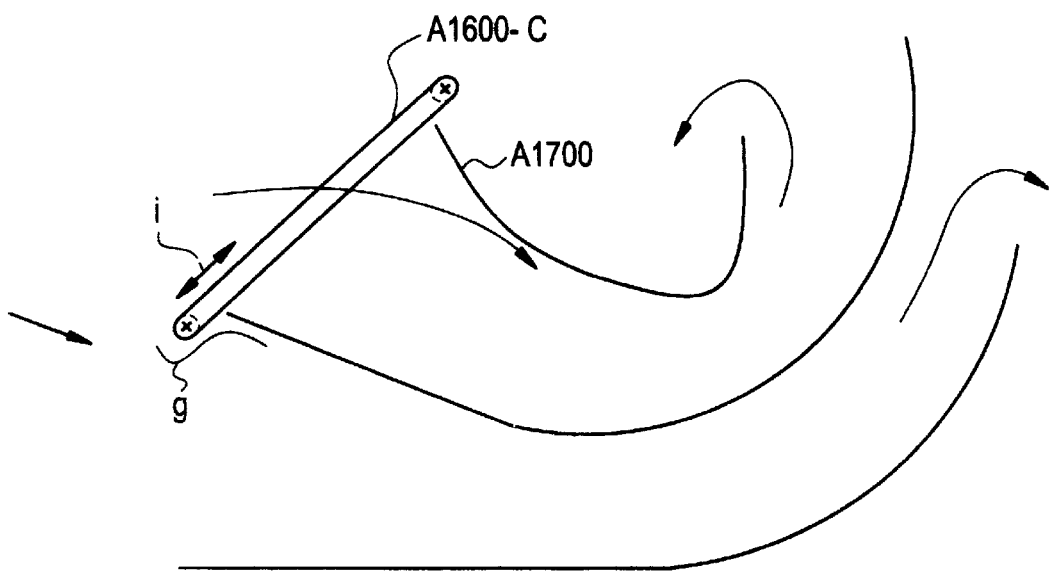
FIG. 18(C) is a schematic side view similar to portions shown in FIG. 18(A)
Figure 18D:
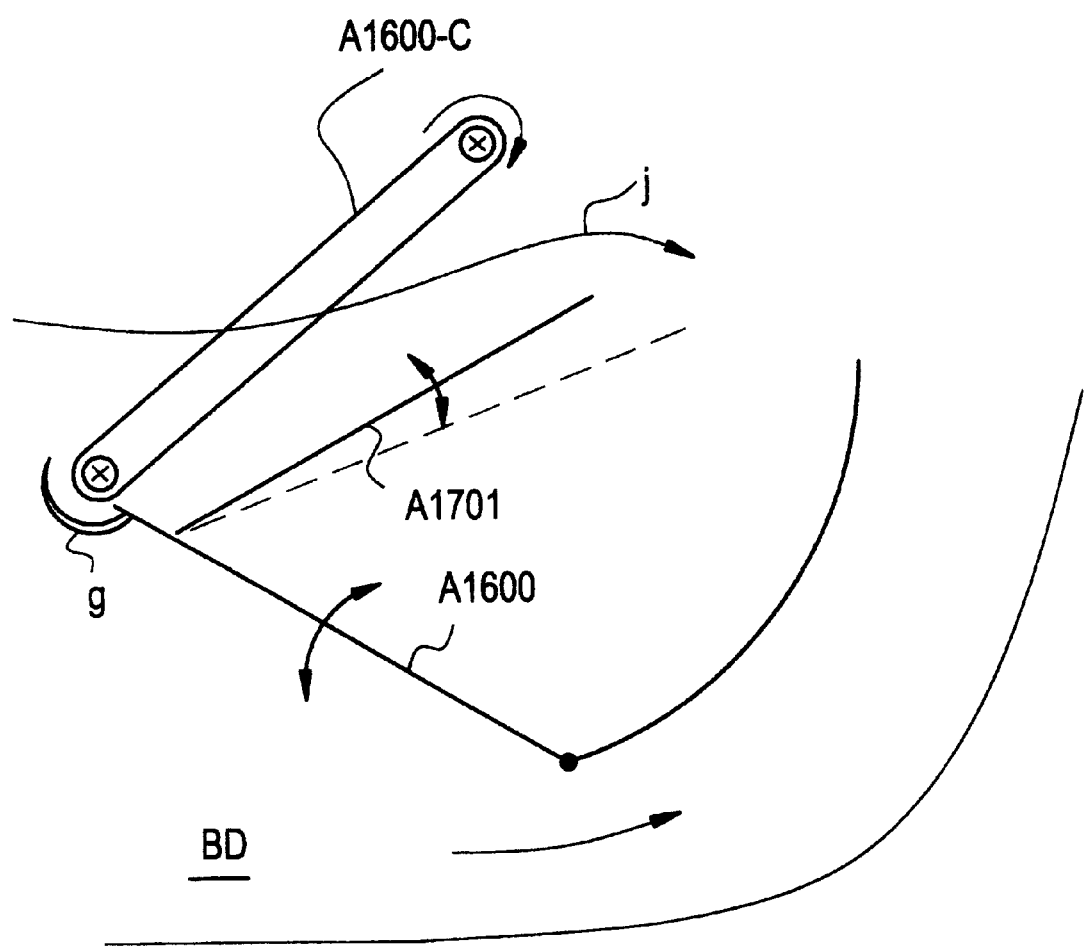
FIG. 18(D) is a schematic side view showing another means for removing debris from the top duct similar to 18(B)

FIG. 18(D) shows an embodiment wherein the bottom duct BD is substantially the same, but wherein the top duct TD is altered. In this embodiment, an upwardly inclined wall, or weir, A1700-1 directs water and light debris thereover as shown by arrow j. The inclined wall A1700-1 is preferably pivotable at the front end of the divider A1600 to vary the flow thereover. This wall helps ensure that the water height is sufficient across the conveyor A1600-C. For example, the inclined wall A1700-1 can be rotated to another position as shown with dotted lines in FIG. 18(D). In order to avoid moving light debris around the rear of the conveyor A1600-C and into the lower duct, a guide g is preferably included at the bottom of the conveyor A1600-C to ensure that such debris is redirected to a position in front of the conveyor where it will move upwards.

FIG. 18(B) shown another arrangement wherein the conveyor A1600-C is rotated in a counter clockwise direction. Here, the conveyor can have very large openings therein if desired. The conveyor has cross members A1600-CM which are moved upwards along a filter surface A1701' which functions to catch large debris thereon (so as to operate similar to the conveyor filter A700). However, the filter surface A1701' should have large openings therein to allow the flow to be substantially uneffected therethrough. However, the spacing could be made close enough to cause an effect similar to the weir A1701. Additionally, a weir A1701 could be located behind the surface A1701'.

(2) Filter Section:

The filter section 1 includes a conveyor filter A700 having a filter surface A701. The conveyor filter A700 can be constructed similar to any of the filters 700 discussed above with reference to, e.g., FIGS. 1–3. In this regard, the filter surface preferably has a plurality of closely spaced parallel bars which prevent debris from passing therethrough while allowing water to pass therebetween. The filter arrangements illustrated in FIGS. 8, et seq., provide larger filter surface areas than the earlier embodiments. This helps process a high rate of flow through the system. In one exemplary construction discussed below, the filter surface A701 can have a length of about 20–22 feet and a width of about 2 feet. Accordingly, the design can easily provide a surface area of about 40 square feet or more. The size of the filter required can vary depending on the flow required by the separation chamber and the amount of debris anticipated.

Figure 15B:
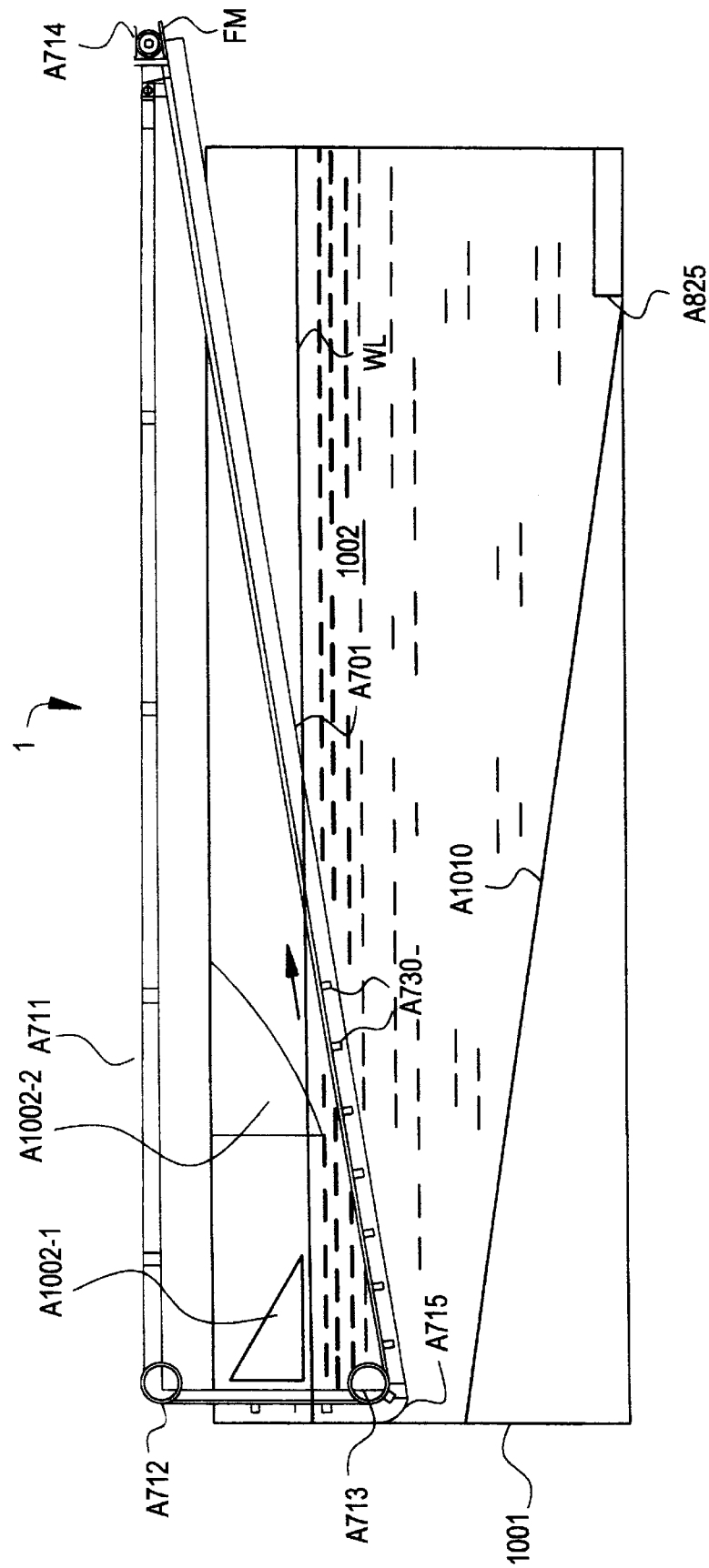
FIG. 15(B) is a cross-sectional side view illustrating the interior of the filter section.

As best shown in FIGS. 10 and 15(B), the conveyor filter A700 preferably includes conveyor belts or chains A711 supported on pulleys A712, A713 and A714. The pulleys A712 and A714 are preferably supported on an upper support member A720. The upper support member A720 preferably includes two parallel beams A721 and A722 and a plurality of cross beams (not shown) connected between these beams. The cross beams can help support the members A730 and/or belts or chains A711. Preferably, the support member A720 is pivotable at the end having the pulley 714 so that the support member can be raised or lowered via a support mechanism A724 (e.g., utilizing a screw jack or the like). To allow for this motion, the pulley A712 can be moved along a channel A723, or another slack providing means can be utilized. In this manner, the support member A720 can be lowered (e.g., substantially within the tank) during transport, etc., and/or the support member A720 can be raised to allow for increased access there below. For example, raising the member A720 can facilitate placing product in the flume A3000 via a conveyor (not shown) extending under the member A720.

As shown in FIG. 15(B), the water level WL within the filter section 1, is preferably above the lower end of the filter A701 to actively use a greater area of the filter. Alternatively—although less preferred—the conveyor belts or chains and pulleys do not have to be submersed in the tank water, reducing costs for bearings and increasing the longevity of the system. Alternatively—although less preferred—the chains or belts A711 and cross members A730 can be configured to rotate beneath the water level in the tank around a duct (not shown) similar to the triangular duct T shown in FIG. 2.

FIG. 15(A) illustrates the interior of the filter section 1 as viewed in the direction of the arrow 15 in FIG. 11. As shown in FIG. 15(A), the floor A1010 is preferably angled upward to the wall A1001 so as to converge toward the lower-rear end of the conveyor filter A700. This facilitates movement of sediment, such as sand, silt, etc., down the inclined floor. Preferably, an outlet opening A825 is located at the lower front end of the floor A1010 so that dirty water can be removed and delivered to a recycling means A800. Angled walls A826 help direct sediment through the outlet A825. FIG. 15(B) illustrates a side view of the preferred construction of the filter section 1. As shown in FIG. 15(B), a curved wall portion A715 is also preferably provided adjacent the wall A1001 to enable members A730 to move debris along the portion A715 and onto the filter surface A701. FIG. 15(B) also illustrates the placement of a conveyor filter motor FM for rotating conveyor belts or chains A711.

Although cross members A730 are the preferred means for conveying debris along the filter surface A701, the debris can be moved laterally over the filter surface with another type of conveying means. For example, although less preferred, the conveying means could include water jets, air jets, other pushing mechanisms and/or a steep filter angle which causes the debris to move across the filter surface and off one end.

In various alternative constructions, the filter surface A701 and the means for conveying debris over the filter surface can be constructed similar to any of the filter surfaces or conveying means described above with reference to FIGS. 1–7 or as described in copending U.S. patent application Ser. No. 08/884,672, now U.S. Pat. No. 5,833, 868. For example, the filter surface A701 is preferably a wedge-wire filter having a plurality of closely spaced parallel wedge-wires extending parallel to the traveling direction of the cross-members and having triangular cross-sections. In one preferred construction, the parallel bars have a width of about 0.09 inches and are spaced about 0.04 inches apart from one another such as to prevent debris having a diameter less than 0.04 inches from passing therethrough. Similarly, the cross-members A730 preferably include a semi-resilient material, such as plastic or rubber, that can deform slightly to fit within the gaps when pressed against the wedge-wires so as to actively clean the gaps when dragged along the length of the wedge-wires. Although less preferred, the wires could have other cross-sectional shapes, such as circular, square or rectangular. In addition, although less preferred, a woven filter can also be used, such as a woven metal filter. The filter can also be made from a perforated plate. Other known filters can also be used.

In another less preferred embodiment of the conveyor filter, the conveyor belts or chains, the cross-members A730, and the filter A701 can be replaced with a screen-type or perforated endless conveyor belt which allows liquid to pass through holes in the conveyor belt itself while conveying debris to the discharge end. In another less preferred embodiment of the conveyor filter, an inclined filter, e.g., an inclined parabolic hydro-sieve or the like, can be used to convey debris by gravity and/or by the force of the flowing water without the use of conveyor belts or the like. The terminology "conveyor filter" as used herein encompasses any filter means which actively or passively moves debris laterally while allowing filtered water to pass therethrough.

(3) Heavy Debris Section:

As shown in FIG. 13, the heavy debris conveyor A500 preferably includes an endless conveyor belt A520 similar to that shown in FIG. 9. The conveyor belt A520 is preferably formed from a flexible flat sheet member, e.g., made of an elastomeric material, which is generally free from holes to prevent rocks and the like from falling back into the tank 1000. The conveyor belt A520 preferably includes a plurality of pushing members A530 distributed around the belt. The pushing members A530 ensure that heavy debris does not slide back down the conveyor A500. The conveyor belt A520 is preferably supported to maintain an approximately V-shape channel such that rocks and the like tend to move towards the center of the belt. Due to the flexibility of the belt A520, the belt can flatten out at the ends to rotate around pulleys (not shown). The floor of the tank section below the conveyor belt A520 is preferably contoured to the bottom of the conveyor belt A520 in a manner similar to the bottom 130 below the conveyor 600 in FIG. 2. As shown in FIG. 9, a siphon conduit A590 is preferably provided in the bottom floor below the conveyor belt A520 at the lower end of the heavy debris conveying section 3. The conduit A590 extends upward to a position below the conveyor A600'. Due to the increased pressure from the jets A511, the water pressure in the heavy debris section 3 can be high enough to force a substantial amount of water through the conduit A590 to convey particulate material, etc., from the bottom of the heavy debris conveyor upwards to a height above the top of the conveyor filter A700 for further processing. In the exemplary embodiments discussed below, where the water jets discharge a total of about 250 gallons per minute, a conduit A590 having about a 3 inch diameter can siphon roughly about 100 gallons per minute. As shown in FIG. 9, a water jet A591 could also be inserted into the conduit A590 to increase the flow thereto, if desired. The water jet A591 can be an input from the means A800, or from another source. Although less preferred, it is contemplated that a pump can be used to withdraw water and particulate material through the conduit A590. Although also less preferred, it is also contemplated that the conduit A590 can be connected to a recycling means, such as the means A800 discussed below.

As shown in FIG. 12, the heavy debris section 3 can include a cover, such as a metal grate A590 to allow an operator to stand thereon. As also shown in FIG. 12, the jets A511 preferably have elongated discharge holes which direct a high velocity flow closely over the bottom of the trap A510. The trap preferably has a contoured, e.g., rounded, floor surface configured to cause the flow from the jets to follow snugly along the floor surface. The floor surface preferably contours downward to a lowermost point A512 at the downstream rear end. Preferably, both of the jets A511 are directed at this downstream rear end as shown by the arrows in FIG. 12.

In an alternative construction, heavy debris can also be directed into another duct similar to the ducts TD and BD. The desirability of using another duct for the heavy debris would depend, in part, upon the densities of the heavy debris being separated—e.g., heavy rocks, etc., would not typically be carried via such a duct.

(4) System Operation:

Although the system is divided into three sections—the filter section 1, the separation section 2, and the heavy debris section 3—the three sections are in fluid communication with one another. When the tank A1000 is initially filled with water, the water level within the tank is uniform, i.e. at the same height in each of the sections. This initial water level is preferably set with an adjustable overflow outlet pipe A1900, as shown in FIG. 10. The overflow outlet pipe A1900 includes an overflow outlet opening A1901. The pipe A1900 is pivotable around its base in a plane parallel to the side of the tank. In this manner, the overflow level can be selected as desired. The pipe A1900 can be fixed upright after the appropriate water level is achieved.

When the system is in operation, the water levels in the three sections are not uniform due to the water flow. The water level within the separating section 2 is at a first level higher than that within the filter section 1, and the water level in the heavy debris section 3 is elevated due to the water pressure from the jets A511. In order to present a consistent flow through the separation section 2—to maintain consistent separation characteristics—it is helpful to maintain a substantially constant water level above the pump inlet during operation. Accordingly, a second adjustable overflow outlet pipe A1900' is preferably provided which sets an operation overflow level. This second pipe A1900' is preferably located proximate the pump inlet, such as illustrated in FIG. 10. Although a single adjustable overflow pipe could be used, the preferred construction has two pipes, as shown. Although the illustrated overflow pipes are manually adjustable, automatic means can be provided to move one or more of the pipes to an appropriate position. For example, the pipe A1901' could be operated by a solenoid mechanism that moves the pipe A1900' down a predetermined distance a certain time interval after the flow begins, such as, e.g., about 5 seconds after the pump is turned on. Any known means for setting the water levels can also be utilized. For example, the water level can be set via one or more openable valves. The automatic means can include means for automatically opening a valve.

In the most preferred construction, separate and individually controlled motors or mechanisms are provided to a) rotate the conveyor filter belts or chains A711, b) rotate the conveyor A6001, and c) rotate the heavy debris conveyor A500. Most preferably, means are provided to finely adjust the rotational speed of these mechanisms as desired. In a most preferred construction, as shown in FIG. 10, an oil pump OP pumps oil for driving each of these devices in a known manner, e.g., each of these conveyor mechanisms can be rotated by oil operated mechanisms. Preferably, a plurality of manual levers VS adjust the oil flow—each lever providing an infinite variation in flow to a corresponding one of said motor mechanisms. The levers and motor mechanisms are preferably serially arranged such that each mechanism is varied independent of the other mechanism. The pump motor AM is also preferably adapted to have infinitely variable pump speeds. In this regard, means are preferably provided to enable the operator to manually adjust the pump speed, such as by operating a variable speed control V having buttons for increasing and decreasing speed. The operation and control can also be performed in a manner similar to that of the embodiments of FIGS. 1–7. In alternative embodiments, a variety of other motor types can be utilized. For example, variable speed electric motors can be used, with DC or variable frequency drives.

(5) Recycling Means:

As best shown in FIG. 9, all of the preferred embodiments of FIGS. 8, et. seq., include a means A800 for recycling the water in the tank. However, this means A800 is not required. The means A800 can be similar to the means 800 discussed above. As discussed above, this means A800 can enhance the system's cleanliness and ability to operate without needing substantial amounts of new water. The means A800 can be used to remove sediment, such as silt, sand, and other fine particulate material, and to recycle the de-sedimented water. Similar to the system 800, discussed above, the system A800 can include a pipe A820 extending from the outlet A825 shown in FIG. 15 to withdraw sediment, etc., from the floor A1010. The pipe A820 can lead from the outlet A825 to a de-sedimenting means. As shown in FIG. 10, a pump A835 for pumping water through the means A800 can be mounted to the side of the tank A1000. As discussed above, a return pipe A830 from the means A800 can be used to direct heavy debris into the trap A510—e.g., via jets A511. In addition, although less preferred, at least a portion of the recycled water can be directed into the filter section 1, such as through the wall A1001 in the direction of the outlet A825 in order to direct sand, etc., towards the outlet A825.

As noted, the recycling means A800 can be similar to any of the embodiments of the means 800 discussed above. In the most preferred embodiment, where five hydro-cyclones are included, a substantial flow rate can be maintained in order to quickly de-sediment a large quantity of water. In the most preferred embodiment, the five hydrocyclones process a total of about 250 gallons per minute. Accordingly, the water introduced through the inlet jets A511 can be very powerful—e.g., each jet can introduce about 125 gallons per minute. In this case, the jets A511 preferably have an outlet opening of about ¾ an inch high and 4 inches long. In the event that water is also introduced into the filter section 1 (as discussed above), the means A800 preferably recycles more than 250 gallons per minute or another separate means can be used for introducing water into the filter section 1.

By the inclusion of a means A800, the present system can be operated without a significant amount of new water. For example, in the preferred embodiments, the system only uses about an additional five gallons per minute to balance out liquid discharged from the hydrocyclones—i.e., each hydrocyclone receives about 50 gallons per minute and discharges approximately 47–49 gallons per minute of de-sedimented water through the piping A842.

The recycling means A800 can be a recycling apparatus as described in copending U.S. patent application Ser. No.

08/884,672, entitled PORTABLE WATER RECYCLER, filed Jun. 27, 1997, the entire disclosure of which is incorporated herein by reference. To facilitate reference to this incorporated disclosure, portions of the above disclosure are included at the end of the present specification.

(6) Exemplary Dimensions:

In one preferred construction, the water flow across the separation chamber is about 3 feet deep, see depth h in FIG. 16(A), and the two output ducts are each about 8 inches tall. The system preferably pumps about 3,000 gallons per minute/foot width. Thus, about 1,500 gallons per minute/foot width is discharged through each of the ducts. Accordingly, the water velocity in the separation chamber is about 2.2 feet per second, and the water velocity in each of the ducts is about 5 feet per second. This design can separate, for example, approximately 90,000 lbs/hour of potatoes and debris for each foot width. Thus, a 2 foot wide system could separate about 180,000 lbs/hour of potatoes and debris. Preferably, the pump AP provides about a 6" head in addition to the head required to lift into the separation chamber (typically, less than about 24"). When a 2 foot wide separation chamber is used, the filter section 1 is also preferably about 2 feet wide, and the tank is preferably about 20–22 feet long. As a result, a large filter surface area is provided. In addition, the heavy debris conveyor is preferably about 18 inches wide. As a result, the entire system is preferably about 6 feet wide. As a result, the system is compact and can easily be made road legal and transportable.

In the exemplary embodiment shown in FIG. 16(A), the diffuser has five horizontal gaps extending across substantially the entire width of the flow. Each of these gaps, thus, discharges about 500 gallons of water per minute per foot width. Similarly, an additional about 500 gallons of water per minute is discharged through the top opening over the horizontal plate A3010. Each of the five gaps are preferably set at about 2.35 inches tall. Preferably, the gaps are adjustable in a range between about 1½ to 4 inches. Because the pump only supplies an additional 6" of head, a cover for the pump enclosure is not needed. However, a screen is helpful to prevent objects from entering the filtered water in the pump area. Any water that may overflow from the pump enclosure would likely return to the system due to the central location of the pump enclosure. FIG. 16(C) illustrates exemplary dimensions according to one construction, sizes shown being in inches.

Table 1 below illustrates system sizes for a few other exemplary constructions. Example A shows preferred sizes for a construction similar to the preceding example. If the cut-offs from the light debris collection and the heavy debris collection are varied from that in example A, such as if different product types are to be separated (e.g., other items or other potato types with different qualities), then the terminal velocity of the product will vary. As shown in example B, this change in terminal velocity requires a change in the distance to the top and bottom ducts, or to dividers thereto. As shown in example B, all other dimensions can remain the same. On the other hand, example C illustrates one manner of adjusting the system to process a larger quantity of potatoes or the like. In example C, when the bottom duct height is increased to 10 inches, a number of other dimensions are altered therewith, and the system potato capacity is substantially increased.

For optimal separation of potatoes, less than 1.8 to 2 lbs/minute potatoes per each gallon per minute ("GPM") water is processed in the duct conveying the potatoes, e.g., the concentration in the bottom duct. Preferably, about 1 lb/minute potatoes per each GPM water is added, or even less. In general, it is preferred to have less than about 10% product per volume of water, and, more preferably, less than about 5% product per volume of water. When the product volume is too great, the flow characteristics can become affected by the product therein.

TABLE 1

| | A | B | C |
|---|---|---|---|
| 1. top duct light debris duct height (inches): | 8 | " | " |
| 2. top duct flow velocity (feet/second): | 4 | " | " |
| 3. bottom duct potato duct height (inches): | 8 | " | 10 |
| 4. bottom duct flow velocity (feet/second): | 6 | " | " |
| 5. separation chamber depth (inches): | 37 | " | " |
| 6. light debris terminal velocity (feet/second): | .8 | .5 | " |
| 7. heavy debris terminal velocity (feet/second): | 1.8 | 2.0 | " |
| 8. separation chamber velocity (feet/second): | 2.16 | " | 2.49 |
| 9. flow separation baffle height for uniform flow (inches from bottom): | 22.2 | " | 24.13 |
| 10. horizontal distance from input (at fingers) to flow separation baffle (inches): | 60 | 96 | 120 |
| 11. horizontal distance from input (at fingers) to rock trap baffle (inches): | 44 | 40 | 46 |
| 12. water consumed per foot width (gallons per minute): | 2987 | " | 3435 |
| 13. potato capacity per foot width (lbs/min per GPM water): | 1792 | " | 2240 |
| 14. system width (inches) | 24 | " | 24 |
| 15. system recycled water consumption (GPM): | 5973 | " | 6869 |
| 16. system potato capacity (lbs/hour): | 215040 | " | 268,800 |

According to the most preferred embodiments of the present invention, a large quantity of potatoes or other product can be separated from debris very quickly, accurately and efficiently. The system can process a large quantity of water, e.g., 3000 gallons per minute for every foot width, so that a large amount of potatoes or other product can be separated. In addition, the upwardly turned discharge ducts enable a large water depth in the separation chamber, increasing the separation time and separation accuracy—without the need for large conveyors to extend into the water to retrieve the product and/or debris.

D. Alternative Embodiments:

The present invention can be adapted in a variety of ways depending on the circumstances, such as depending on the types of items and debris being separated. For example, the "debris" does not necessarily have to be the light items. For example, depending on the type of debris to be collected, the medium items could be directed to the conveyor filter, while the light items could be collected on a conveyor A600. Additionally, light items, medium items and heavy items could be delivered to conveyors A600 and water separated therefrom could be directed through a conveyor filter. Other similar variations could be made depending on circumstances. That is, depending on the items and debris and the desired uses thereof, the various means for conveying the debris and items out of the tank can be interchanged—it is even conceivable that heavy items could be discharged over a conveyor filter in a manner similar to the light debris of the illustrated embodiments. The terminology "heavy", "medium", and "light" has been used in a relative sense. That is, these terms compare the particular items and debris in a certain environment. While these qualities may vary between environments—e.g., light debris in one environment may potentially be heavy in another environment.

In addition, as noted above, the heavy items could potentially be delivered into a duct like that of the ducts TD and/or BD. Similarly, the heavy items could be discharged to a conveyor A600 or other means. In addition, the device can be used with a larger than three way separation—e.g., using three other more separation ducts, such as when more than one item item is to be collected. In addition, the discharge from one or more of the medium items, heavy items, or light items, etc., can be effected by way of pumps—such that conveyors A600 are not situated as in the illustrated embodiments. For example, potatoes or the like items could be pumped away out of the bottom duct to an appropriate location. In addition, conveyors shown in FIGS. 1–7 could be combined with the embodiments of FIGS. 8, et seq., and/or other components can be arranged together as would be understood based on the present disclosure.

In addition, the liquid in the system does not necessarily have to be water, or it can include water with other substances therein. For instance, the system can include a brine or saline solution.

Figure 22:
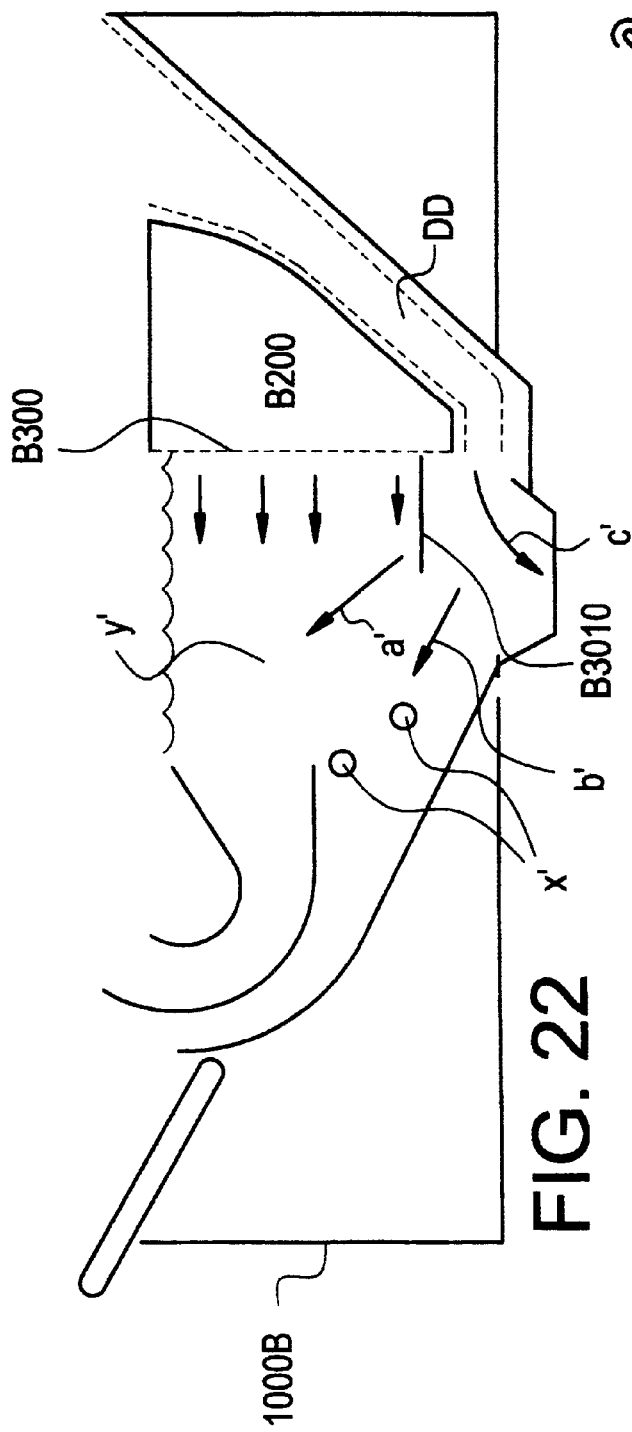
Figure 23:
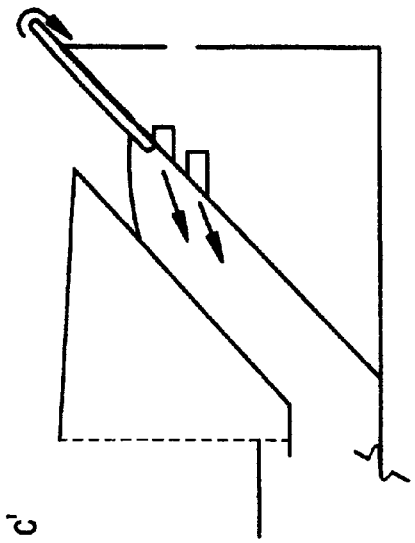
Figure 24:
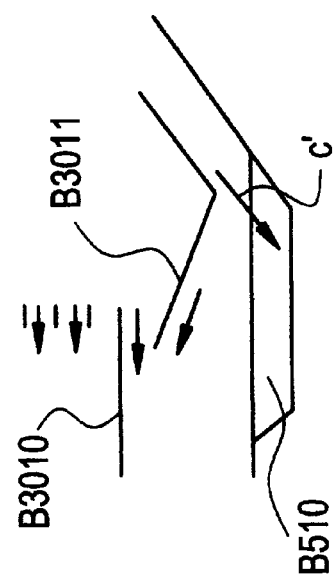

E. Low Specific Gravity:

Although the above embodiments pertain to separation of articles having a specific gravity greater than 1 (i.e., items that sink in water, e.g., potatoes), concepts of the present invention can be applied to articles having a specific gravity of less than 1 (i.e., items that float in water, e.g., apples, etc.). For example, as shown in FIG. 22, the system can be constructed to deliver product below a horizontal plate B3010. A diffuser B300 can be arranged in a similar manner to that discussed above. The heavy debris falls in a first path c', while items x', such as apples, follow an upward path b', and very light debris y' follows another path a'. The separation ducts can be constructed similar to that in the embodiments discussed above. The product can be delivered to the bottom of the tank 1000B in a variety of ways. For example, upper and/or lower conveyors can be used (shown schematically as dotted lines). These conveyors could also include pushing cross bars. In addition, a downward flow to force product downwards through the duct DD can be creating by water jets or other means, as shown in FIG. 23. As also shown in FIG. 23, mechanisms, e.g., conveyors, can also be employed to remove any floating debris within the delivery duct. In the arrangement shown in FIG. 24, the product can be delivered through delivery duct DD, heavy objects, such as rocks, can fall into the trap B510, ant light objects can gradually rise along inclined wall B3011 to the release location off the bottom of the horizontal plate B3010.

An alternative embodiment is to include a conveyor in the top of the duct DD to positively convey the items downward to the bottom of the separation chamber as they press upward against it. This is particularly effective if the items being separated have a specific gravity much lower than 1 with respect to the fluid being used in the separation chamber.

F. Compact and/or Transportable:

In the illustrated embodiments, the device can be compact and/or transportable. The illustrated embodiments of the apparatus can be compact and, thus, do not require substantial space. Because the apparatus can be rectangular in shape, with a limited height, width and length, the device can easily be made to be transportable. In this regard, wheels W can be mounted to the tank 1000, and the system can be pulled as a trailer, used as a truck bed, and/or otherwise incorporated in a moving vehicle. Thus, the apparatus can easily be used at or transported to virtually any desired location. For example, the device can easily be transferred between farms for use at specific harvesting times.

G. Plant Apparatus:

When the system is permanently installed at a location and/or when the system does not have certain requirements for compactness and/or transportability, a number of modifications of the system can be made. For example, when product such as potatoes, along with debris, is delivered to a plant location for the making of potato chips, french fries, or the like, the system can be permanently installed to meet particular plant demands or requirements. FIGS. 19–20 illustrate one exemplary embodiment of the present invention for use at a plant or at another permanent location.

Figure 19A:
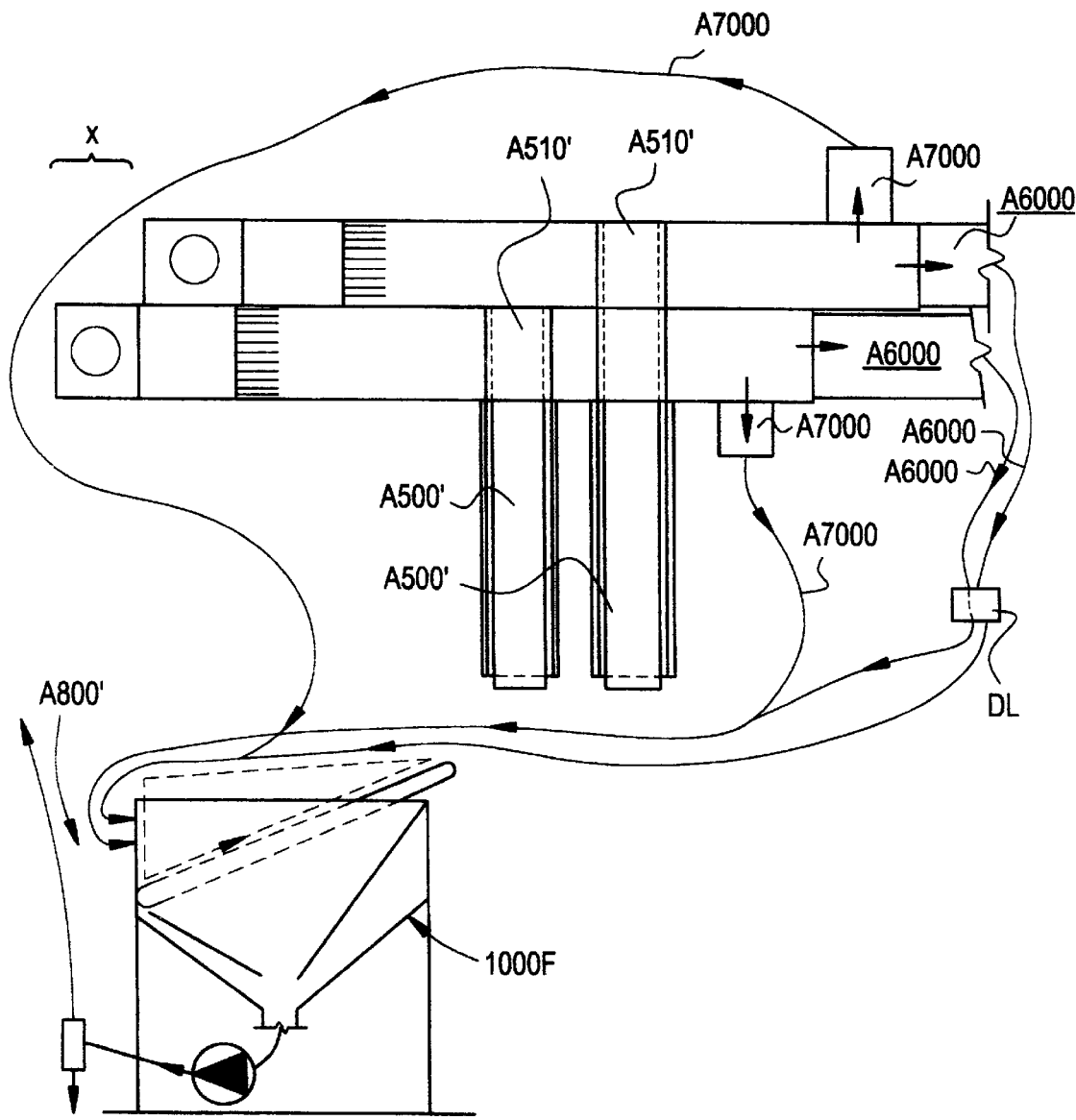
FIG. 19(A) is a schematic diagram of a preferred plant apparatus.
Figure 19B:
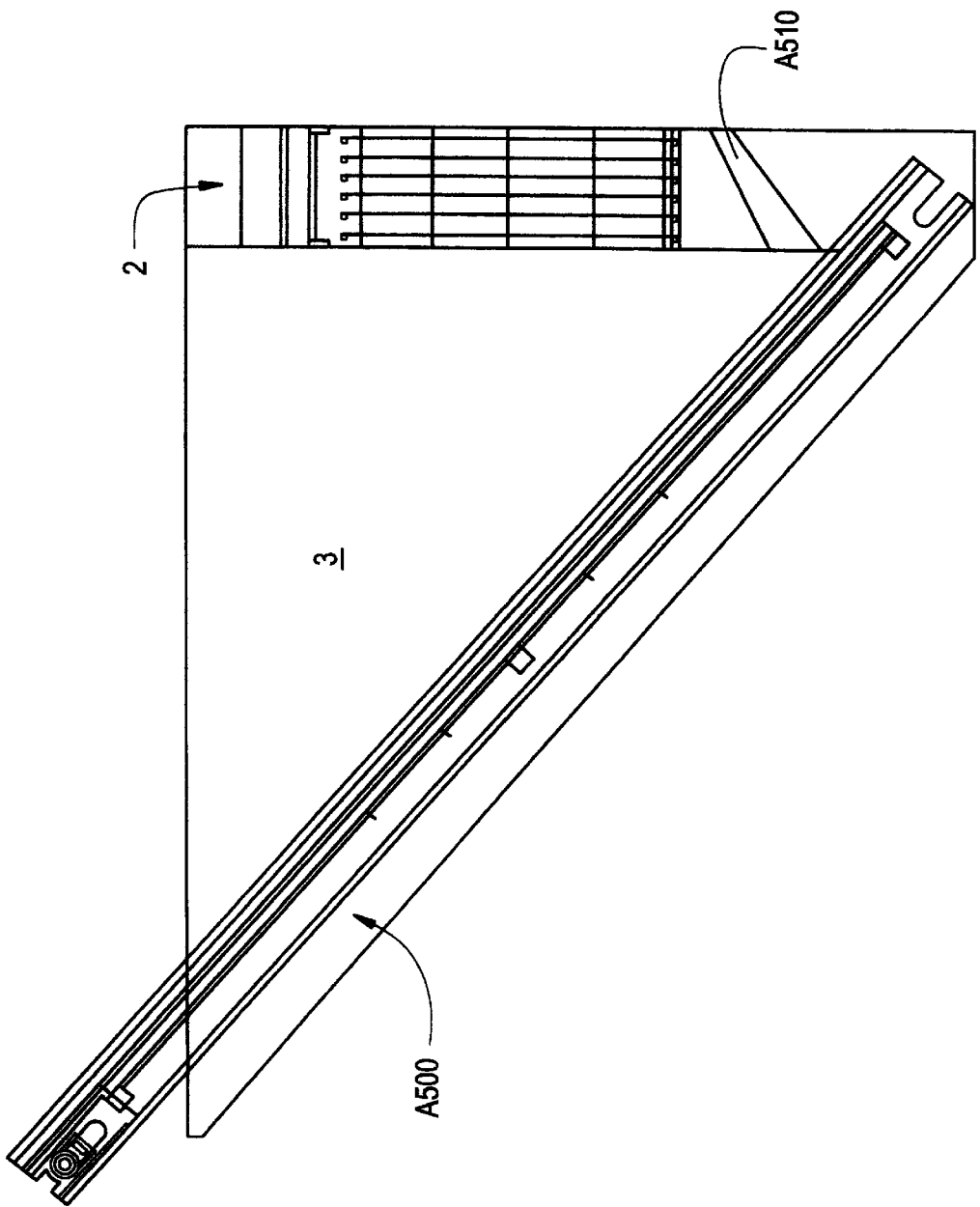
FIG. 19(B) is an end view of the separation section illustrating the lateral arrangement of the heavy debris conveyor.
Figure 20:
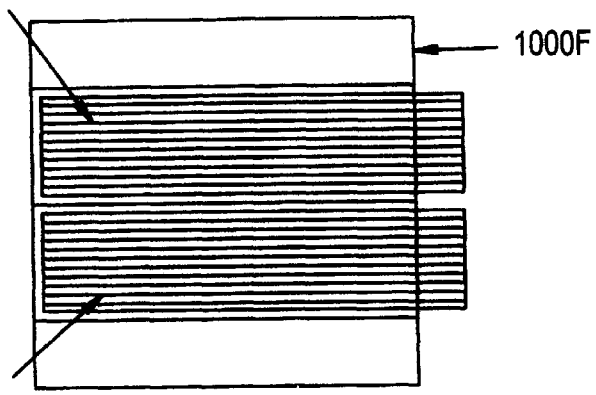

As shown in FIG. 19(A), the apparatus preferably includes a plurality of systems to enable at least one system to remain operational at any point in time. For example, the system preferably includes two side-by-side separator sections 2. In this example, the heavy debris conveyors A500" extend transverse to the separating section 2. In this manner, when the separation sections 2 are staggered a distance d greater than a width of the heavy debris conveyor, the heavy debris conveyors of each system can be delivered to the same general location. In addition, the heavy debris can be discharged at a location separate from the separation section 2 to facilitate operation. And, if desired, the heavy debris conveyors can easily extend beneath the separator section. In the plant system, the trap A510' can also be provided with a steep floor angle to help rocks, etc., slide down to the conveyor. Accordingly, the use of inlet jets A511 is not required. FIG. 19(B) illustrates one preferred construction of the device. As shown in FIG. 19(B), the trap A510 has a steep floor surface and the conveyor A500 extends to a position below the edge of the trap A510 to easily collect debris therefrom.

As shown in FIG. 19(A), in the preferred construction of the plant system, the separation section 2 is placed at a different location than the filtering section 1.

In the embodiment illustrated in FIGS. 19–20, the filter section 1 is combined with the recycling means A800. The details of the separation section 2, can be similar to the details of the above discussed embodiments—see, e.g., the embodiments shown in FIGS. 8, 11, 12 and 14. However, the preferred width of the separation section in the plant device is only 12 inches in the plant system, but this size can clearly be increased depending on circumstances. Further, in this example, the light debris and water is discharged onto a discharge flume A7000 and rather than separating the potatoes or the like items from the water (e.g., with a dewatering conveyor A600'), the potatoes or the like items and water are delivered onto a discharge flume A6000. The flumes A6000 and A7000 can be, for example, channels with upstanding sidewalls for retaining water. The flumes gradually slope downwards so that water flows down the flumes to an item delivery location DL. At the item delivery location DL, the potatoes or the like items can be delivered onto a de-watering chain conveyor or onto a perforated plate—similar to A600' or A600"—and the water can be returned for recycling. The arrows shown in FIG. 19(A) schematically illustrate that the flumes A6000 and A7000 can merge to a single flume entering the filter means A800'.

Alternatively, the flumes can continue separately to the filter means A800'. Although the flumes A6000 and A7000 are preferably generally straight, the paths of the flumes can be arranged as desired.

Figure 21:
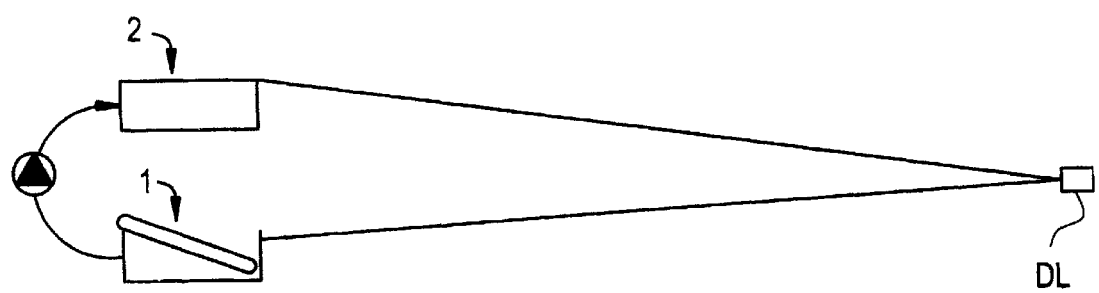

As schematically shown in FIG. 21, the separation section 2 and the delivery location DL can be distant from one another. The downward slope of the discharge flume A6000 must only be great enough to convey the potatoes or the like items in the water thereon. With potatoes, as an example, the angle of decline can be as small as about 1 inch down for every 10–12 feet of horizontal length. Thus, as one example for illustration purposes only, a 25 foot vertical elevation at the discharge of the potatoes from the separation section 2 into the flume A6000 will enable the potatoes to be conveyed within the flume for about 3000 or more feet. In this case, the delivery location could be about ¼ mile away. No pumps would be required to deliver the potatoes to the delivery location or to return the water to the filter section 1. As schematically illustrated in FIG. 21, the section 2 could be supported above the section 1, such as on a floor of a building, tower or the like above a floor having the section 1.

As shown in FIG. 19 (A), the recycling means A800' can be constructed similar to the water recycler of the above noted Ser. No. 08/884,672. In brief, the debris and water can be delivered to a tank 1000F. The tank 1000F can include a converging floor that leads to a bottom outlet. A conveyor filter can be provided to remove debris while allowing water to pass. In the illustrated embodiment, the conveyor filter has a lower end which is submerged beneath the level of water within the tank 1000F. This helps to decrease foaming that can occur because the input into the tank can occur below the water line. This also helps to increase the area of the filter of the conveyor filter that is actively used.

Water passing through the conveyor filter travels into a funnel that opens above an outlet in the bottom of the tank. Dirty water is delivered from the bottom outlet via a pump to centrifugal separators, e.g., hydrocyclones, and the discharge from the hydrocyclones is introduced into the separation section 2.

Preferably, the hydrocyclones discharge a sufficient amount of water that no pump is required in the separation section 2. That is, the flow of the recycled water from the recycling means A800 is preferably high enough to avoid the need for a pump AP.

Preferably, two completely separate recycling means A800' are provided, e.g., including separate tanks 1000F, hydrocyclones, pumps, etc. As shown in the top view illustrated in FIG. 20, the tanks 1000F can each be fabricated side-by-side with a central separating wall. In this manner, at least one system can remain operational at any point in time. Each discharge flume can be connected to a specific recycling means A800', or the discharge flumes can be adapted to be directed to either of the recycling means A800'. In addition, the discharge from the centrifugal separators can either be delivered to a specific one of the separation sections 2, or can be selectively delivered to a particular one of the separation sections 2, e.g., using flow directing gates, valves or the like.

In an alternative construction, instead of delivering the items x' and the debris y' via discharge flumes—which require a downward slope—the water carrying these items can be pumped to a desired location. That is, the water and items can be pumped directly from the top duct and/or bottom duct into a fluid conduit or pipe. This construction does not require a continually downward slope in order to convey the items. Any known means to pump water containing items therein can be used. When the items x' are pumped with pumps having rotating components, e.g., blades, in the path of the items x', the items x' can be pre-rotated (e.g., via water jets or the like) inside the piping to reduce damage to the items x' (e.g., potatoes) when the items contact the rotating pump components.

H. Water Recycling Means:

This section describes preferred embodiments of the recycling means described in U.S. Ser. No. 08/884,672. As noted above, any recycling means of the above-identified U.S. patent application can be used in the present invention.

Figure 25:
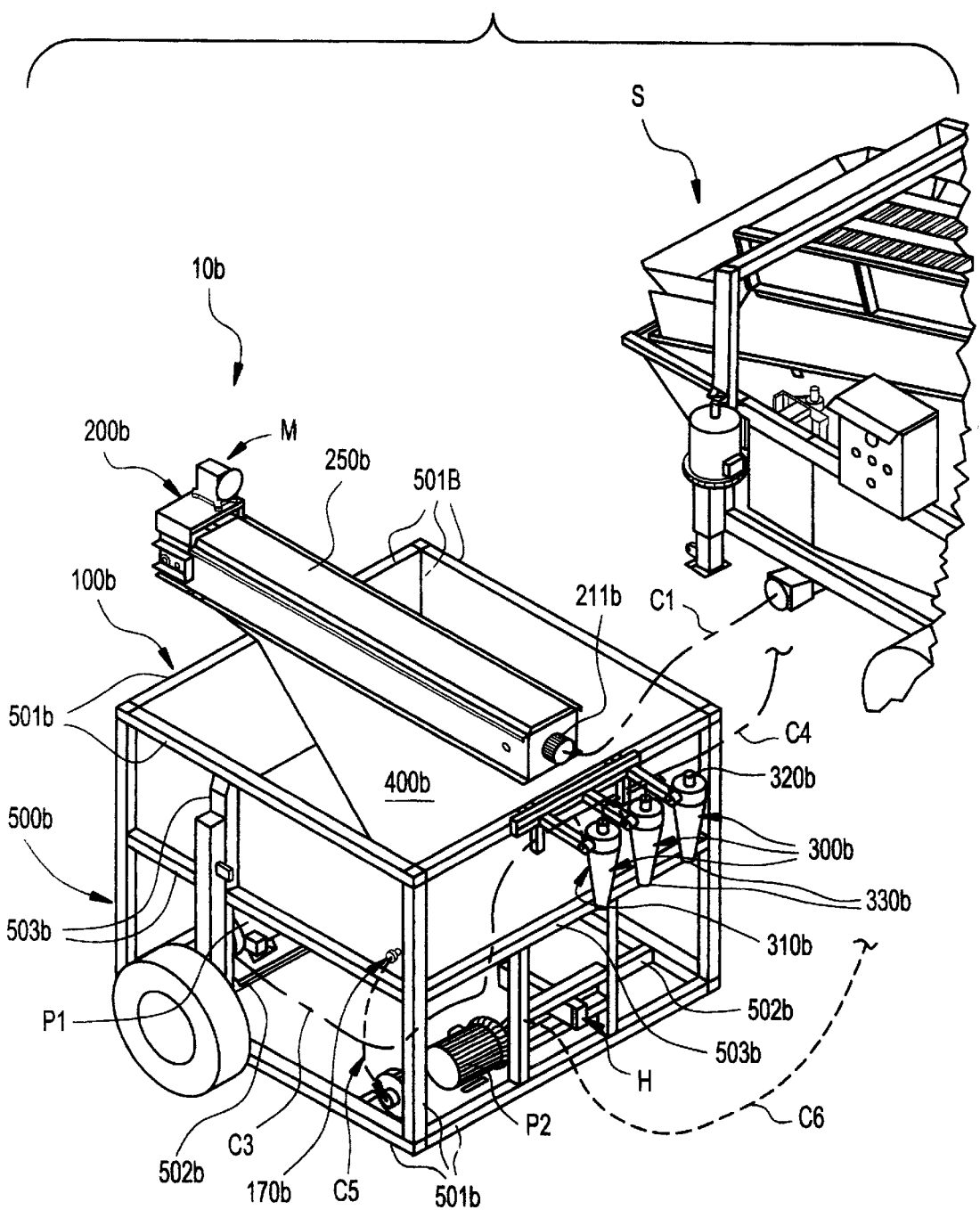

FIG. 25 illustrates a preferred embodiment of a portable water recycling system according to the present invention. As illustrated, the portable water recycling system 10b is used to remove debris and sediment from water in a nearby system Sb, such as, e.g., a potato washing system.

The preferred construction of the portable water recycling system 10b includes (1) a reclaiming tank 100b, (2) a conveyor filter 200b, (3) at least one centrifugal separator 300b, (4) a funnel 400b between the conveyor filter 200b and the tank 100b, and (5) a frame 500b for mounting the components of the system.

In summary, dirty water from the system Sb is directed into the conveyor filter 200b via the conduit C1. The conveyor filter 200b conveys away larger debris while allowing filtered water to fall vertically into the tank 100b via the funnel 400b. As shown in FIG. 28(B), the reclaiming tank 100b directs concentrated dirty water through a bottom opening 110b while de-sedimented water rises to the upper portion 120b of the tank surrounding the funnel 400b. The dirty liquid is discharged through the opening 110b and is delivered through the conduit C2 to a pump P1 which pumps the dirty water to the centrifugal separator(s) 300b via the conduit C3. The centrifugal separators are preferably hydrocyclones (as shown at 300b) which operate in a known manner. Specifically, the hydrocyclones circulate the dirty water so that concentrated dirty water is discharged from a bottom outlet while de-sedimented water is discharged from a top outlet into the conduit C4. One example of a hydrocyclone filter that can be used is Model No. 240W by Quality Solids Separation, Houston, Tex. The terminology centrifugal separator is used herein to describe known devices which separate materials by centrifugal, or swirling, motion of the materials. Although less preferred, centrifugal separators other than hydrocyclones can be used. An example of another less preferred centrifugal separator is a device known as a LAKOS(tm) filter by Lakos Filtration Systems, Fresno, Calif. The de-sedimented water in the conduit C4 can be returned to the system Sb as needed, or can be delivered to the upper portion 120b of the tank 100b for later delivery to the system Sb, or can be returned to the conveyor filter 200b for additional filtering.

The fineness of the sediment removed (e.g., sand, silt, or clay) can be controlled in the selection of the centrifugal separators 300b. Depending on the requirements of the system Sb, for example (a) centrifugal separators which only de-sand can be used, or (b) centrifugal separators which can de-silt can be used, or (c) centrifugal separators which can even de-clay can be used. In produce washing systems, for example, it is most preferred to have separators which de-silt.

Figure 27A:
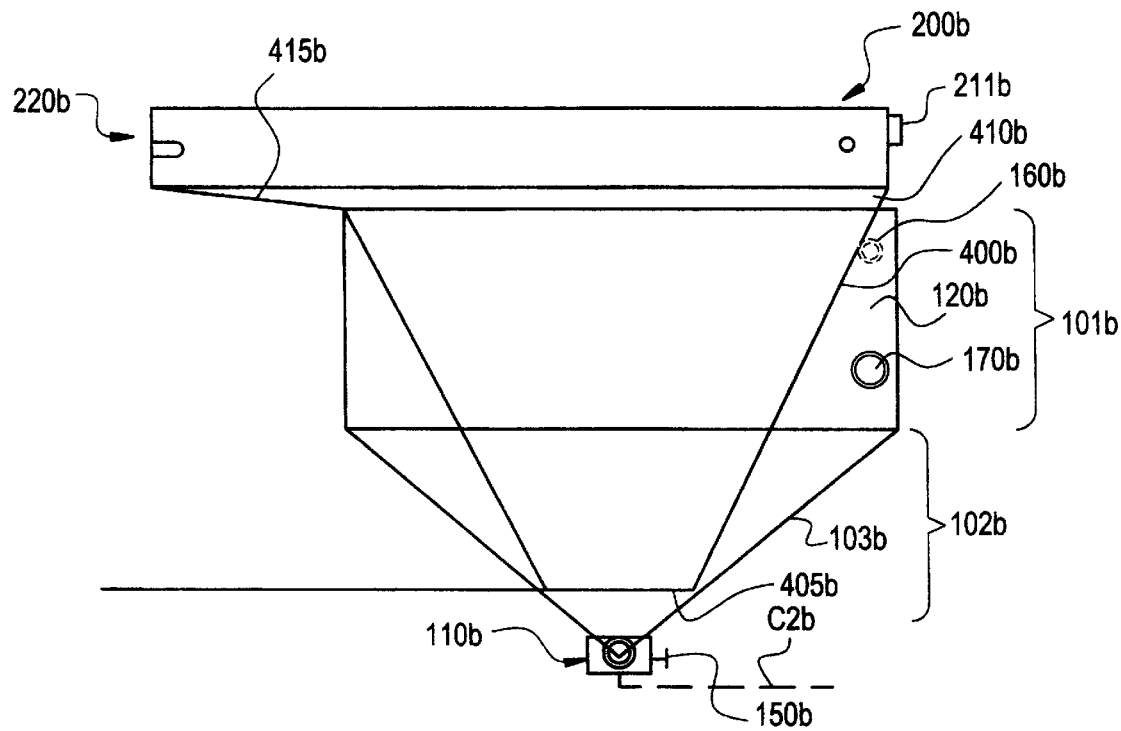
FIG. 27(A) is a side view of the portable water recycling system shown in FIG. 25 illustrating preferred dimensions of the structure.
Figure 27B:
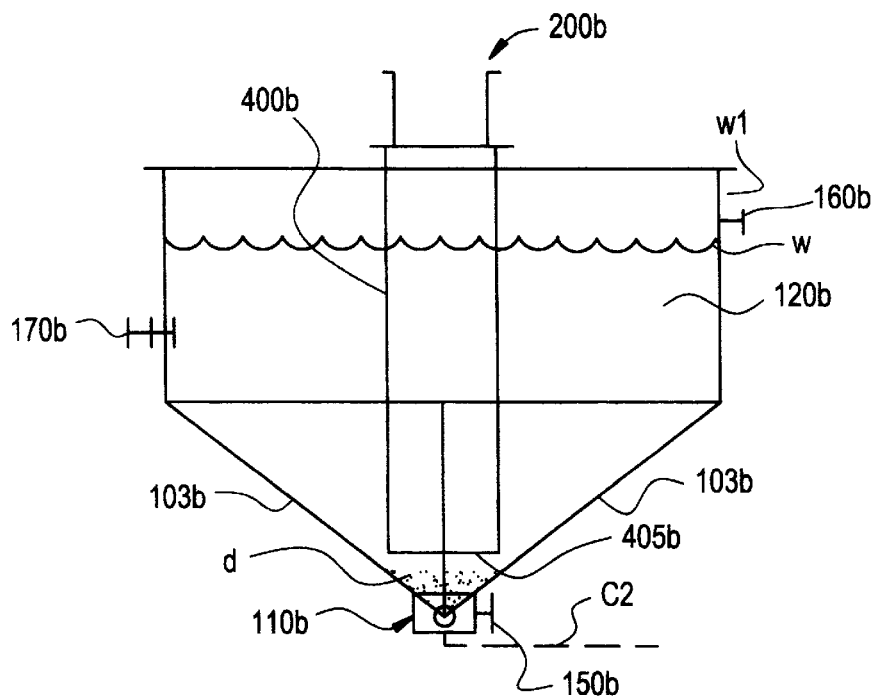
FIG. 27(B) is a front view of the portable water recycling system shown in FIG. 25 illustrating preferred dimensions of the structure.

One preferred structure of the reclaiming tank 100b and the funnel 400b is shown in FIGS. 27(A) and 27(B). As illustrated, the tank 100b preferably includes a wide upper section 101b and a converging, or funnel-shape, lower section 102b. The funnel 400b preferably extends from the bottom of the conveyor filter 200b to a location proximate the lower end of the converging lower section 102*b*. Sediment (e.g., sand, silt, and/or clay) can be funneled along inclined surfaces 103*b* to the bottom opening 110*b*. On the other hand, de-sedimented water passes around the bottom 405*b* of the funnel 400*b* and rises to the upper portion 120*b* of the tank. The angle of inclination of the surfaces 103*b* should be greater than the angle of repose of the sediment within the dirty water. Preferably, this angle is greater than approximately 35â. In alternative embodiments, the funnel-shape section 102*b* can have a horizontal cross-section that is circular, hexagonal, irregular, etc., and the funnel-shape section 102*b* can also be asymmetrical.

As shown in FIG. 27(B), the de-sedimented water will assume, for example, a water level W while the sediment D will be discharged from the bottom of the tank 100*b*. An overflow outlet 160*b* is provided proximate the upper end of the reclaiming tank 100*b* to ensure that the water does not flow over the top edge of the tank. Any excess water in the tank 100*b* can be discarded, or stored in a standby tank (not shown), or can even be returned to the washing system. The sediment D will be actively discharged and should not pile up at the bottom of the tank. In this regard, the volume flow rate of the dirty water into the bottom opening 110*b* should be sufficiently high, e.g., possibly between about 100*b* to 450*b* gallons per minute to remove the sediment. FIGS. 27(A)–27(B) also illustrate preferred dimensions, in inches, of one exemplary embodiment of the invention. The system can also include a valve 150*b* for closing the bottom opening 110*b* when the system is not in use. The valve 150*b* is preferably located within the conduit C2 below the tank.

Figure 26:
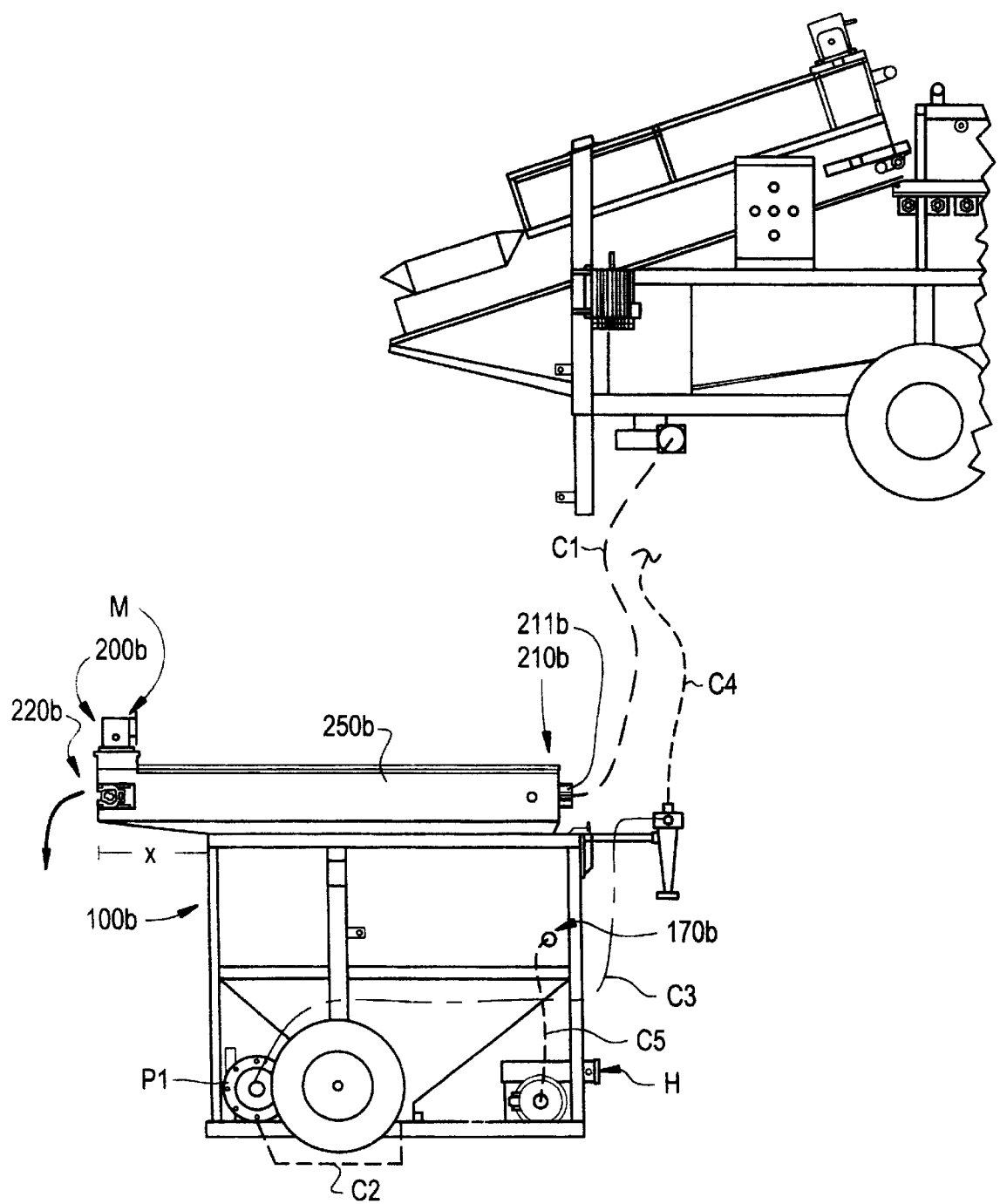

As illustrated in FIG. 26, the conveyor filter 200*b* preferably includes a container 250*b* having an input end 210*b* and a discharge end 220*b*. Dirty water enters the input end 210*b* through the conduit C1 and the input opening 211*b*. The conveyor filter 200*b* conveys large debris a distance X over the side of the tank 100*b* and discharges the debris from the discharge end 220*b*. The discharged debris can be collected by a tank, a conveyor, or another known means. As shown in FIG. 27(A), the funnel 400*b* preferably includes a widened upper section 410*b* having a sloped wall 415*b* extending along the length X to return the water to the tank 100*b* along substantially the entire length of the conveyor filter 200*b*. As shown in FIG. 4(A), the conveyor filter 200*b* preferably includes an endless conveyor belt or chain 201*b* having at least one cross-member 202*b* attached thereto. Preferably, a plurality of cross-members 202*b* are provided. The cross-members 202*b* are moved along a filter 203*b* from the input end 210*b* to the discharge end 220*b* of the conveyor filter 200*b*. As a result, the dirty liquid is separated with particulate material and water passing through the filter 203*b* and larger debris being pushed along the filter 203*b* by the cross-members 202*b* and discharged through the discharge end 220*b*.

In the most preferred embodiment, the filter 203*b* is a wedge-wire filter having a plurality of closely spaced parallel wedge-wires extending parallel to the traveling direction of the cross-members 202*b* along the length of the conveyor filter 200*b*. In one exemplary preferred construction, the wedge-wires have a width of about 0.06 inches and are separated by gaps having a width of about 0.02 to 0.04 inches. The cross-members 202*b* are preferably made of a semi-resilient material, such as plastic, that can deform slightly to fit within the gaps when pressed against the wedge-wires so as to actively clean the gaps when dragged along the length of the wedge-wires. The wedge-wires preferably have a triangular cross-section with upper sides aligned on a generally horizontal plane (i.e., parallel to the bottom of the cross-members) and lower sides creating relief angles to prevent debris from becoming clogged between the wedge-wires. Although less preferred, the wires could have other cross-sectional shapes, such as circular, square or rectangular.

Although less preferred, a woven filter can also be used, such as a woven metal filter. The filter can also be made from a perforated plate. Other known filters can also be used.

Figure 28A:
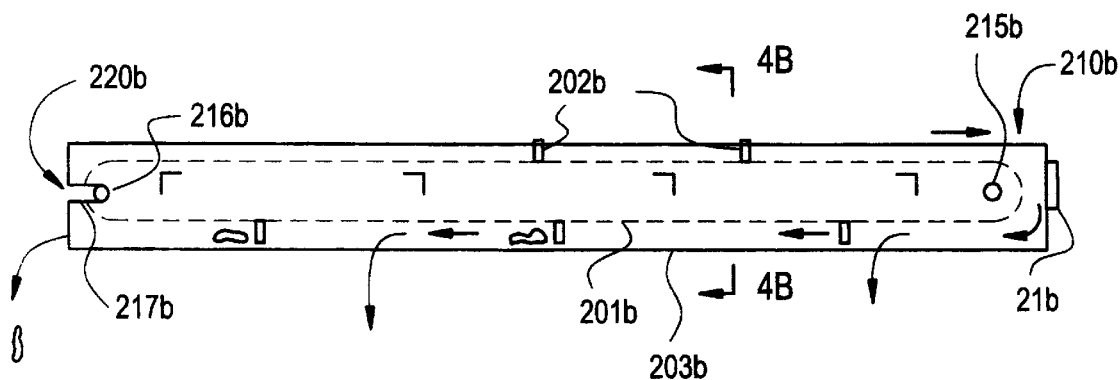
FIG. 28(A) is a cross-sectional side view of the preferred conveyor filter structure used in the portable water recycling system shown in FIG. 25.
Figure 28B:
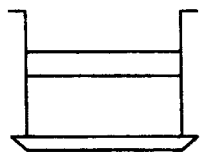
FIG. 28(B) is a cross-sectional front view taken along the arrows 4(B)—4(B) in FIG. 28(A)
Figure 28C:
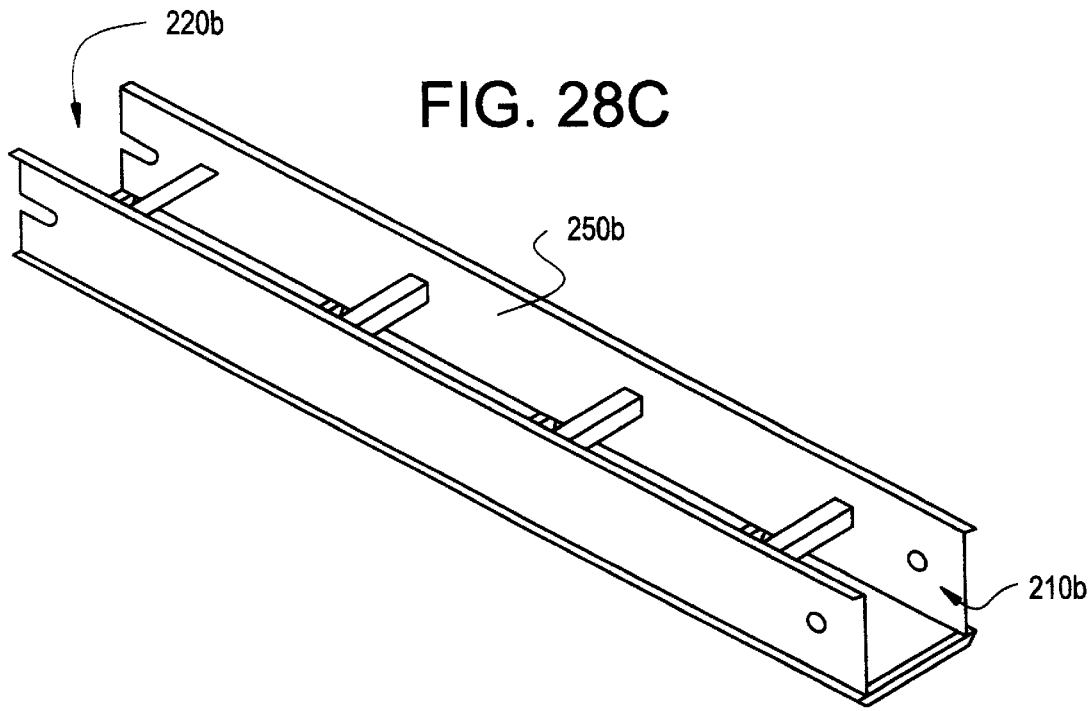
FIG. 28(C) is a perspective view of a portion of the conveyor filter illustrated in FIGS. 4(A) and 4(B)

Alternatively, the filter portion 203*b* can be located between the upper and lower horizontal portions of the conveyor belt or chain 201*b* so that the cross-members 202*b* move along the filter 203*b* below the upper horizontal portion of the belt or chain rather than below the lower horizontal portion of the belt or chain as shown in FIG. 28(A). In this latter embodiment, the rotation of the belt or chain would, of course, be in a direction opposite to that shown in FIG. 28(A). In this case, the belt or chain 201*b* should allow debris and water to pass, e.g., the belt or chain should cover only a small area and/or have a narrow width. The cross-members 202*b* can also be supported by two separate parallel belts or chains at opposite sides of the cross-members. The input opening 211*b* can also be located above the conveyor—rather than at one end—to ensure that debris is pushed by the cross-members 202*b*.

In another less preferred embodiment of the conveyor filter 200*b*, the conveyor belt or chain 201*b*, the cross-members 202*b*, and the filter 203*b* can be replaced with a screen-type or perforated endless conveyor belt which allows liquid to pass through holes in the conveyor belt itself while conveying debris to the discharge end 220*b*.

In another less preferred embodiment of the conveyor filter, an inclined filter, e.g., an inclined parabolic hydro-sieve or the like, can be used to convey debris by gravity and/or by the force of the flowing water without the use of conveyor belts or the like.

The terminology "conveyor filter" as used herein encompasses any filter means which actively or passively moves debris laterally while allowing filtered water to pass therethrough.

In one preferred embodiment, the conveyor filter 200*b* is dimensioned as illustrated, in inches, in FIGS. 27(A), 28(A), 28(B), and 28(C). The conveyor belt or chain 201*b* is preferably rotatably mounted on shafts 215*b* and 216*b*. The shaft 216*b* is preferably laterally positionable within the slot 217*b* to adjust the tension of the conveyor belt or chain. A motor M, shown in FIGS. 1 and 2, can be mounted on top of the conveyor filter 200*b* to rotate the conveyor belt or chain 201*b*. Although not illustrated in FIGS. 28(A)–28(C), the container 250*b* can also include a cover over the top of the container.

As previously described, the dirty liquid from the bottom of the tank 100*b* is pumped through the conduit C2 by the pump P1 and into the input openings 310*b* at the sides of the hydrocyclones 300*b*. The dirty water then circulates within the hydrocyclones 300*b*. This circulation causes de-sedimented water to be discharged through the upper outlets 320*b* and causes concentrated dirty water to be discharged through the lower outlets 330*b*. In the preferred embodiments, between about two to five hydrocyclones 300*b* are provided. In one preferred embodiment, as illustrated, three hydrocyclones 300*b* are included. Each of the hydrocyclones preferably has a capacity to circulate about 50 gallons of water per minute. In this manner, approximately 47 gallons per minute of de-sedimented water can be discharged through the outlets 320*b* of each hydrocyclone while approximately 3 gallons per minute of concentrated dirty water can be discharged downward through each of the outlets 330b. In this example, the dirty water is supplied to the hydrocyclones at a pressure of about 30–35 psi. As discussed above, the sizes and numbers of hydrocyclones can be varied as desired. Hydrocyclones come in a variety of sizes, e.g., handling from about 4 gpm to about 500 gpm of dirty water each. Larger hydrocyclones operate at lower pressures and may not remove sediment as effectively, while smaller hydrocyclones may separate very fine particles but operate at substantially higher pressures. The dirty water discharged downward through the outlets 330b can either be discarded or collected in a clarifier or settling tank (not shown) in order to further separate sediment material from the water. An additional pump can be used to pump de-sedimented water from the clarifier or settling tank back into the system S and/or into the tank 100b. The clarifier or settling tank would preferably be sufficiently large to have a long enough residence time to provide adequate clarification before recycling or discharging the de-sedimented water. The inclusion of such a tank could substantially increase the size of the system, which could be less desirable when the system is made to be transportable. When transportability is desired, the clarifier or settling tank can be separately transported or can be mounted on the frame 500b (see discussion of frame 500b below).

As shown in FIG. 25, the portable water recycler 10b is preferably mounted on a frame 500b. In the illustrated embodiment, the frame 500b is a generally box-shape structure having twelve edge beams 501b. The frame can also include lower cross beams 502b and additional support beams 503b. It should be understood that the frame is not limited to box-shape structures. The frame, tank, etc., can be made to have a variety of shapes.

As shown in FIGS. 25 and 26, the pump P1 is preferably located below the upper section 101b of the tank 101b upon at least one cross beam 102b. As also shown in FIGS. 25 and 26, a second pump P2 is preferably similarly supported upon the frame 500b. The second pump P2 sucks de-sedimented water out of the outlet 170b in the tank 100b and into the conduit C5. The second pump P2 further pumps the de-sedimented water through the conduit C6 and back to the system Sb.

De-sedimented water can also be returned to the system Sb through the conduit C4 extending from the hydrocyclones 300b. Alternatively, the de-sedimented water in the conduit C4 can be directed back into the top of the tank 100b. Accordingly, de-sedimented water can be directed back to the system Sb by both of the conduits C4 and C6 or by only one of these conduits. In this regard, it is possible to even entirely eliminate the suction pump P2 and to return the de-sedimented water to the system Sb with only the conduit C6. However, in the preferred construction, the pump P2 is included. When the system Sb is a produce washing system, the returned de-sedimented water can be sprayed over the top of the produce, or can be otherwise delivered to the system Sb.

As also shown in FIGS. 25 and 26, the portable water recycler preferably includes wheels W mounted to the frame 500b for transportability of the device. Although one wheel is illustrated in the FIGS., it should be apparent that a similar wheel is preferably mounted at the opposite side of the device. In addition, the device can be modified to include 3, 4 or even more wheels.

As shown in FIGS. 29(A)–29(B), the wheels W are preferably mounted on wheel mounting spindles 552b at the lower ends of extendable arms 550b. The arms 550b are preferably telescopically received within a cylinder 555b and are extendable by using any known type of jack means, such as a screw shaft or the like. The jack means is preferably manually operated, such as by the ears 560b shown in FIG. 29(B). The wheel height can, thus, be varied to accommodate for uneven terrain at a site location or to allow the frame 500b to rest on the ground.

In order to transport the portable water recycler lob, a trailer hitch mechanism H can be attached to the frame 500b. In this manner, the device can be pulled by a tractor or by another pulling vehicle (not shown). The hitch mechanism H can be any known mechanism. Alternatively, rather than functioning as a trailer, the portable water recycler 10b can be constructed as part of a vehicle itself, such as a truck, etc.

In addition, it is contemplated that the present invention can also be constructed as a non-transported device that is permanently mounted and/or stationary at a particular location. In this regard, one preferred embodiment of a permanent installation could include all of the same features as illustrated in the FIGS., except for the wheels and related features shown in FIGS. 29(A) and 29(B). The permanent installation can, thus, be a compact structure, allowing more space at a the cite location to be used for other purposes.

I. Advantages and Modifications:

Although the preferred embodiments of the invention are involve water based systems, other liquids could be potentially utilized—or the water could potentially have other elements therein. For example, the water could include a brine or saline solution. Among other things, this could be used to alter flow characteristics of products separated therein.

As discussed above, among the many benefits of the preferred embodiments, the system allows debris to be removed from a desired product—such as potatoes and the like—creating very significant advantages in the form of lower labor costs, lower water consumption, higher capacity and the ability to handle greater amounts of product, improved separation accuracy, lower power requirements, and less environmental concern than existing equipment.

Because the present system can recycle a substantial amount of the liquid, e.g., water, within the system, the detrimental effects of discharging liquid into an outside water source such as a lake or river will be substantially eliminated. When dirty liquid is discharged into outside water sources, among other environmental hazards, debris within the tank can result in the build up of algae and bacteria which digest the debris and which deplete the oxygen supply in the outside water source. This can be problematic if a substantial amount of the water is not recycled but merely discharged into such a water source. In addition, because the present invention can operate with only a small amount of water added to the system per minute, the system does not have to be specially implemented in an area where a substantial water source can be found in order to fulfill the needs of the system. Accordingly, the present invention—which can be made to include wheels for its transportability—can be brought to any desired location. This can be especially beneficial for use at farm sites and at locations which do not require such a device for the entire year, but which require such devices during specific seasons. This type of system could also be shared by a number of farmers and/or could even be rented for particular time periods with relatively simple delivery and set up time. The adaptability of the present device to various products enables it to be utilized at various locations for various purposes—creating a very versatile device.

The present invention as described with reference to the preferred embodiments, has particular advantages in the separation of debris from produce such as potatoes and the like—easily separating vines, grass, wood, plastic, defective potatoes, such as hollow heart potatoes and dry rotten potatoes, and rocks (when a rock conveyor is included) from the desirable potatoes. At the same time, the present invention can reduce water loss and can enable the system to be maintained cleaner and freer from contaminants such as algae and bacteria.

The present system can be readily adapted to separate a variety of items. For example, the device can be readily adapted to be used with potatoes, sweet potatoes, radishes, apples, oranges, and various other produce, as well as a variety of other product and commodities.

While the present invention has been shown and described with reference to preferred embodiments presently contemplated as best modes for carrying out the invention, it is understood that various changes may be made in adapting the invention to different embodiments without departing from the broader inventive concepts disclosed herein and comprehended by the claims which follow. For example, it should be readily apparent from the present disclosure that certain parts can be omitted from the preferred. embodiments without departing from the scope of the invention. The preferred embodiments illustrate various parts of the system that can be included to construct the invention, and the present invention is not merely limited to the particular constructions and combinations of features as illustrated in the preferred embodiments. For example, elements from various embodiments can be combined in other embodiments as would be understood by those in the art. For example, even where less preferred, conveyors shown in FIGS. 1–7 could be combined with the embodiments of FIGS. 8, et seq., and/or other components can be arranged together as would be understood based on the present disclosure. In addition, although the illustrated embodiments in FIGS. 8, et. seq., show separation into two ducts, these embodiments can also separate into three or more ducts if desired, such as, for example, if different product types are simultaneously collected.

What is claimed is:

1. A debris eliminating system, comprising:
   a) a tank for holding water;
   b) a system for circulating water across said tank from a first side to a second side;
   c) a pump for circulating the water across said tank;
   d) a medium density object collector within said tank; and
   e) a light debris collector within said tank for receiving light debris, said light debris collector comprising an upwardly curved duct,
   f) wherein said medium density object collector defines a medium density object flow path and said light density object collector defines a light density object flow path that is independent and separate from said medium density object flow path, at least said medium density object flow path being configured to convey medium density objects via fluid flow therealong.

2. The debris eliminating system as recited in claim 1, wherein said medium density object collector includes an upwardly curved duct.

3. The debris eliminating system as recited in claim 2, wherein said upwardly curved ducts converge in a manner to cause the medium density objects and the light debris to be conveyed upwards by the water flow through said ducts.

4. The debris eliminating system as recited in claim 2, wherein said medium density object collector includes a conveyor belt which receives medium density objects and conveys such objects out of the tank.

5. The debris eliminating system as recited in claim 1, further including a receiving flume proximate the top of said tank for placing items to be separated into the tank, said receiving flume having a horizontal surface and a plurality of fingers at the output end of said horizontal surface which allow water to freely pass between the fingers while maintaining larger objects above the fingers.

6. The debris eliminating system as recited in claim 1, wherein said medium density object collector includes a conveyor belt which receives medium density objects and conveys such objects out of the tank.

7. The debris eliminating system as recited in claim 1, further including a conveyor filter through which substantially all of the water in the tank is circulated, wherein said conveyor filter includes a conveyor having cross bars which pass over a surface of said filter so as to draw debris off said filter and out of said tank.

8. The debris eliminating system as recited in claim 1, wherein both said medium density object collector and said light density object collector include means to create a predetermined back pressure so as to set a ratio of fluid flow into the respective medium density object and light density flow paths.

9. A debris eliminating system, comprising:
   a) a tank for holding fluid, said tank at least having a separation section across which fluid flows from an upstream location to a downstream location;
   b) a return fluid path that returns a substantial portion of the fluid from the downstream location back to said upstream location so that fluid generally continually flows across said separation section;
   c) a pump for circulating the fluid across said separation section;
   d) a medium density object collector, the medium density object collector being located to collect medium density objects following a medium density object flow path in said separation section;
   e) a light object collector, the light object collector being located to collect light objects which follow a light object flow path in said separation section, said light object collector comprising an upwardly turned duct; and
   f) a conveyor filter through which substantially all of the fluid that travels through said separation section passes.

10. The debris eliminating system as recited in claim 9, wherein the medium density object collector and the light object collector are separated by an adjustable divider that separates the medium density object flow path and the light object flow path.

11. The debris eliminating system as recited in claim 10, wherein the medium density object collector includes an upwardly turned duct wherein said upwardly turned ducts of said medium density object collector and said light object collector are separated by said divider, said divider being at least vertically adjustable.

12. The debris eliminating system as recited in claim 11, wherein each said upwardly curved duct converges in a manner to cause the medium density objects or the light objects to be conveyed upwards by the fluid flow therethrough.

13. The debris eliminating system as recited in claim 9, wherein said medium density object collector and said light object collector include upwardly curved ducts.

14. The debris eliminating system as recited in claim 13, wherein said medium density object collector includes a conveyor belt which receives medium density objects and conveys such objects out of the tank.

15. The debris eliminating system as recited in claim 9, wherein said me dium density object collector includes a conveyor belt which receives medium density objects and conveys such objects out of the tank.

16. The debris eliminating system as recited in claim 9, wherein said separation section is an elongated section into which items to be separated are delivered.

17. The debris eliminating system as recited in claim 16, wherein said tank includes an elongated conveyor filter section that extends generally parallel to said separation section, and a conveyor filter located within said conveyor filter section to filter fluid exiting said separation section.

18. The debris eliminating system as recited in claim 17, wherein said conveyor filter conveys objects in a direction substantially opposite to a direction of fluid flow across said separation section.

19. The debris eliminating system as recited in claim 18, wherein said conveyor filter includes an inclined filter extending along a length of said conveyor filter sections, said filter having a lower end at a location below an entry opening from said separation section such that fluid from the separation section is discharged over said filter, and said conveyor filter includes a plurality of cross bars that are moved up along said filter to move objects out of said conveyor filter section, said return fluid path including an area beneath said filter in said conveyor filter section through which fluid flows back to the upstream location of said separation section.

20. The debris eliminating system as recited in claim 19, wherein said area beneath said filter has a floor which declines in a direction towards said upstream location of said separation section.

21. The debris eliminating system as recited in claim 20, further including an exit port in said conveyor filter section proximate a lower end of said declined floor for discharging sediment filled fluid through an exit conduit, said exit conduit leading to a de-sedimenting apparatus, fluid de-sedimented by the de-sedimenting apparatus being returned to said tank through a return pipe.

22. The debris eliminating system as reciled in claim 21, wherein said de-sedimenting apparatus includes at least one centrifugal separator.

23. The debris eliminating system as recited in claim 22, wherein said return pipe is directed into a location within said separation section to laterally push high density objects to a high density object collector.

24. The debris eliminating system as recited in claims, wherein said tank includes an elongated high density object collector section having a high density object collector therein.

25. The debris eliminating system as recited in claim 24, wherein both said conveyor filter and said high density object collector convey objects in a direction substantially opposite to a direction of fluid flow through said separation section.

26. The debris eliminating system as recited in claim 16, wherein said tank includes an elongated high density object collector having said high density object collector therein.

27. The debris eliminating system as recited in claim 26, wherein said high density object collector includes a conveyor that conveys high density objects in a direction generally transverse to a direction of fluid flow through said separation section.

28. The debris eliminating system as recited in claim 9, wherein at least one of said object collectors includes a gradually downwardly sloped flume that creates a downward flow of fluid to convey the respective objects upon a downward flow of fluid.

29. The debris eliminating system as recited in claim 9, wherein said medium object collector includes a gradually downwardly sloped flume that creates a downward flow of fluid to convey the medium objects upon the downward flow of fluid.

30. The debris eliminating system as recited in claim 29, wherein said flume extends to a delivery location at which said medium objects are separated from said fluid, and including a return flume for directing said fluid back towards said tank.

31. The debris eliminating system as recited in claim 30, further including a conveyor filter through which substantially all of the fluid that travels through said separation section passes, wherein said conveyor filter is located at an elevation beneath said tank, and said return flume directs said fluid to said conveyor filter.

32. A method for removing debris from objects by separation within a continuously flowing fluid, comprising the steps of:
   a) providing a tank having a separation section across which fluid can continuously flow in a downstream direction;
   b) continuously flowing fluid in a flow path across said separation section in said downstream direction;
   c) introducing objects into said flow path proximate an upstream position in said separation section such that said objects move horizontally across said separation section via said fluid and migrate vertically substantially transverse to said downstream direction;
   d) at a predetermined position in said separation section, dividing said flow path into a plurality of separate flow paths, including a continuously flowing light object flow path which conveys, via said fluid, light objects and a continuously flowing medium density object flow path which conveys, via said fluid, medium density objects;
   e) said step of dividing including providing an upwardly curved duct for said light object flow path and a divider wall that separates said light object flow path and said medium density object flow path, said divider wall being substantially solid such that fluid substantially does not pass through said divider wall but is discretely separated into said light object flow path and said medium density object flow path;
   f) collecting medium density objects conveyed via fluid following said medium density object flow path;
   g) collecting light objects conveyed via fluid following said light object flow path; and
   h) providing a return flow path for returning fluid back to said upstream location of said separation section from at least one of said light object flow path and said medium density object flow path.

33. A method for removing debris from objects by separation within a flowing fluid, comprising the steps of:
   a) providing a tank having a separation section across which fluid can continuously flow in a downstream direction;
   b) continuously flowing fluid in a flow path across said separation section in said downstream direction;
   c) introducing objects into said flow path proximate an upstream position in said separation section such that said objects move horizontally across said separation section via said fluid and migrate vertically substantially transverse to said downstream direction;
   d) at a predetermined position in said separation section, dividing said flow path into a plurality of separate flow paths, including a continuously flowing light object flow path comprising an upwardly curved duct which conveys, via said fluid, light objects and a separate continuously flowing medium density object flow path which conveys, via said fluid, medium density objects;

e) setting a ratio of fluid flow between said medium density object flow path and said light object flow path by applying a first back pressure in said medium density object flow path by at least one of i) directing said medium density object flow path to a desired elevational height and ii) restricting a cross-sectional area of said medium density object flow path, and applying a second back pressure in said light object flow path by at least one of i) directing said light object flow path to a desired elevational height and ii) restricting cross-sectional area of said light object flow path;

f) collecting medium density objects conveyed by liquid following said medium density object flow path; and g) collecting light objects conveyed by liquid following said light object flow path.

* * * * *